United States Patent
Feit et al.

(10) Patent No.: US 11,226,730 B2
(45) Date of Patent: Jan. 18, 2022

(54) SYSTEM AND METHODS FOR CONTROLLING A VEHICULAR INFOTAINMENT SYSTEM

(71) Applicant: Honda Motor Co., Ltd., Tokyo (JP)

(72) Inventors: Steven Feit, Dublin, OH (US); David A. Vanderburgh, Dublin, OH (US); Ross C. Miller, Hilliard, OH (US); Koo Ho Shin, Huntington Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/033,192

(22) Filed: Sep. 25, 2020

(65) Prior Publication Data

US 2021/0011618 A1 Jan. 14, 2021

Related U.S. Application Data

(62) Division of application No. 15/400,045, filed on Jan. 6, 2017, now Pat. No. 10,860,192.

(51) Int. Cl.
*G06F 3/00* (2006.01)
*G06F 3/0484* (2013.01)
(Continued)

(52) U.S. Cl.
CPC .......... *G06F 3/04847* (2013.01); *B60K 35/00* (2013.01); *B60K 37/06* (2013.01); *G06F 3/0482* (2013.01); *G06F 3/0486* (2013.01); *G06F 3/04817* (2013.01); *G06F 3/04886* (2013.01); *G06F 3/165* (2013.01);
(Continued)

(58) Field of Classification Search
CPC ..... G06F 3/04817; G09F 21/04; B60K 35/00; H03G 3/20; B60W 50/08; G08G 1/0112; H04W 4/21; B60Q 1/143
See application file for complete search history.

(56) References Cited

U.S. PATENT DOCUMENTS 6,667,726 B1   12/2003   Damiani et al.
7,934,156 B2   4/2011    Forstall et al.
(Continued)

OTHER PUBLICATIONS

International Search Report and Written Opinion in International Application No. PCT/US2017/066076 dated Dec. 13, 2017, 18 pp.

*Primary Examiner* — Toan H Vu
(74) *Attorney, Agent, or Firm* — Armstrong Teasdale LLP

(57) ABSTRACT

An infotainment computer device for use in controlling an infotainment system in a vehicle is provided. The infotainment computer device includes at least one processor communicatively coupled to at least one memory device and a display device communicatively coupled to the at least one processor. The infotainment computer device is programmed to display an active page and a toolbar. The active page includes a plurality of buttons and the toolbar includes a shortcut area including at least one shortcut button. The infotainment computer device is also programmed to receive a first input requesting access to a customization mode, retrieve a current speed of the vehicle, activate the customization mode if the current speed of the vehicle is zero, receive a second input indicating a desired change to at least one of the active page and the toolbar, and change the display based on the desired change.

20 Claims, 48 Drawing Sheets

(51) Int. Cl.
  *G06F 3/0482* (2013.01)
  *G06F 3/0481* (2013.01)
  *G06F 3/16* (2006.01)
  *G06F 3/0486* (2013.01)
  *G06F 3/0488* (2013.01)
  *B60K 35/00* (2006.01)
  *B60K 37/06* (2006.01)
  *G06F 3/01* (2006.01)
  *G06F 3/0483* (2013.01)

(52) U.S. Cl.
  CPC ............... *B60K 2370/1438* (2019.05); *B60K 2370/1442* (2019.05); *B60K 2370/52* (2019.05); *B60K 2370/736* (2019.05); *B60K 2370/739* (2019.05); *G06F 3/0483* (2013.01)

(56) References Cited

U.S. PATENT DOCUMENTS

| | | | |
|---|---|---|---|
| 8,400,417 | B2 | 3/2013 | Ording et al. |
| 8,619,038 | B2 | 12/2013 | Chaudhri et al. |
| 2008/0163109 | A1 | 7/2008 | Srivatsan et al. |
| 2010/0268426 | A1* | 10/2010 | Pathak .................. G06F 3/0485 701/48 |
| 2011/0107272 | A1 | 5/2011 | Aguilar |
| 2012/0272145 | A1 | 10/2012 | Ryan et al. |
| 2013/0038437 | A1 | 2/2013 | Talati et al. |
| 2013/0218410 | A1 | 8/2013 | Chen |
| 2013/0246181 | A1 | 9/2013 | Lobsenz |
| 2013/0325255 | A1 | 12/2013 | James et al. |
| 2014/0298259 | A1 | 10/2014 | Meegan et al. |
| 2014/0309870 | A1 | 10/2014 | Ricci et al. |
| 2015/0040113 | A1 | 2/2015 | Muench-Casanova et al. |
| 2015/0060608 | A1 | 3/2015 | Carlson et al. |
| 2015/0199162 | A1 | 7/2015 | Platz et al. |
| 2015/0324067 | A1 | 11/2015 | Cabral |
| 2016/0082975 | A1 | 3/2016 | Lovett et al. |
| 2016/0147411 | A1 | 5/2016 | Li et al. |
| 2016/0159345 | A1 | 6/2016 | Kim |
| 2016/0364029 | A1 | 12/2016 | Miller et al. |
| 2017/0001650 | A1 | 1/2017 | Park |
| 2017/0257071 | A1 | 9/2017 | Goeppner |
| 2017/0269768 | A1* | 9/2017 | Shin ..................... G06F 3/0338 |
| 2017/0282717 | A1 | 10/2017 | Jang et al. |
| 2017/0282744 | A1 | 10/2017 | Koo et al. |
| 2018/0081452 | A1* | 3/2018 | Min ..................... G06F 3/0338 |
| 2018/0273050 | A1* | 9/2018 | Tertoolen .......... G08G 1/096861 |

* cited by examiner

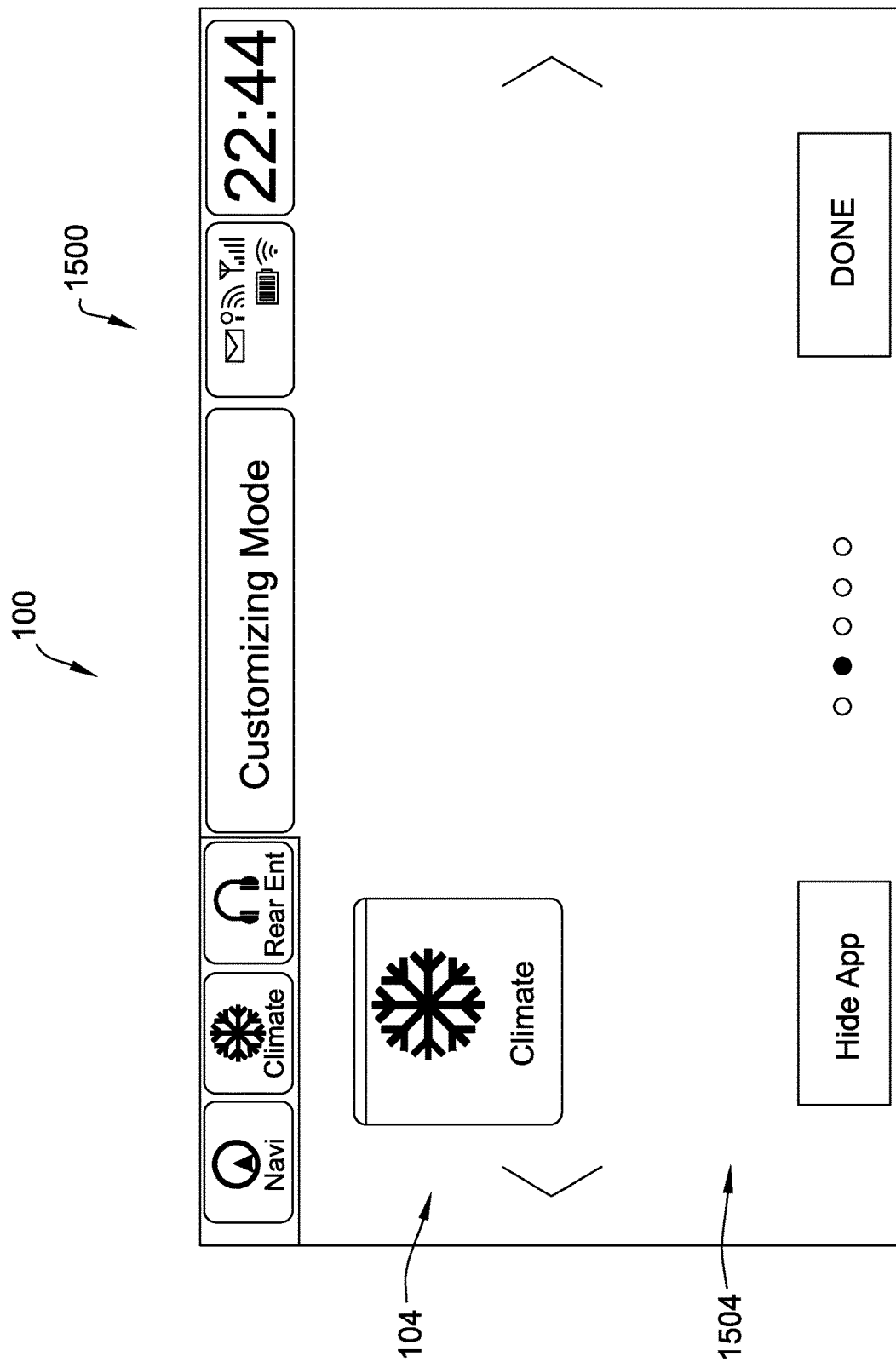

SYSTEM AND METHODS FOR CONTROLLING A VEHICULAR INFOTAINMENT SYSTEM

CROSS REFERENCE TO RELATED APPLICATIONS

This application claims priority to and is a divisional of U.S. patent application Ser. No. 15/400,045 filed on Jan. 6, 2017, entitled "SYSTEM AND METHODS FOR CONTROLLING A VEHICULAR INFOTAINMENT SYSTEM", which is hereby incorporated by reference in its entirety.

BACKGROUND OF THE DISCLOSURE

The field of the disclosure relates generally to a vehicular infotainment system, and more specifically to methods and systems for use in controlling an infotainment system including a customizable toolbar and home page.

Generally, known vehicle infotainment systems provide information and entertainment options to occupants of a vehicle. Known infotainment systems may accept user input to control various aspects of the occupant's comfort, such as the vehicle interior climate and/or entertainment. Many of these controls are provided while the vehicle is in motion. However, while a vehicle's driver is accessing these controls, the user is not focusing their attention on the road while actively driving. As such, a need exists to provide these controls in a user-accessible manner that enables a user to quickly access desired controls while driving. This would reduce the amount of time that a user would need to spend to adjust the controls of the infotainment system and then return their attention to actively driving.

BRIEF DESCRIPTION OF THE DISCLOSURE

In one aspect, an infotainment computer device for use in controlling an infotainment system in a vehicle is provided. The infotainment computer device includes at least one processor communicatively coupled to at least one memory device and a display device communicatively coupled to the at least one processor. The infotainment computer device is programmed to display, via the display device, a view including an active page and a toolbar. The active page includes a plurality of buttons and the toolbar includes a shortcut area including at least one shortcut button. The infotainment computer device is also programmed to receive a first input requesting access to a customization mode, retrieve a current speed of the vehicle, activate the customization mode if the current speed of the vehicle is zero, receive a second input indicating a desired change to at least one of the active page and the toolbar, and change the display based on the desired change.

In another aspect, a computer-based method for use in controlling an infotainment system in a vehicle is provided. The method is implemented using an infotainment computer device in communication with a memory. The method includes displaying, via a display device, a view including an active page and a toolbar. The active page includes a plurality of buttons and the toolbar includes a shortcut area including at least one shortcut button. The method also includes receiving a first input requesting access to a customization mode, retrieving a current speed of the vehicle, activating the customization mode if the current speed of the vehicle is zero, receiving a second input indicating a desired change to at least one of the active page and the toolbar, and changing the display based on the desired change.

In a further aspect, at least one non-transitory computer-readable storage media having computer-executable instructions embodied thereon is provided. When executed by an infotainment computer device, in a vehicle, having at least one processor coupled to at least one memory device, the computer-executable instructions cause the processor to display, via a display device, a view including an active page and a toolbar. The active page includes a plurality of buttons and the toolbar includes a shortcut area including at least one shortcut button. The computer-executable instructions also cause the processor to receive a first input requesting access to a customization mode, retrieve a current speed of the vehicle, activate the customization mode if the current speed of the vehicle is zero, receive a second input indicating a desired change to at least one of the active page and the toolbar, and changing the display based on the desired change.

In yet another aspect, an infotainment computer device for use in controlling an infotainment system in a vehicle is provided. The infotainment computer device includes: at least one processor coupled to at least one memory device and a display device coupled to the at least one processor. The infotainment computer device is programmed to display, via the display device, an active page including a plurality of user-actionable buttons, where each button is associated with an application, display, via the display device, a toolbar including a shortcut area including at least one shortcut button, an audio information bar including an audio icon and audio information area, and a notification area including one or more notification icon, receive audio signals from at least one audio source, determine a currently selected audio source, and transmit the audio signals from the currently selected audio source to one or more audio outputs.

In still another aspect, an infotainment computer device for use in controlling an infotainment system in a vehicle is provided. The infotainment computer device includes at least one processor coupled to at least one memory device and a touch-sensitive display device coupled to the at least one processor. The infotainment computer device is programmed to concurrently display, via the touch-sensitive display device, a first region and a second region in a user interface. The first region configured to display multiple pages of application icons. The first region displays a first page of application icons in the multiple pages of application icons. The second region includes a toolbar along the top of the touch-sensitive display device. The toolbar includes a shortcut area with at least one shortcut button, an audio information bar including an audio icon and audio information area, and a notification area including one or more notification icon. The audio icon and the audio information area display information about a currently selected audio source. While concurrently displaying the first region and the second region on the touch-sensitive display, the infotainment computer device is programmed to receive a user contact on the audio information area. The audio information area is configured to display information about the currently selected audio source. The infotainment computer device is also programmed to activate and display an application associated with the selected audio source in the first region.

BRIEF DESCRIPTION OF THE DRAWINGS

FIGS. 1-20B illustrate exemplary embodiments of the methods and systems described herein.

FIG. 1 is an exemplary infotainment system display including an active page and a toolbar in accordance with one embodiment of the present disclosure.

FIG. 2 is a simplified block diagram of an exemplary infotainment system.

FIG. 3 illustrates an exemplary configuration of a client system shown in FIG. 2, in accordance with one embodiment of the present disclosure.

FIG. 4 illustrates an exemplary configuration of a server system shown in FIG. 2, in accordance with one embodiment of the present disclosure.

FIG. 5 is a flow chart of an exemplary process for use in controlling a user's access to a customization mode using the system shown in FIG. 2.

FIG. 10 illustrates an exemplary view of a selectable menu of audio sources based on the audio information bar shown in FIG. 9A.

FIG. 12 illustrates another exemplary view indicator area, shown in FIGS. 11A-11D, used with the infotainment system display shown in FIG. 1.

FIG. 13 illustrates an exemplary view of a list of items associated with indicators from the indicator area shown in FIGS. 11A-11D and 12.

FIG. 14 is a flow chart of an exemplary process that may be used to control the infotainment system in a vehicle as shown in FIG. 2.

FIGS. 15A-15E illustrate exemplary views of a use case for rearranging buttons over multiple active pages.

FIG. 18 illustrates an exemplary view of an all apps menu that displays a selectable listing of all of the apps on the infotainment system shown in FIG. 2.

FIGS. 20A-20B are flow charts of exemplary processes for transitioning between different apps using the infotainment system shown in FIG. 2.

DETAILED DESCRIPTION OF THE DISCLOSURE

Figure 1:
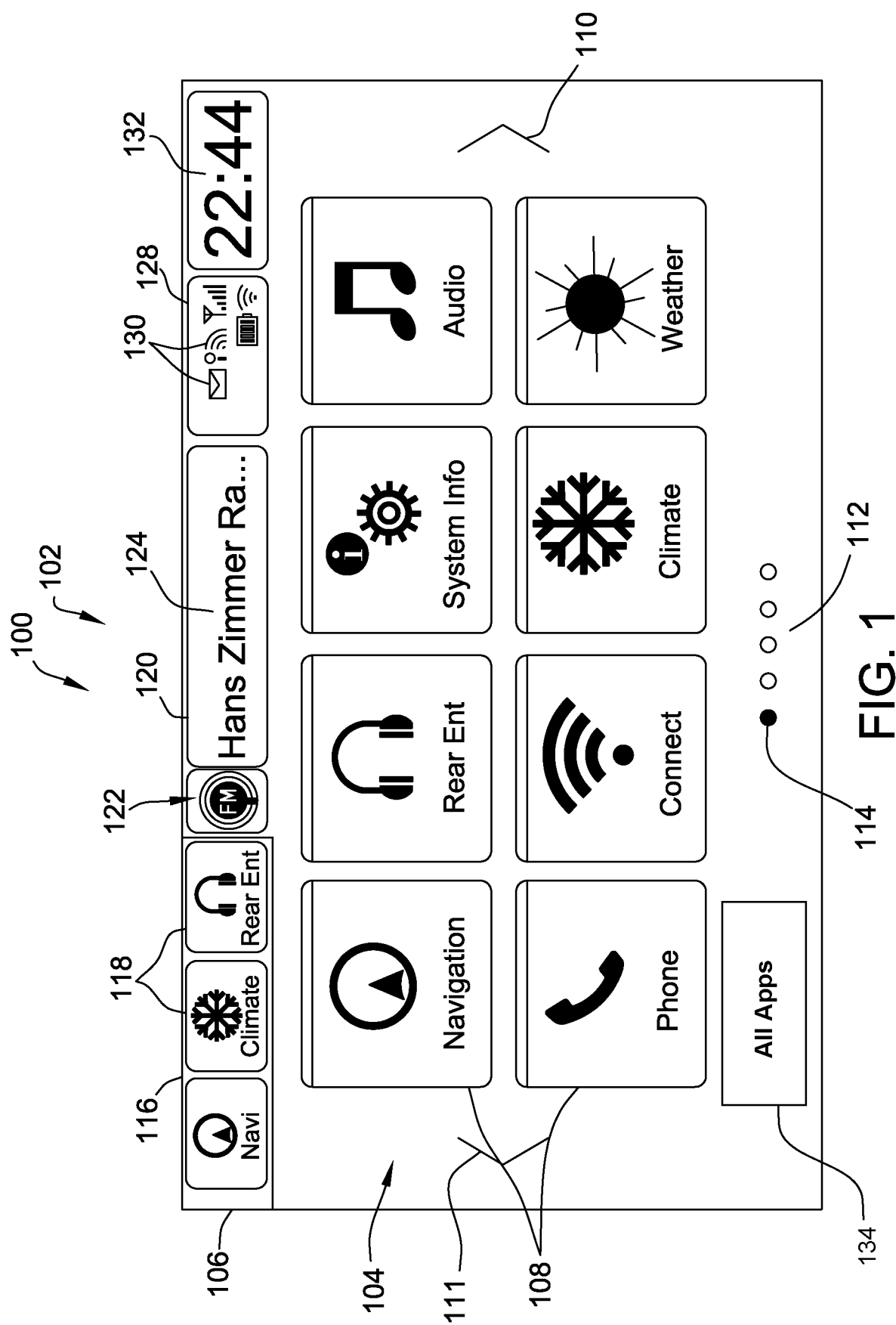

The following detailed description illustrates exemplary embodiments by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. These system and methods are for use in controlling an infotainment system including a customizable toolbar and at least one page of buttons.

The methods and system described herein may be implemented using computer programming or engineering techniques including computer software, firmware, hardware, or any combination or subset. As described above, at least one technical problem with known systems is a need to enable a user, such as a driver, to quickly make changes via the infotainment system. The system and methods described herein address that technical problem. The technical effect of the systems and processes described herein is achieved by performing at least one of the following steps: (a) displaying, via a display device, an active page and a toolbar, where the active page includes a plurality of buttons, where the toolbar includes a shortcut area including at least one shortcut button, an audio information bar that includes an audio source icon and an audio information block, and an indicator area that includes space to display one or more icons that represent at least one of an application status, a system status, and a notification; (b) receiving a first input requesting access to a customization mode; (c) retrieving a current speed of a vehicle; (d) activating the customization mode if the current speed of the vehicle is zero; (e) receiving a second input indicating a desired change to at least one of the active page and the toolbar; and (f) changing the display based on the desired change. The resulting technical effect is that a user is able to more safely operate an infotainment system in a vehicle.

In some embodiments, the technical effect of the systems and processes described herein is achieved by performing at least one of the following steps: (a) receiving the current speed of the vehicle while the customization mode is active; and (b) exiting the customization mode if the current speed of the vehicle is greater than a predetermined speed, such as zero.

In some further embodiments, the technical effect of the systems and processes described herein is achieved by performing at least one of the following steps: (a) receiving an input selecting the audio source icon; (b) displaying a menu of audio sources; (c) receiving a user selection of an audio source from the menu of audio sources; (d) activating the selected audio source; (e) displaying an icon associated with the selected audio source in the audio source icon; (f) displaying information associated with the selected audio source option in the audio information block; (g) receiving an input selecting the indicator area; and (h) displaying one or more items associated with the one or more icons displayed in the indicator area.

In some further embodiments, the technical effect of the systems and processes described herein is achieved by performing at least one of the following steps: (a) receiving a second input indicating a desired change to the active page, where the second input includes dragging and dropping a button of the plurality of buttons to a location on the active page; (b) positioning the button in the new location; and (c) rearranging the plurality of buttons based on the button being positioned in the new location.

In still further embodiments, the technical effect of the systems and processes described herein is achieved by performing at least one of the following steps: (a) receiving the second input indicating a desired change to the toolbar, where the second input includes dragging and dropping a button of the plurality of buttons to a desired location on the shortcut area; (b) determining which shortcut button of the at least one shortcut button is at the desired location on the shortcut area; (c) replacing the determined shortcut button with a shortcut button associated with the button; (d) receiving the second input indicating a desired change to the toolbar, where the second input includes dragging and dropping a shortcut button of the at least one shortcut button to a desired location on the shortcut area; (e) positioning the shortcut button in the new location; and (f) rearranging the at least one shortcut button in the shortcut area based on the shortcut button being positioned in the new location.

In another embodiment, a computer program is provided, and the program is embodied on a computer-readable medium. In an exemplary embodiment, the system is executed on a single computer system, without requiring a connection to a server computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In at least one embodiment, a system is provided that communicates between a plurality of components using a bus architecture. In these embodiments, the bus architecture may include a serial bus, where data is transmitted in a bit-serial form. In some embodiments, the bus architecture may include a parallel bus, where data is transmitted as words. Data transmitted on the bus architecture may be formatted into messages, where each message is directed to one or more components of the plurality of components in the system. In some further embodiments, the bus architecture includes Ethernet connections between some or all of the plurality of components.

In some embodiments, the system includes the Controller area network ("CAN bus"), which is a serial bus. The CAN bus allows the components of the system to communication without a host computer to control the communication. In the CAN bus, each component is capable of transmitting and receiving messages. For example, a system includes components A, B, and C on a CAN bus. In this example, component A transmits through the CAN bus a message addressed to component C. Both components B and C receive the message. Component B discards or ignores the message and component C receives and potentially acts on the message.

In some embodiments, the system includes the Media Oriented Systems Transport (MOST) bus. (MOST® is a registered trademark of Standard Microsystems Corporation of Hauppauge, N.Y.). The MOST bus uses a ring topology for synchronous data communication to transport audio, video, voice, and data signals between a plurality of components.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The terms "click," "select," "drag," and "drop" refer to user interactions with items on a touchscreen. A user may make contact with a button by pressing on the corresponding image on the touchscreen. If the user makes contact and releases under a predetermine period of time, then that is considered a "click" of the button and the associated controller performs the corresponding action. If the user makes contact with a button for at least a predetermined period of time (i.e. greater than a second), then that button may be considered "selected." While the user continues contact with the touchscreen, the image of the selected button moves along with the user's touch. This is considered "dragging." If the user releases the selected button after dragging, that is considered "dropping" the button or items, and the controller performs appropriate actions such as those described herein.

In some situations, when a user is dragging an item, the item may have an area larger than the user's contact. In some embodiments, the drop location of the item may be based on the position of a part of the item, such as a corner of a button. In other embodiments, the drop location of the item may be based on the actual position of the user's contact on the touchscreen when the user releases the selected item. In these embodiments, the item or button may overlap multiple locations and the system uses the finger contact location to prevent confusion. As used herein, the system may use either method of determining the drop location.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

FIG. 1 is an exemplary infotainment system display 100 including an active page 104 and a toolbar 106 in accordance with one embodiment of the present disclosure. In the exemplary embodiment, infotainment system display 100 is a component of an infotainment system controller 205 (shown in FIG. 2) that is included in a vehicle (not shown). Moreover, in the exemplary embodiment, infotainment system display 100 is positioned in a dashboard (not shown) of a vehicle (not shown), where the driver and the front passenger may access infotainment system display 100. In one exemplary embodiment, infotainment system display 100 is implemented on a touchscreen. In the exemplary embodiment, infotainment system display 100 displays controls to a user (not shown) that enable the user to access entertainment options and climate controls. In the exemplary embodiment, infotainment system display 100 includes a screen view 102 that displays active page 104 and toolbar 106.

Infotainment system display 100 includes an active page 104 that includes a plurality of virtual buttons 108. Each virtual button 108 links to a different application or to a sub-page. Sub-pages may include one or more options or settings that the user may change. Moreover, sub-pages may also include a series of additional buttons 108. In some embodiments, when the user contacts a button 108, infotainment system display 100 displays a new active page 104 associated with that specific button 108. In other embodiments, infotainment system display 100 displays a pop-up window associated with the button 108 when the button 108 is clicked.

In the exemplary embodiment, infotainment system display 100 includes a plurality of active pages 104 that include buttons 108. Specifically in this exemplary embodiment, infotainment system display 100 includes a next page button 110 that enables the user to selectively scroll to the next page of buttons 108. In some embodiments, next page button 110 causes infotainment system display 100 to display an entire new set of buttons 108 on a different active page 104. In other embodiments, next page button 110 scrolls through the buttons 108 by displaying one new column of buttons 108 at a time. In some embodiments, infotainment system display 100 also includes a previous page button 111 that enables the user to selectively scroll to a previous page of buttons 108 when the user clicks the previous page button 111. In some further embodiments, infotainment system display 100 does not display or greys out previous page button 111 when active page 104 is the first page of buttons 108, aka where there is no previous page of buttons 108 to display. In these embodiments, infotainment system display 100 does not display or greys out next page button 110 when active page 104 is the last page of buttons 108, aka where there is no next page of buttons to display.

Infotainment system display 100 includes a plurality of page indicators 112 that indicate the other pages of buttons 108 that are available to the user. For example, in the exemplary embodiment, infotainment system display 100 also includes a current page indicator 114 that shows which page of the plurality of pages the user is on. In some embodiments, the user may select one of the page indicators 112 to cause infotainment system display 100 to display the corresponding page as the active page 104.

In the exemplary embodiment, infotainment system display 100 also includes a toolbar 106. In some embodiments, toolbar 106 includes a shortcut bar 116 (also known as a shortcut area), an audio information bar 120, an indicator area 128, and a clock display 132. In other embodiments, toolbar 106 may include more or less bars or options, as is necessary. Shortcut bar 116 includes a plurality of shortcut buttons 118. Each of the shortcut buttons 118 is a link to an active button 108 that is configured, such that if the shortcut button 118 is clicked, it causes infotainment system display 100 to perform as if the corresponding button 108 was clicked on. In the exemplary embodiment, shortcut bar 116 is positioned on the side of toolbar 106 closest to the driver. This allows the driver easy access and view of shortcut bar 116. In the exemplary embodiment, shortcut bar 116 is limited to a maximum of three shortcut buttons 118. This limitation reduces the choices that driver has to press thereby reducing the chance of the driver contacting the wrong shortcut button 118. It also reduces the number of items (shortcut buttons 118) that the driver needs to look at to pick the one that he or she wants to activate. In the exemplary embodiment, shortcut bar 116 is further limited to prevent duplicate shortcut buttons 118. Each shortcut button 118 on shortcut bar 116 must be associated with a different button 108.

Audio information bar 120 includes an audio icon 122 and audio information 124. Audio icon 122 represents the currently selected audio source. In the exemplary embodiment, audio icon 122 is similar to an icon on the button 108 associated with the selected audio source. Audio information 124 includes information about the currently active audio source, such as, but not limited to, the song currently playing, the artist currently playing, the frequency of the current station, the name of the current station, the name of the current program, phone number or contact name, call time, an error message, and volume feedback. In the exemplary embodiment, if the information contained in audio information 124 is longer, i.e., includes more characters than can be displayed in the space available on audio information bar 120, then audio information 124 terminates in an ellipse (" . . . "). In the exemplary embodiment, audio information 124 is static and does not scroll or animate to facilitate preventing the driver from being distracted by movement on infotainment system display 100.

Figure 10:
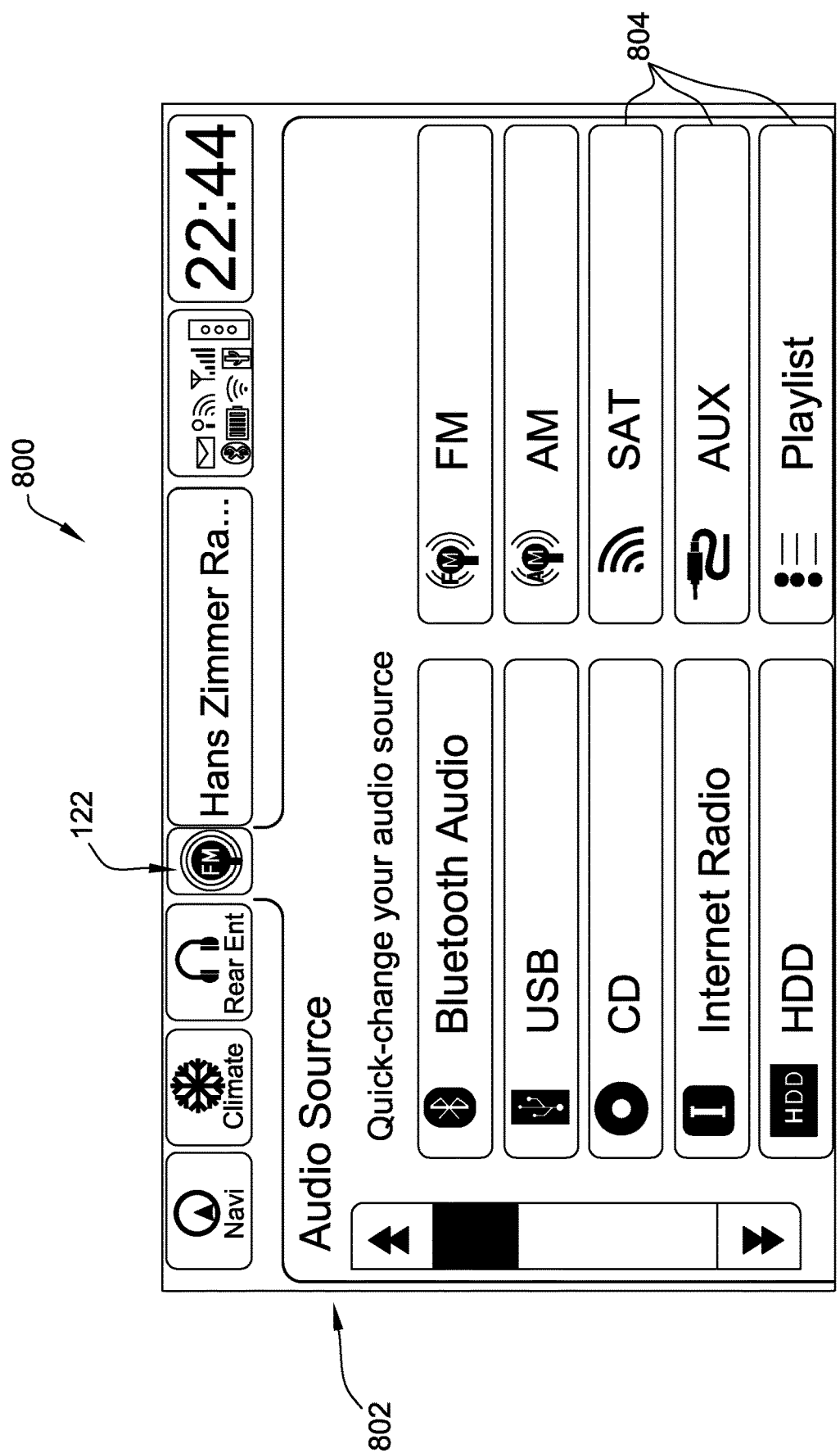
Figure 20A:
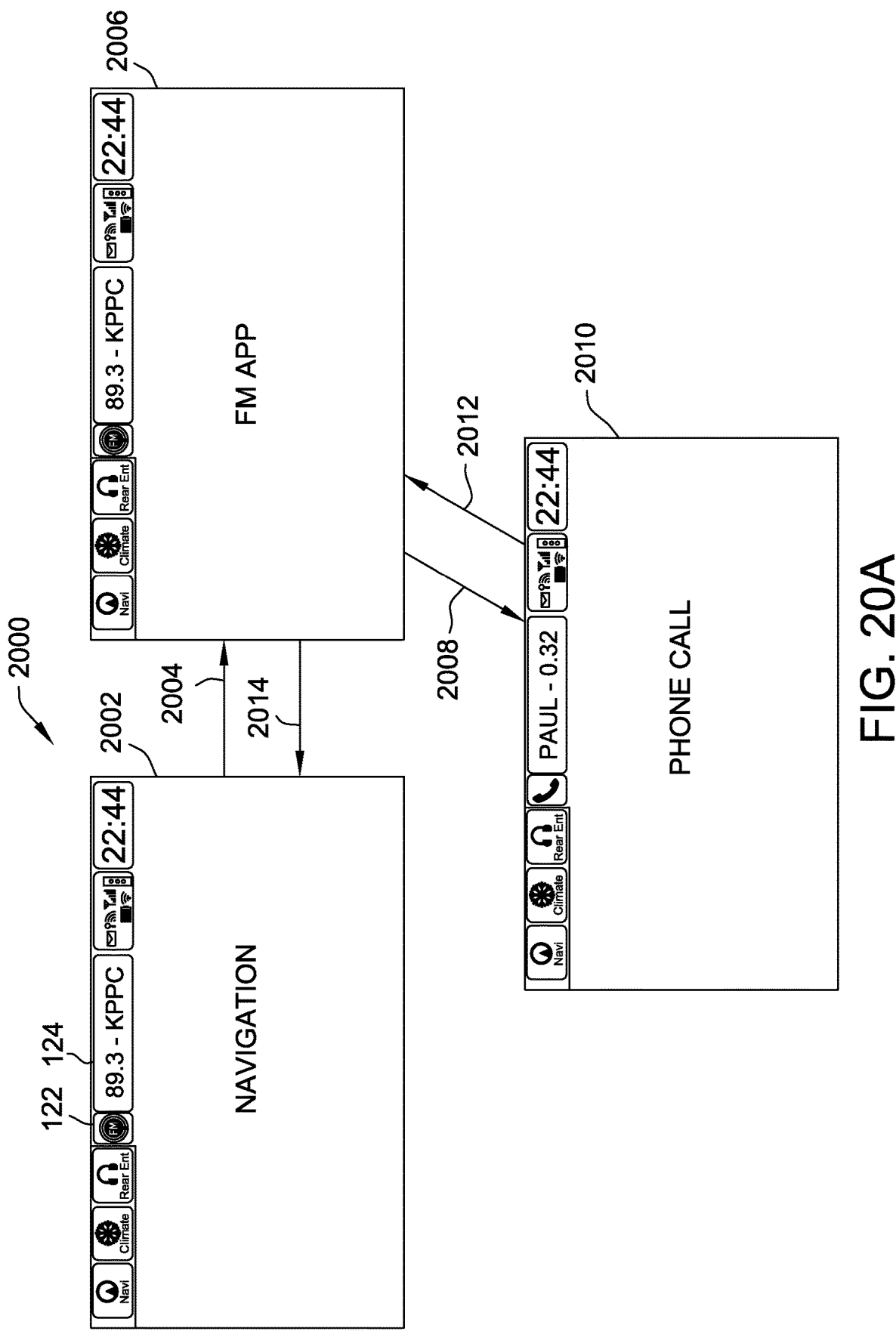

When audio icon 122 is clicked, a selectable menu of audio sources opens, as shown in FIG. 10. As shown in FIG. 20A, when audio information 124 is clicked, the app associated with the current audio source opens. When there is no audio playing and no active phone call, then no transition to another page is initiated when audio information 124 is clicked on.

In the exemplary embodiment, audio information bar 120 is positioned in the middle of toolbar 106 so that it is accessible by both the driver and the front passenger. This allows both the driver and the passenger easy access and view of audio information bar 120. In addition, audio icon 122 is positioned on the side of audio information bar 120 closest to the driver to facilitate easy access by the driver to audio sources menu 802 shown in FIG. 10.

Figure 13:
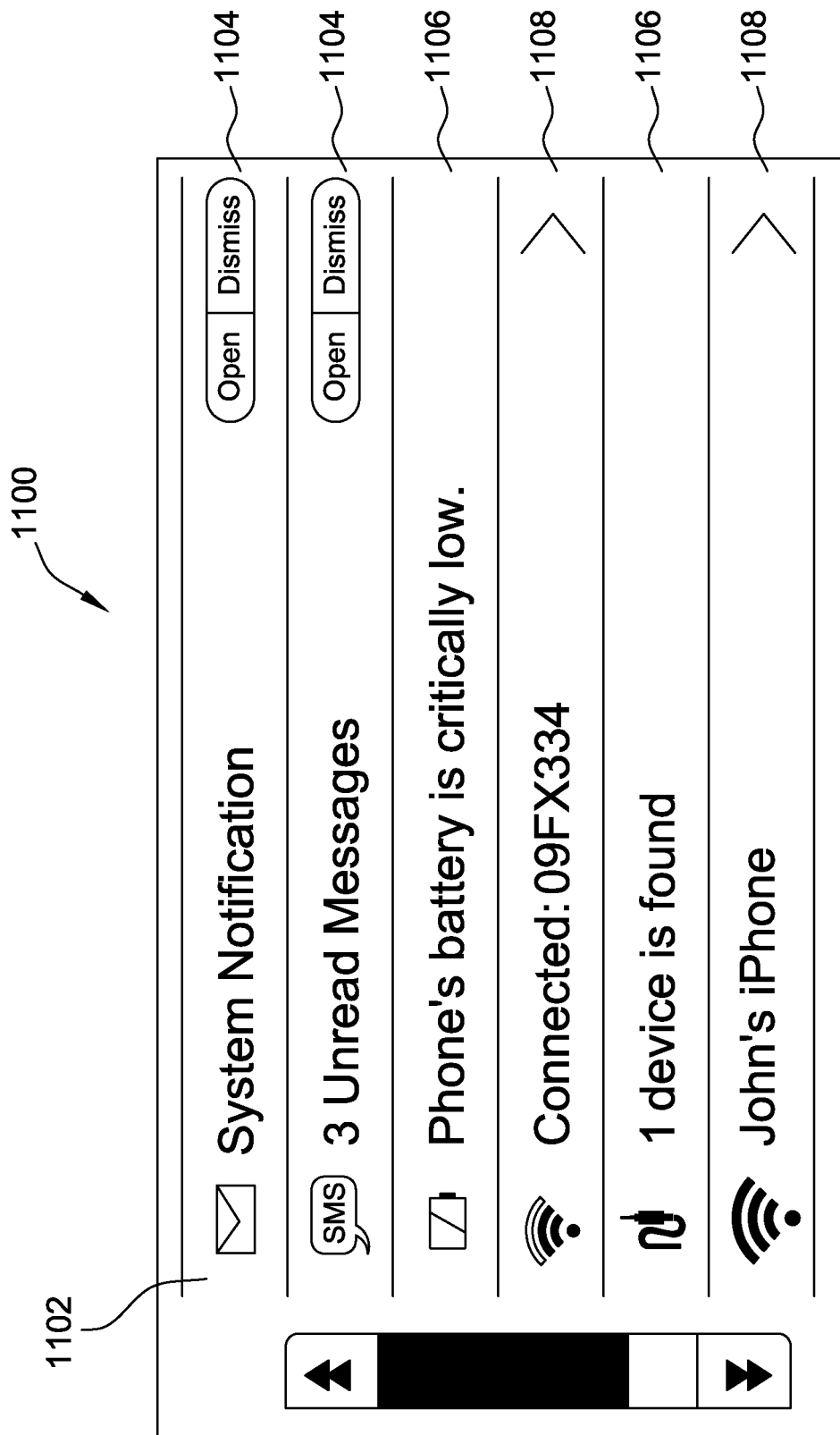

In the exemplary embodiment, indicator area 128 displays a plurality of indicator icons 130. Each indicator icon 130 corresponds to a different notification and system status that infotainment system controller 205 has either received or determined that should be displayed to the user. Indictor area 128 is positioned on toolbar 106 to farther away from driver than shortcut bar 116 and audio information bar 120. This limits the driver's access to indicator area 128 while actively driving. This positioning also reduces the chance that the driver may see a change to the indicator icons 130 in indicator area 128 and be distracted while actively driving. Clicking on indicator area 128 opens a list of items associated with indicator icons 130, as shown in FIG. 13.

Clicking on clock display 132 opens a clock page.

In the exemplary embodiment, infotainment system display 100 also includes an all apps button 134 when in normal operations. When all apps button 134 is clicked, an all apps menu 1802 (shown in FIG. 18) is displayed.

In some embodiments, the positions of shortcut bar 116 and audio information bar 120 are switched, where audio information bar 120 is to the left of shortcut bar 116. In some further embodiments, the user may switch the position of shortcut bar 116 and audio information bar 120. In these embodiments, the user may switch the locations by selecting audio information bar 120 while in customization mode and dragging audio information bar 120 to shortcut bar 116, when then causes shortcut bar 116 to be shifted to the right. In other embodiments, the user may change a setting to reverse the order of shortcut bar 116 and audio information bar 120.

The above description is based on a left hand drive vehicle. In a right hand drive vehicle, infotainment system display 100 may display a screen view 102 that mirrors that of FIG. 1. For example, toolbar 106 is configured with clock display 132 on the far left side instead of the far right. In this example, from left to right, toolbar 106 may include clock display 132, indicator area 128, audio information bar 120, and shortcut bar 116. In this example, audio icon 122 may be placed to the right of audio information 124 on audio information bar 120. Furthermore, other arrangements that have been described as being situated towards the left or the right may be reversed for a right hand drive vehicle.

Figure 2:
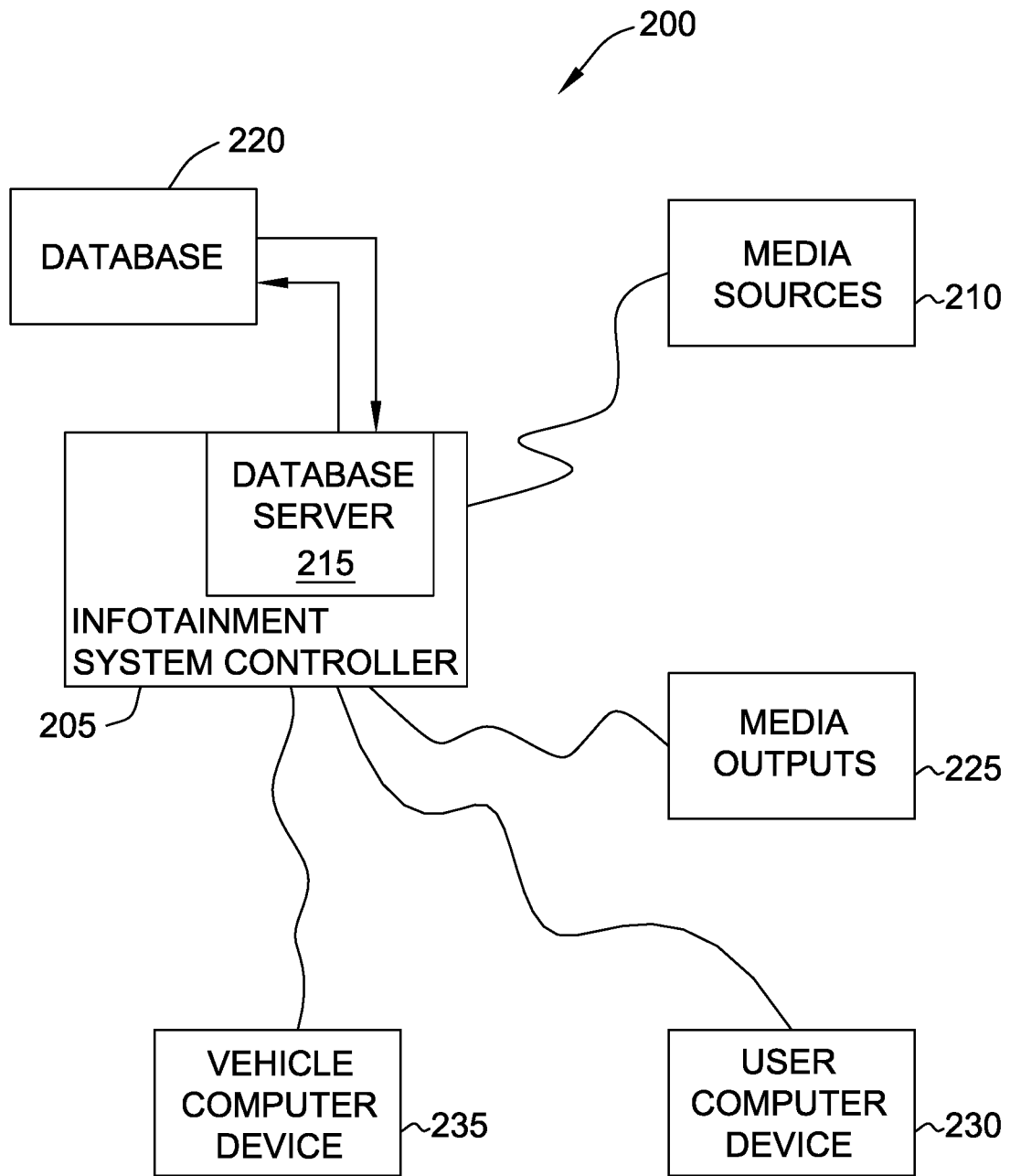

FIG. 2 is a simplified block diagram of an exemplary vehicular infotainment system 200. In the exemplary embodiment, vehicular infotainment system 200 may be used for providing access to controls to a user to enable the user to access entertainment options and climate controls for the vehicle (not shown). In addition, vehicular infotainment system 200 includes an infotainment system controller 205 that controls the various components of infotainment system 200. As described below in more detail, infotainment system controller 205 displays, via infotainment system display 100, a screen view 102 including an active page 104 and a toolbar 106 (all shown in FIG. 1). Active page 104 includes a plurality of buttons 108 and toolbar 106 includes a shortcut bar 116 (also known as a shortcut area) containing a plurality of shortcut buttons 118 (all shown in FIG. 1). As described in greater detail below, infotainment system controller 205 is configured to receive a first user input requesting access to a customization mode, retrieve a current speed of the vehicle, activate the customization mode if the current speed of the vehicle is zero, receive a second user input indicating a desired change to at least one of active page 104 and toolbar 106, and update infotainment system display 100 based on the desired change.

In the exemplary embodiment, infotainment system controller 205 receives playable media from a plurality of media sources 210 and outputs that media to the user through a plurality of media outputs 225 in the vehicle. Examples of media sources 210 include, but are not limited to, AM radio, FM radio, satellite radio, Internet radio, media files in a memory or database 220, user computer devices 230, external memory devices, CD player, tape player, DVD/Blu-ray player, phone connections, navigation systems, and a rear entertainment system (RES). Examples of media outputs 225 include, but are not limited to, infotainment system display 100, one or more view screens, one or more speakers, and the rear entertainment system (RES). Examples of media include, but are not limited to, music, books on tape, videos, movies, playlists, spoken instructions, phone calls, text and other messages, and any other media that can either be displayed, played, or projected to the user. In the exemplary embodiment, infotainment system display 100 is an input/output device of infotainment system 200 that is separate from infotainment system controller 205. In other embodiments, infotainment system display 100 is integrated into infotainment system controller 205. In the exemplary embodiment, infotainment system controller 205 is in communication with one or more media sources 210 through the MOST bus, where the media source 210 transmits information on the MOST bus to infotainment system controller 205. Other media sources 210 may be in communication with infotainment system controller 205 via other communication methods. Furthermore, in the exemplary embodiment, infotainment system controller 205 is in communication with one or more media outputs 225 through the MOST bus.

In some embodiments, infotainment system controller 205 receives input from external controls that provides instruction to infotainment system controller 205. For example, infotainment system controller 205 may be connected to a physical volume controller, such as a volume knob that allows a user to change the volume of one or more media outputs 225 by rotating the knob. In another example, infotainment system controller 205 may also be connected to physical buttons (not shown). These physical buttons may have specific functions. In this example, the three physical buttons include a home button, a back button, and a brightness button. The home button would instruct infotainment system controller 205 to display the leftmost active page 104 on infotainment system display 100. The back button would return to the previous page that was displayed. For example, if the user entered an app by clicking on a button 108, then clicking the back button would return the user to page where the user clicked on the button 108. The brightness button would allow the user to adjust the brightness of infotainment system display 100. Additionally, the user may have access to other external buttons, such as one or more buttons on the steering wheel (not shown), which may provide inputs or instructions to infotainment system controller 205.

One or more user computer devices 230 may be communicatively coupled with infotainment system controller 205 through a wireless network or a wired connection. In the exemplary embodiment, user computer devices 230 are mobile computers that include a software application that enables user computer devices 230 to access infotainment system controller 205 using a wireless or wired connection. Wired connections may include, but are not limited to, a USB connection, an HDMI connection, and any other wired connection that enables communication between user computer device 230 and infotainment system controller 205. Wireless connections include, but are not limited to, Bluetooth, Wi-Fi, Near Field Communication (NFC), and any other wireless connection that allows communication between user computer device 230 and infotainment system controller 205. User computer devices 230 may also be connected to the Internet. More specifically, user computer devices 230 are communicatively coupled to the Internet through many interfaces including, but not limited to, at least one of a network, a local area network (LAN), a wide area network (WAN), or an integrated services digital network (ISDN), a dial-up-connection, a digital subscriber line (DSL), a cellular phone connection, and a cable modem. User computer devices 230 can be any device capable of accessing the Internet or connecting to infotainment system controller 205 including, but not limited to, a USB memory stick, a portable hard drive, a desktop computer, a laptop computer, a personal digital assistant (PDA), a cellular phone, a smartphone, a tablet, a phablet, a smart watch, or other connectable equipment. In the exemplary embodiment, the user instructs user computer devices 230 to access infotainment system 200 to provide one or more data source options to infotainment system 200, such as, but not limited to, stored audio/video files, phone calls, and navigation information.

A database server 215 is communicatively coupled to a database 220 that stores data. In one embodiment, database 220 includes customization options, audio/video files, and system options. In the exemplary embodiment, database 220 is stored remotely from infotainment system controller 205. In some embodiments, database 220 is decentralized. In the exemplary embodiment, a person can access database 220 via user computer devices 230 by logging onto infotainment system controller 205, as described herein.

In the exemplary embodiment, infotainment system controller 205 is in communication with one or more vehicle computer devices 235. Vehicle computer devices 235 control different aspects of vehicle operation. In some embodiments, vehicle computer device 235 is attached to the Controller Area Network (CAN bus) for the vehicle. In these embodiments, vehicle computer device 235 is in communication with one or more electronic control units (ECU) that control the operation of the vehicle. In other embodiments, vehicle computer device 235 merely receives messages from one or more ECUs. In the exemplary embodiment, vehicle computer device 235 determines the current speed or gear of the vehicle and transmits that information to infotainment system controller 205.

Figure 3:
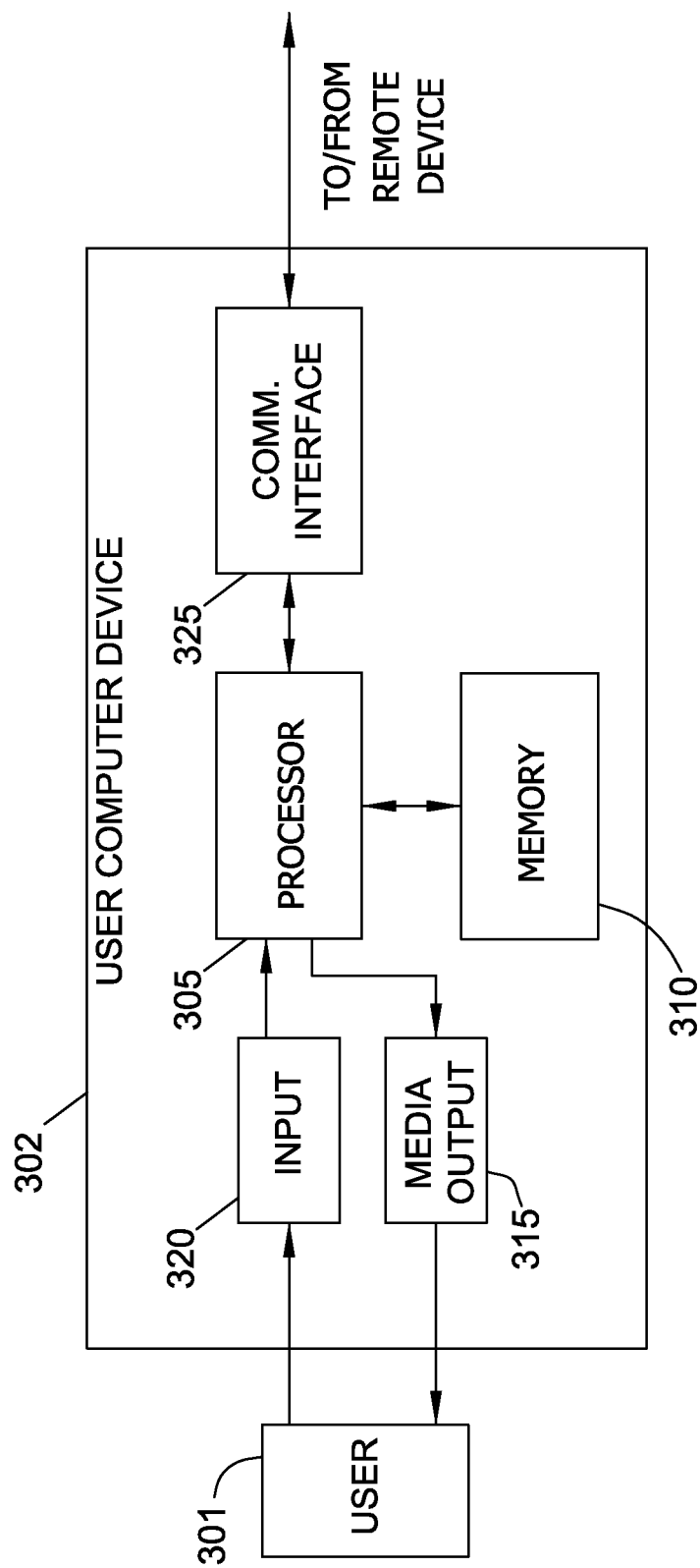

FIG. 3 illustrates an exemplary configuration of a client system shown in FIG. 2, in accordance with one embodiment of the present disclosure. User computer device 302 is operated by a user 301. User computer device 302 may include, but is not limited to, media sources 210, media outputs 225, user computer devices 230, vehicle computer devices 235 (all shown in FIG. 1), and infotainment system display 100 (shown in FIG. 1). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer-readable media.

User computer device 302 also includes at least one media output component 315 for presenting information to user 301, such as infotainment system display 100. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an audio controller interface for controlling currently playing media. In some embodiments, user computer device 302 includes an input device 320 for receiving input from user 301. User 301 may use input device 320 to, without limitation, select, control, and/or enter an audio source to listen to, or to rearrange at least one of active page 104 and toolbar 106. Input device 320 may include, for example, a keyboard, a pointing device, a mouse, a stylus, a touch sensitive panel (e.g., a touch pad or a touchscreen), a gyroscope, an accelerometer, a position detector, a biometric input device, and/or an audio input device. A single component such as a touchscreen may function as both an output device of media output component 315 and input device 320.

User computer device 302 may also include a communication interface 325, communicatively coupled to a remote device such as infotainment system controller 205 (shown in FIG. 2). Communication interface 325 may include, for example, a wired or wireless network adapter and/or a wireless data transceiver for use with a mobile telecommunications network.

Stored in memory area 310 are, for example, computer-readable instructions for providing a user interface to user 301 via media output component 315 and, optionally, receiving and processing input from input device 320. The user interface may include, among other possibilities, a web browser and/or a client application. A client application enables user 301 to interact with, for example, infotainment system controller 205. For example, instructions may be stored by a cloud service and the output of the execution of the instructions sent to the media output component 315.

Figure 4:
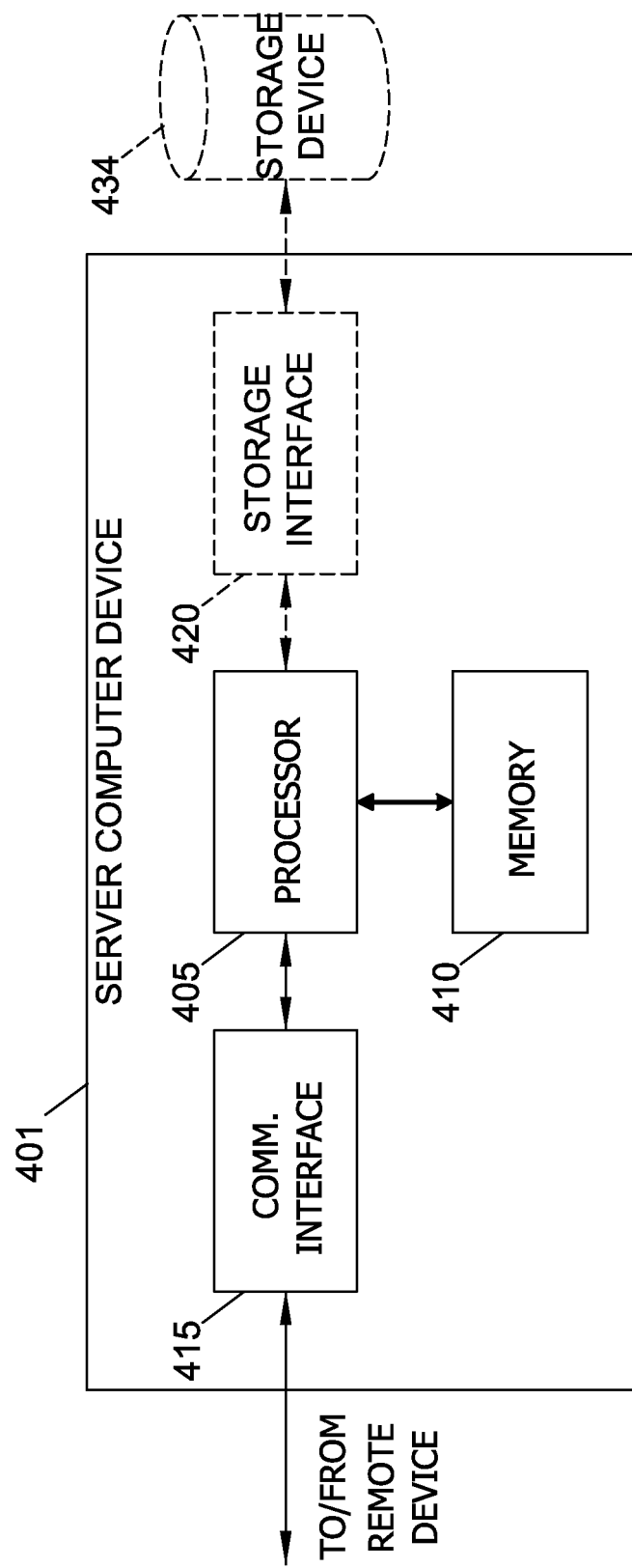

FIG. 4 illustrates an exemplary configuration of a server system shown in FIG. 2, in accordance with one embodiment of the present disclosure. Server computer device 401 may include, but is not limited to, database server 215, infotainment system controller 205, and vehicle computer device 235 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, media sources 210, media outputs 225, user computer devices 230, or infotainment system controller 205 (all shown in FIG. 2). For example, communication interface 415 may receive requests from user computer device 230.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 14:
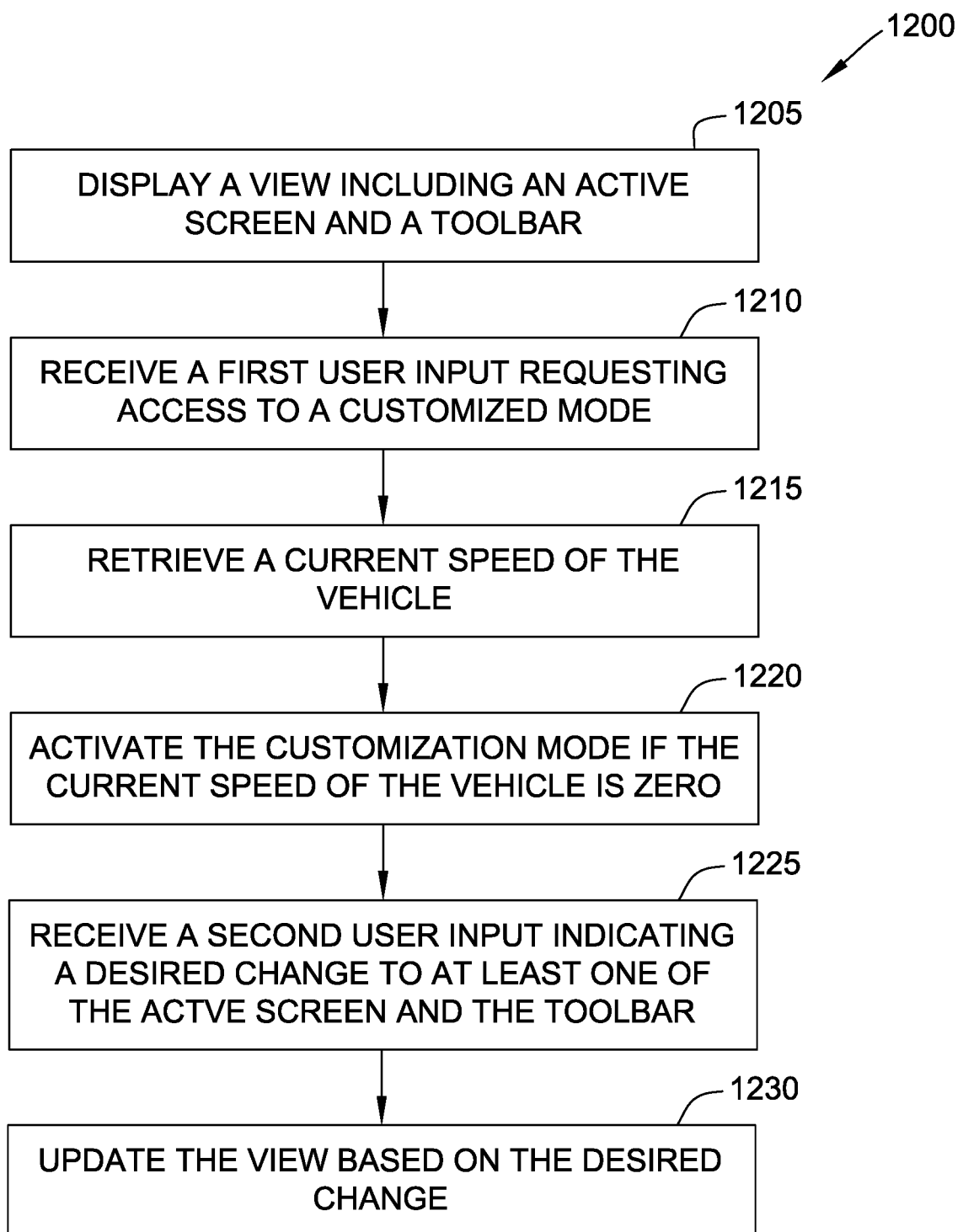

Processor 405 executes computer-executable instructions for implementing aspects of the disclosure. In some embodiments, processor 405 is transformed into a special purpose microprocessor by executing computer-executable instructions or by otherwise being programmed. For example, processor 405 is programmed with the instructions such as are illustrated in FIGS. 5 and 14.

Figure 5:
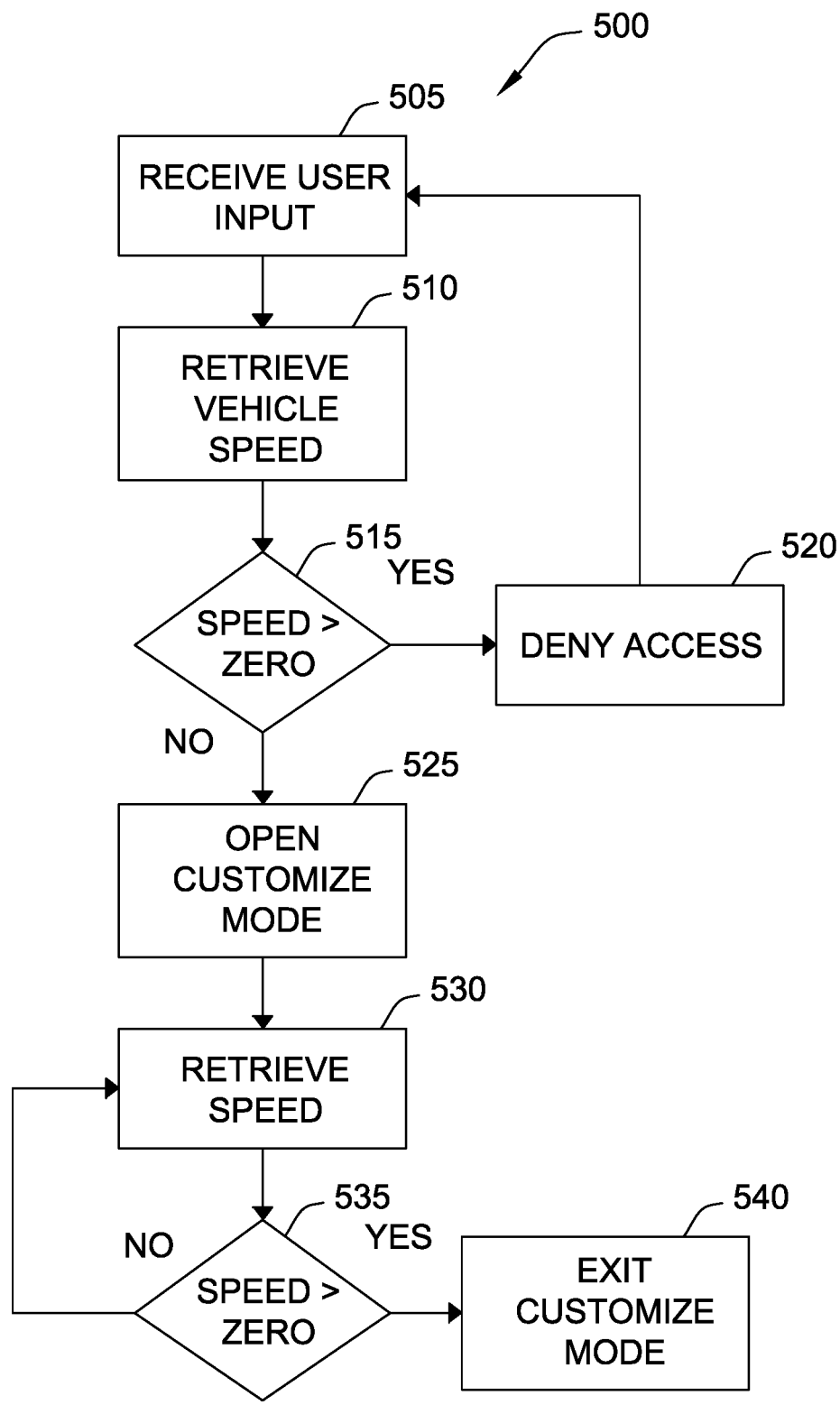

FIG. 5 is a flow chart of a process 500 for use in controlling a user's access to a customization mode using system 200 shown in FIG. 2. In the exemplary embodiment, process 500 is performed by infotainment system controller 205 (shown in FIG. 2).

In the exemplary embodiment, infotainment system controller 205 receives 505 user input requesting entry into a customization mode. In the exemplary embodiment, infotainment system display 100 is displaying a view similar to screen view 102 (both shown in FIG. 1). Infotainment system display 100 receives an input from the user, such a long contact on a button 108 or shortcut bar 116 (both shown in FIG. 1). In some embodiments, infotainment system display 100 transmits the user action in real-time to infotainment system controller 205, such as indicating that a user contact is occurring at x and y coordinates. In other embodiments, infotainment system display 100 determines that the user action is a long contact in a location where a long contact activates customization mode and transmits an indication of such to infotainment system controller 205.

In response to receiving 505 the user input that the user has selected to enter the customization mode, infotainment system controller 205 retrieves 510 the current speed of the vehicle. In the exemplary embodiment, infotainment system controller 205 retrieves 510 the current speed of the vehicle from vehicle computer device 235 (shown in FIG. 2) that may receive the speed of the vehicle from an ECU on the CAN bus. In other embodiments, infotainment system controller 205 retrieves 510 the current speed of the vehicle from a user computer device 230 (shown in FIG. 2) with a Global Positioning System (GPS) unit or other location tracking unit that is capable of determining the speed of the vehicle.

Infotainment system controller 205 determines 515 if the speed of the vehicle is greater than zero. If the speed of the vehicle is greater than zero, infotainment system controller 205 denies 520 the user access to the customization mode. In some embodiments, infotainment system controller 205 causes a pop-up window to be displayed that tells the user that customization mode is not available while the vehicle is in motion.

If the speed of the vehicle is zero, infotainment system controller 205 opens 525 the customization mode. While customization mode is open or active, infotainment system controller 205 retrieves 530 the current vehicle speed, such as through vehicle computer device 235. Infotainment system controller 205 determines 535 if the speed of the vehicle is greater than zero. If the speed of the vehicle is greater than zero, infotainment system controller 205 exits 540 customization mode. If the speed of the vehicle is still zero, then infotainment system controller 205 continues to monitor of the speed of the vehicle while customization mode is active.

For example, if a vehicle is stopped at a red light and user attempts to access customization mode, infotainment system controller 205 will determine that the vehicle is not moving and open 525 customization mode. However, when the light turns green and the vehicle begins to move, infotainment system controller 205 will exit 540 the customization mode.

In other embodiments, infotainment system controller 205 may limit access to customization mode when the vehicle speed is below a predetermined speed but greater than zero, such as 10 miles an hour. In still other embodiments, infotainment system controller 205 may limit access to customization mode based on the gear which the vehicle is in, such as only allowing access to customization mode when the vehicle is in park or neutral. In these embodiments, infotainment system controller 205 may determine the speed or gear of the vehicle from vehicle computer device 235.

FIGS. 6A-6E illustrate exemplary views 600 of a use case for moving buttons in a customization mode using system 200 shown in FIG. 2. In the exemplary embodiment, customization mode is a special mode of infotainment system 200 that enables a user to personalize the locations of the functions of infotainment system 200. In the exemplary embodiment, infotainment system display 100 displays view 600 of customization mode. View 600 covers up the audio information bar 120 (shown in FIG. 1) and adds a hide app button 602 and a done button 610.

The user may activate customization mode by make a long contact with infotainment system display 100. In the exemplary embodiment, user pushes and holds one of button 108 or shortcut button 118 for a predetermined period of time, i.e. 1000 ms, to request activation of customization mode. If the vehicle speed is zero, then infotainment system controller 205 (shown in FIG. 2) activates customization mode.

Figure 6A:
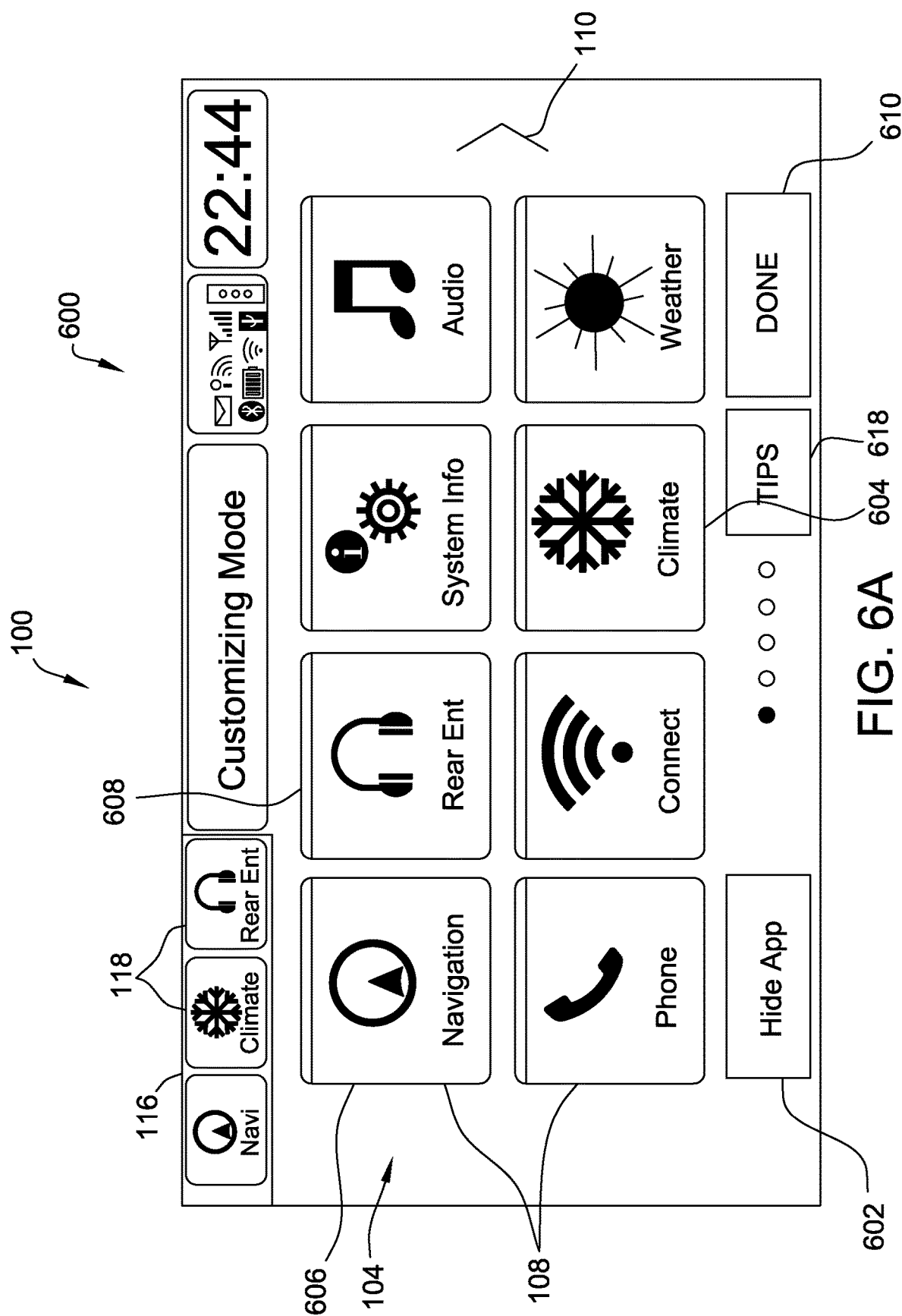
FIGS. 6A-6E illustrate exemplary views of a use case for moving buttons in a customization mode using the system shown in FIG. 2.
Figure 6B:
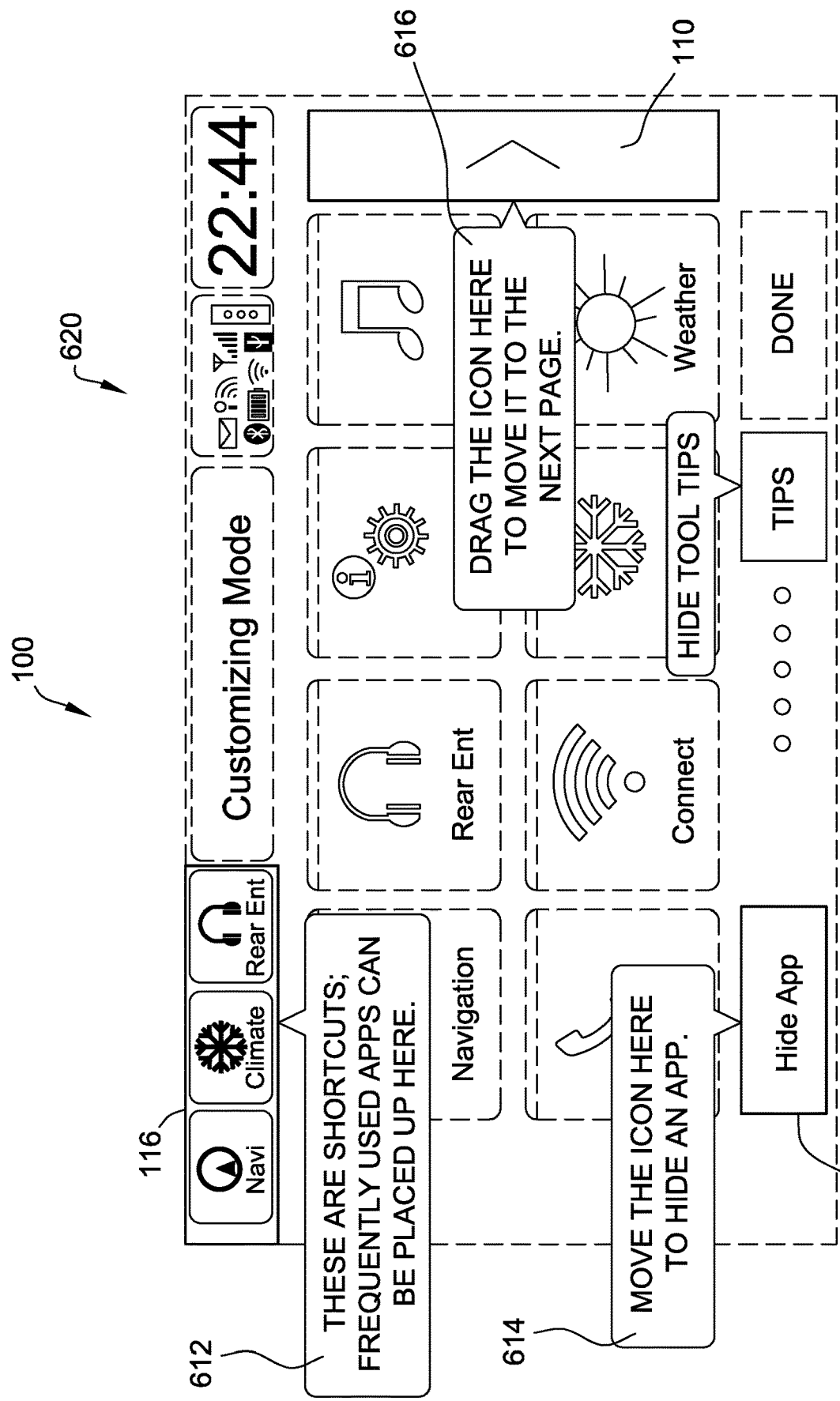

In the exemplary embodiment, when customization mode is entered, the infotainment system display 100 displays a view 620 as shown in FIG. 6B. If an app or sub-page is open when customization mode is activated, infotainment system controller 205 exits the app or sub-page and displays view 620. In some embodiments, customization mode defaults to displaying the left-most active page 104 by default. In other embodiments, customization mode shows the most recently used active page 104. In FIG. 6B, infotainment system display 100 greys out the majority of the page. Shortcut bar 116, hide app button 602, next page button 110, and tool tip button 618 are highlighted and have tooltips 612, 614, 616, and 622 associated with them. Each tooltip 612, 614, 616, and 622 explains what actions the user may perform during customization mode. For example, the tooltip 614 associated with hide app button 602 explains that the user may move a button 108 to that location to hide the associated app. In the exemplary embodiment, when the user clicks on infotainment system display 100 again or moves the position of their contact, infotainment system display 100 changes from view 620 to view 600.

In some embodiments, tool tip button 618 allows the user to hide tooltips 612, 614, 616, and 622 and transition from view 620 to view 600. In other embodiments, tool tip button 618 allows the user to bring tooltips 612, 614, 616, and 622 back up, transitioning from view 600 to view 620. In still further embodiments, tool tip button 618 allows the user to hide tooltips 612, 614, 616, and 622, so that they are not displayed when the user enters customization mode in the future. For example, after the user clicks tool tip button 618, infotainment system controller 205 opens customization mode into view 600 instead of view 620. The user may reverse this setting by clicking tool tip button 618.

In some embodiments, when in customization mode, infotainment system display 100 does not display background colors of buttons 108. In these embodiments, during non-customization mode, buttons 108 are displayed having backgrounds that are filled in with various colors and/or textures. For example, each button 108 may have a different background color. These background colors may be set by the user, by the app associated with the button 108, by the system, or any combination thereof. When customization mode is entered, infotainment system display 100 suppresses these background colors and textures for a more simplified view of active page 104. This also serves as another visual reminder that the customization mode is active. In these embodiments, the color of the icon and/or text of the button remains the same regardless of mode.

In the exemplary embodiment, to exit customization mode the user may click done button 610. In some embodiments, the user may also click the back button or the home button to exit customization mode. In the exemplary embodiment, infotainment system controller 205 also exits customization mode when vehicle computer device 235 reports that the vehicle speed is greater than zero. In some embodiments, the behavior of infotainment system controller 205 when exiting customization mode varies by the method used to exit customization mode. For example, clicking the done button 610 will exit customization mode and save the changes that the user made. In this example, clicking the back button acts as a cancel button where infotainment system controller 205 exits customization mode and does not save the changes that the user made. In some embodiments, exiting customization mode due to speed exceeding zero (or another threshold) saves the changes. In other embodiments, exiting due to speed does not save the changes and reverts to screen view 102 (shown in FIG. 1) displayed prior to entering customization mode. In some further embodiments, the user may set the behavior of the different methods of exiting customization mode.

Figure 6C:
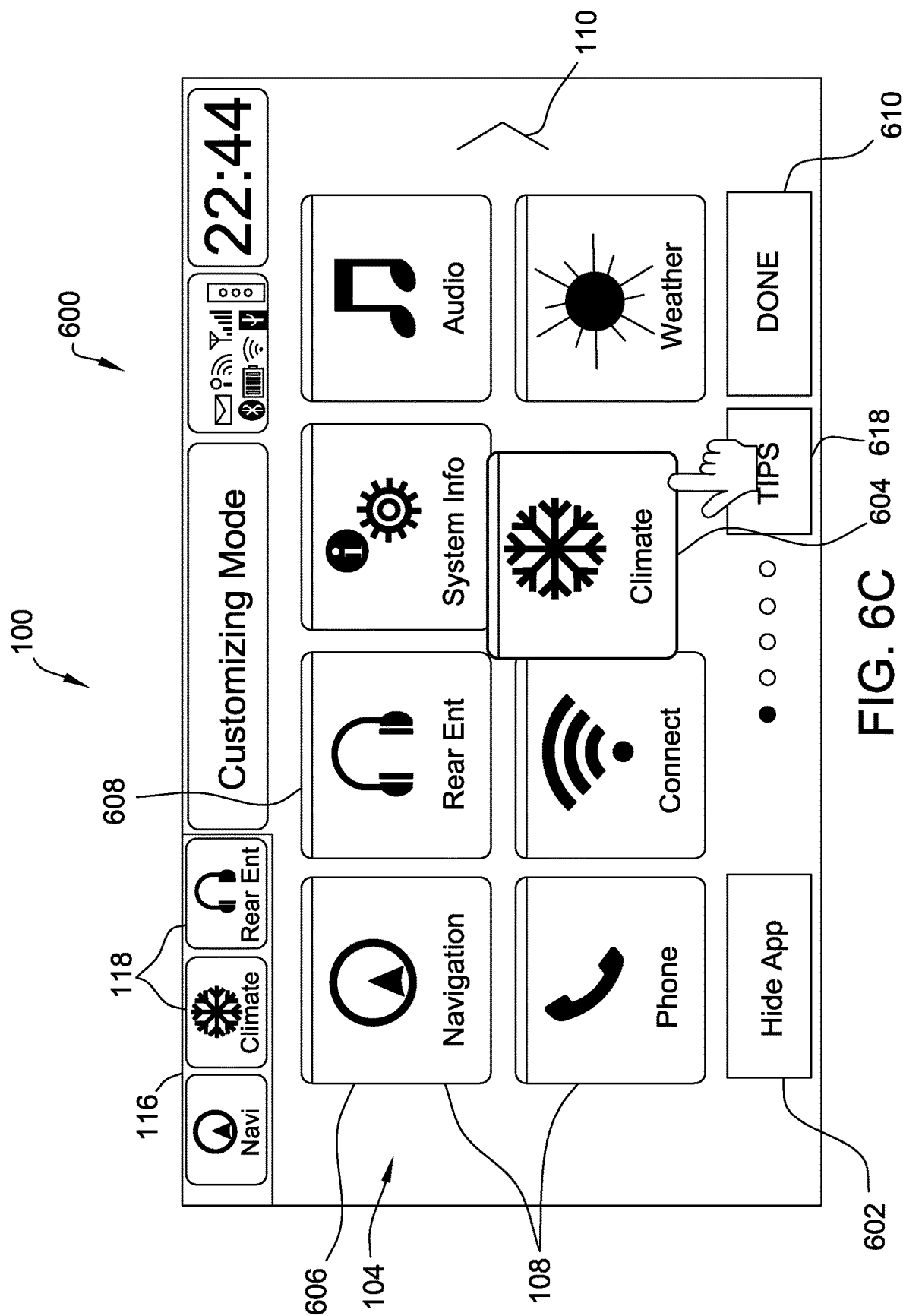
Figure 6D:
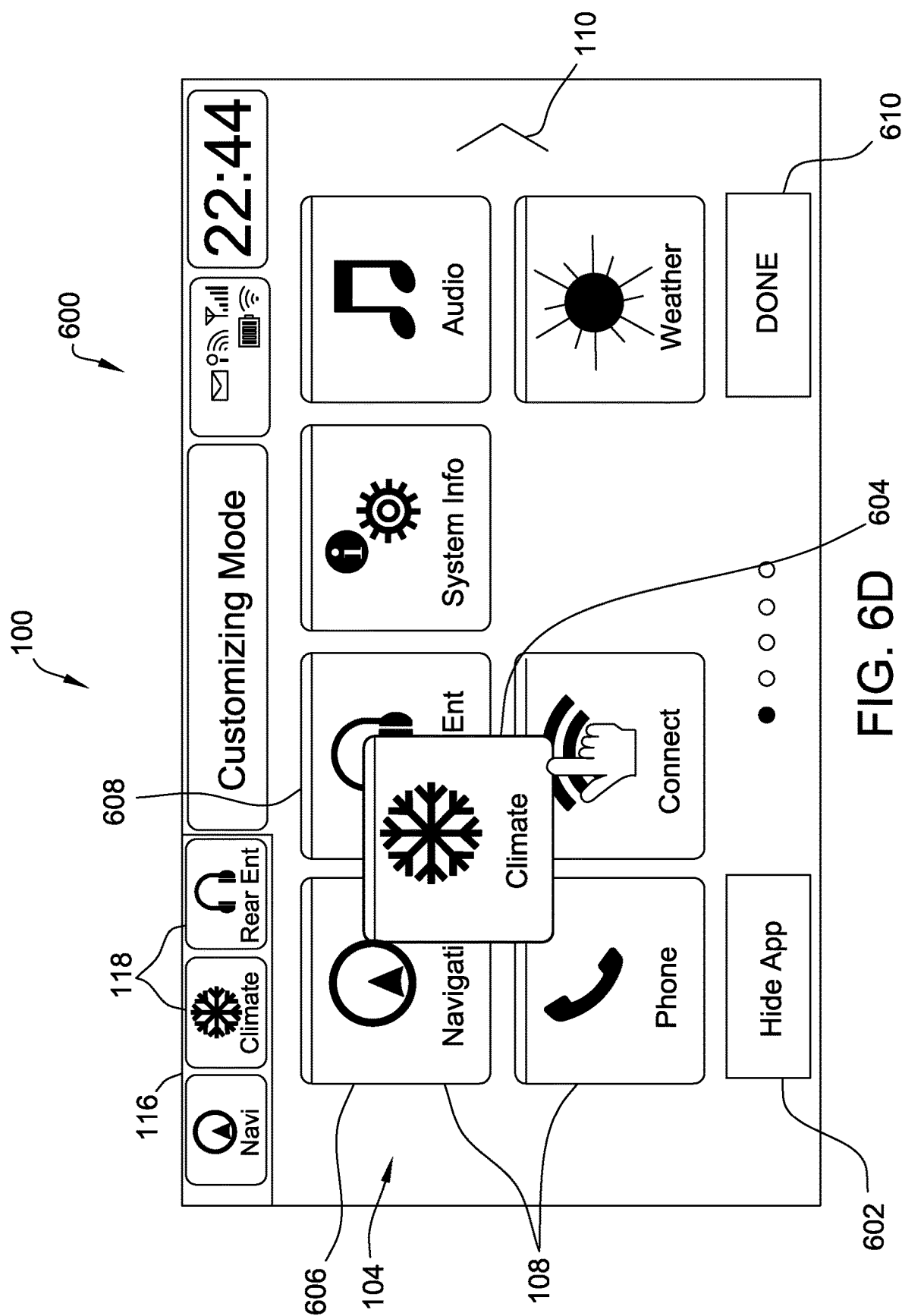
Figure 6E:
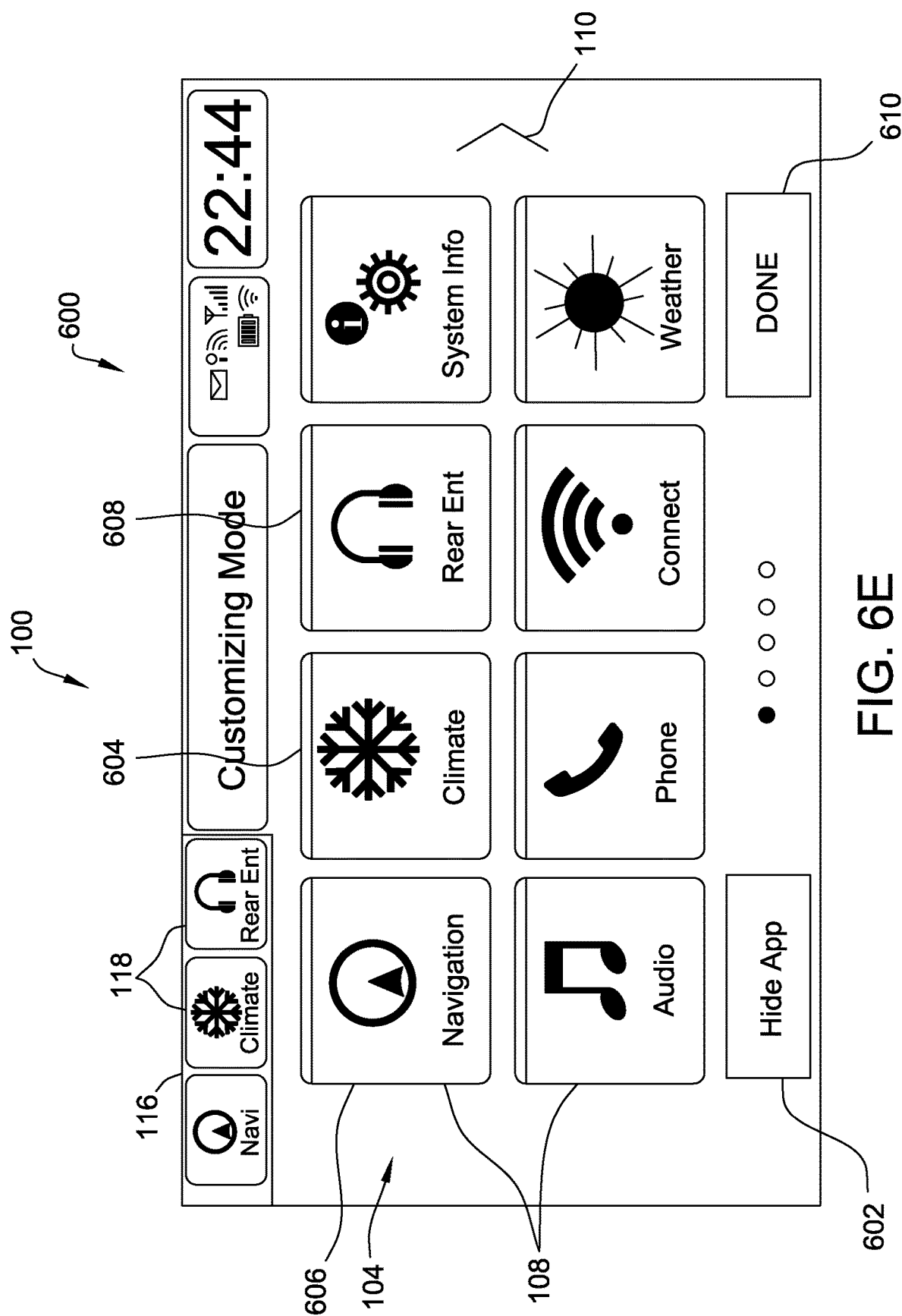

FIGS. 6C-6E illustrate a use case of a user moving a button 108 on active page 104. While in customization mode, the user may rearrange buttons 108 in active page 104. As shown in FIG. 6C, a user may select a button 108, such as the Climate button 604, and begin to drag the selected button 604. In some embodiments, the selected button 604 is highlighted to show its selected status. In other embodiments, the appearance of selected button 604 remains the same and the rest of the icons and/or buttons 108 are whitened to show a contrast. FIG. 6D illustrates where the user has drug the selected button 604 to between the Navigation button 606 and the Rear Ent button 608. When the user has drug the selected button 604 to a different location on active page 104 infotainment system display 100 may display an indicator to show where the selected button would go if it was released at that point. The indicator may be a line that appears between the buttons 606 and 608 that the selected button 604 will be placed between. In some embodiments, the indicator may highlight the button 108 that would be moved. In other embodiments, the appearance of selected button 604 remains the same and the rest of the icons and/or buttons 108 are whitened to show a contrast. In other embodiments, infotainment system controller 205 may rearrange the buttons 108 on active page 104 to show how active page would appear if the selected button 604 was released at that point. In these embodiments, infotainment system controller 205 may animate the transition of the variously affected buttons 108 to show the transition between locations. Every time the selected button 604 is moved to a different location, the indicator would update. In some embodiments, infotainment system controller 205 only moves the indicator or the other buttons when the user has hovered over a spot for a predetermined period of time.

When the user drops the selected button 604, then infotainment system controller 205 places Climate button 604 where Rear Ent button 608 currently is. Infotainment system controller 205 shifts the rest of the buttons 108 on the top row of active page 104 over to the right to accommodate Climate button 604. In the exemplary embodiment, infotainment system controller 205 moves the Audio button 108 down to the left hand side of the bottom row and shift the buttons in the bottom row to fill in the hole made by Climate button 604. In some embodiments, infotainment system display 100 animates the transition. For example, infotainment system display 100 may display the selected button 604 traveling from the release location to its final location. Meanwhile, the affected buttons 108 may be displayed moving to their corresponding new locations. This final rearrangement is illustrated in FIG. 6E.

In other embodiments, infotainment system controller 205 may (1) shift Audio button 108 off of active page 104 and onto the left side of the top row of the next page, (2) shift the button 108 right of the Climate button 604 to the left filling the hole, and (3) shift the leftmost button of the next page into the rightmost spot of the bottom row.

FIGS. 7A-7G illustrate exemplary views 630 of a use case for customizing a shortcut bar in the customization mode using the system shown in FIG. 2.

Figure 7A:
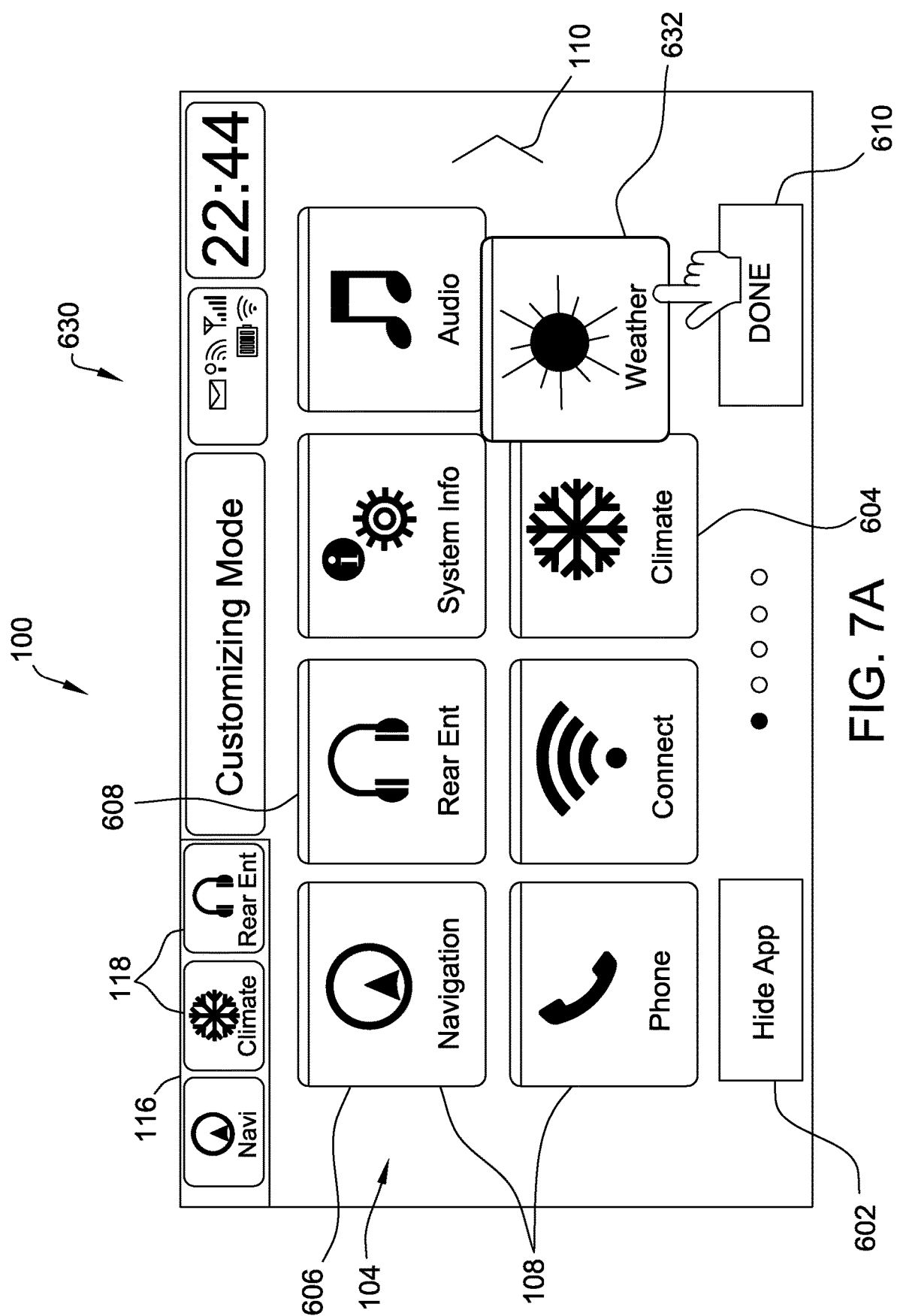
FIGS. 7A-7G illustrate exemplary views of a use case for customizing a shortcut bar in the customization mode using the system shown in FIG. 2.

While in customization mode, the user may move one or more buttons to shortcut bar 116. As shown in FIG. 7A, a user may select a button 108, such as the Weather button 632, and begin to drag the selected button 632. In some embodiments, the selected button 632 is highlighted to show its selected status. In other embodiments, the appearance of selected button 638 remains the same and the rest of the icons and/or buttons 108 are whitened to show a contrast.

Figure 7B:
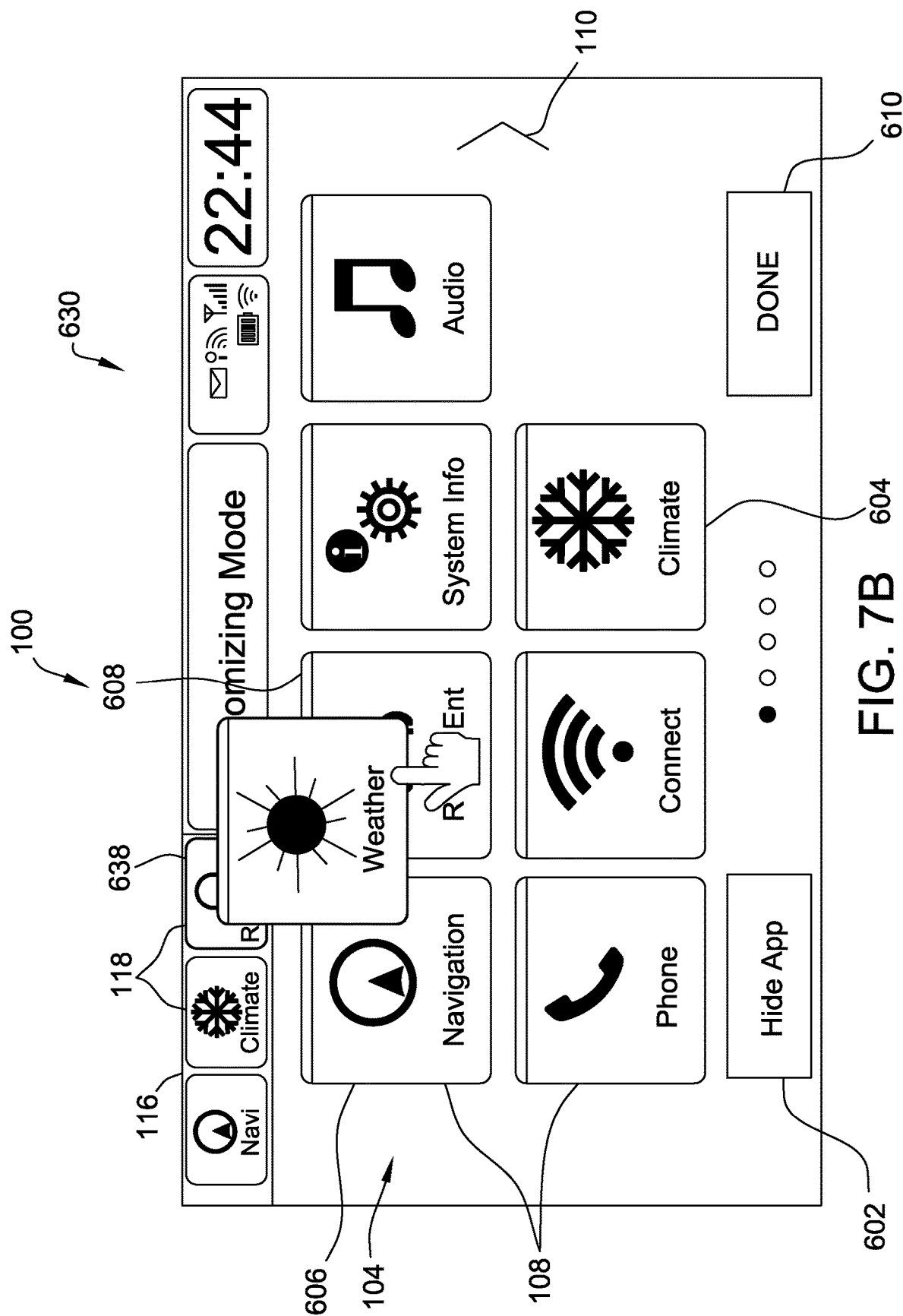
Figure 7C:
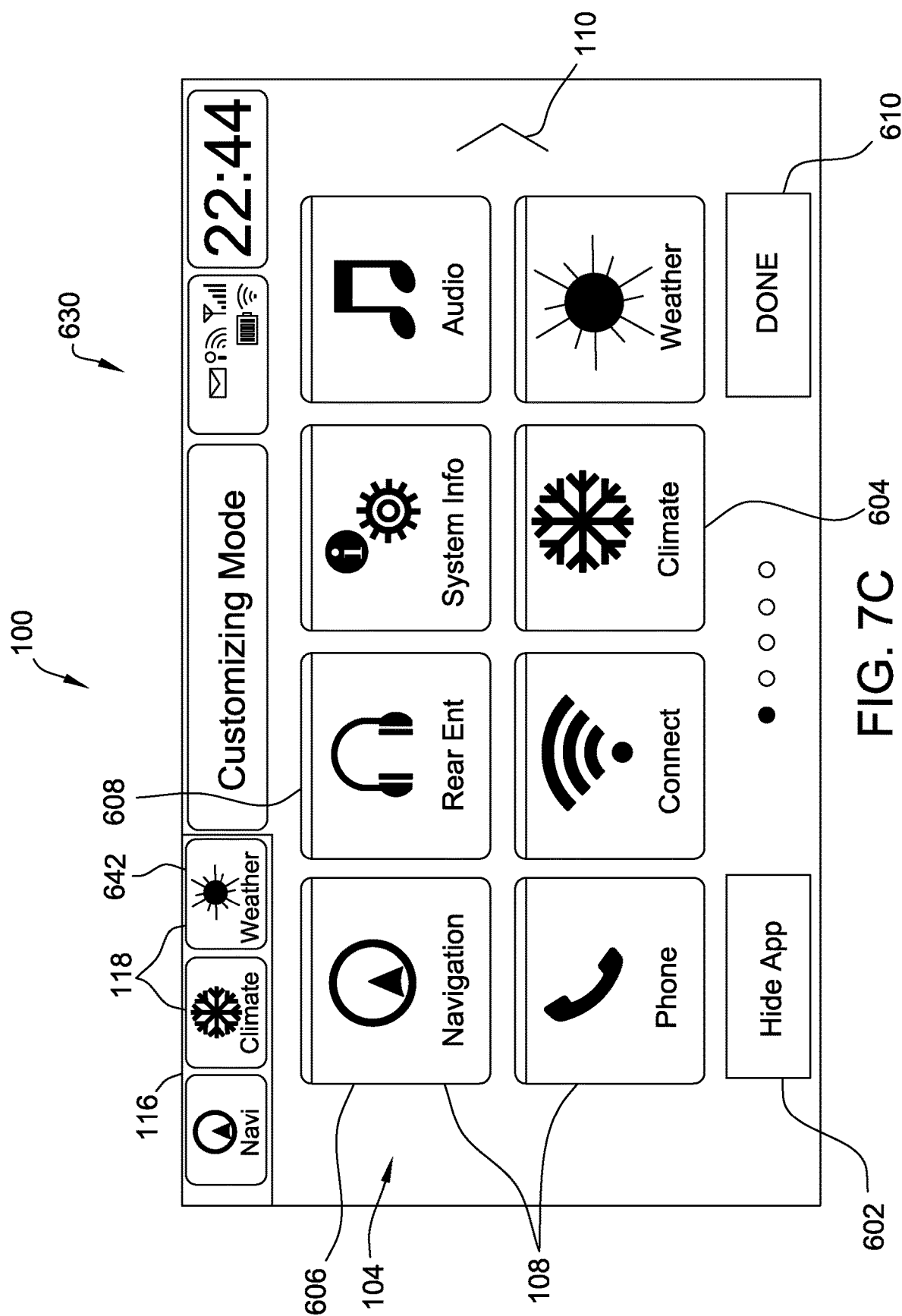

As shown in FIG. 7B, the user may drag the selected button 632 over to shortcut bar 116. The user drags the selected button 632 so that the top left corner of the selected button it over the shortcut button 118 that the user wishes to replace. In some embodiments, the shortcut button 118 that will be replaced is highlighted in a different color to inform the user. In some embodiments, infotainment system display 100 only highlights the shortcut button 118 that will be replaced when the user has hovered over that shortcut button 118 for a predetermined period of time. In this example, the user has drug the Weather button 632 over the shortcut button 118 for Rear Ent shortcut button 638. Infotainment system controller 205 determines that the dragged button is over the Rear Ent shortcut button 638. If the user drops the selected button 632 at that point, infotainment system controller 205 (1) removes the Rear Ent shortcut button 638 from shortcut bar 116, (2) generates a shortcut button 118 for Weather button 632, and (3) places a new shortcut button 642 in the desired place on shortcut bar 116. The final arrangement is illustrated in FIG. 7C. If there isn't a shortcut button 118 in the desired location, then infotainment system controller 205 fills the empty spot with the shortcut button 642 for the selected button 632. In some embodiments, infotainment system display 100 animates the transition of replacing the shortcut button 118, where the selected button 632 shrinks to the shortcut bar 116, while also returning to its previous location on active page 104.

In some embodiments, the user needs to drag the selected button 632 so that a portion of the selected button 632 covers the desired location. For example, as shown in FIG. 7B, the top left corner of the selected button 632 covers the Rear Ent shortcut button 638, which is to be replaced. In other embodiments, the drop location is based on the position of the user's finger instead of the selected button 632. In these embodiments, the position of the user's finger on infotainment system display 100 when the user releases contact is the location where the selected button 632 will be placed. For example, the selected button 632 could overlap both shortcut buttons 636 and 638, where the top left corner of the selected button 632 is off of infotainment system display 100. If the user's finger touch is contacting where shortcut button 638 is located, then when the user releases contact with infotainment system display 100, infotainment system controller 205 places the shortcut button 642 for selected button 632 where shortcut button 638 was, as shown in FIGS. 7B & 7C.

Infotainment system controller 205 prevents the user from duplicating buttons 108 on shortcut bar 116. For example, if the user tried to drag Climate button 604 to shortcut bar 116, shortcut bar 116 would be locked and the shortcut buttons 118 would not move or highlight. If the user dropped the duplicate button 604 over shortcut bar 116, the selected button 604 would just return to its original position on active page 104.

Figure 7D:
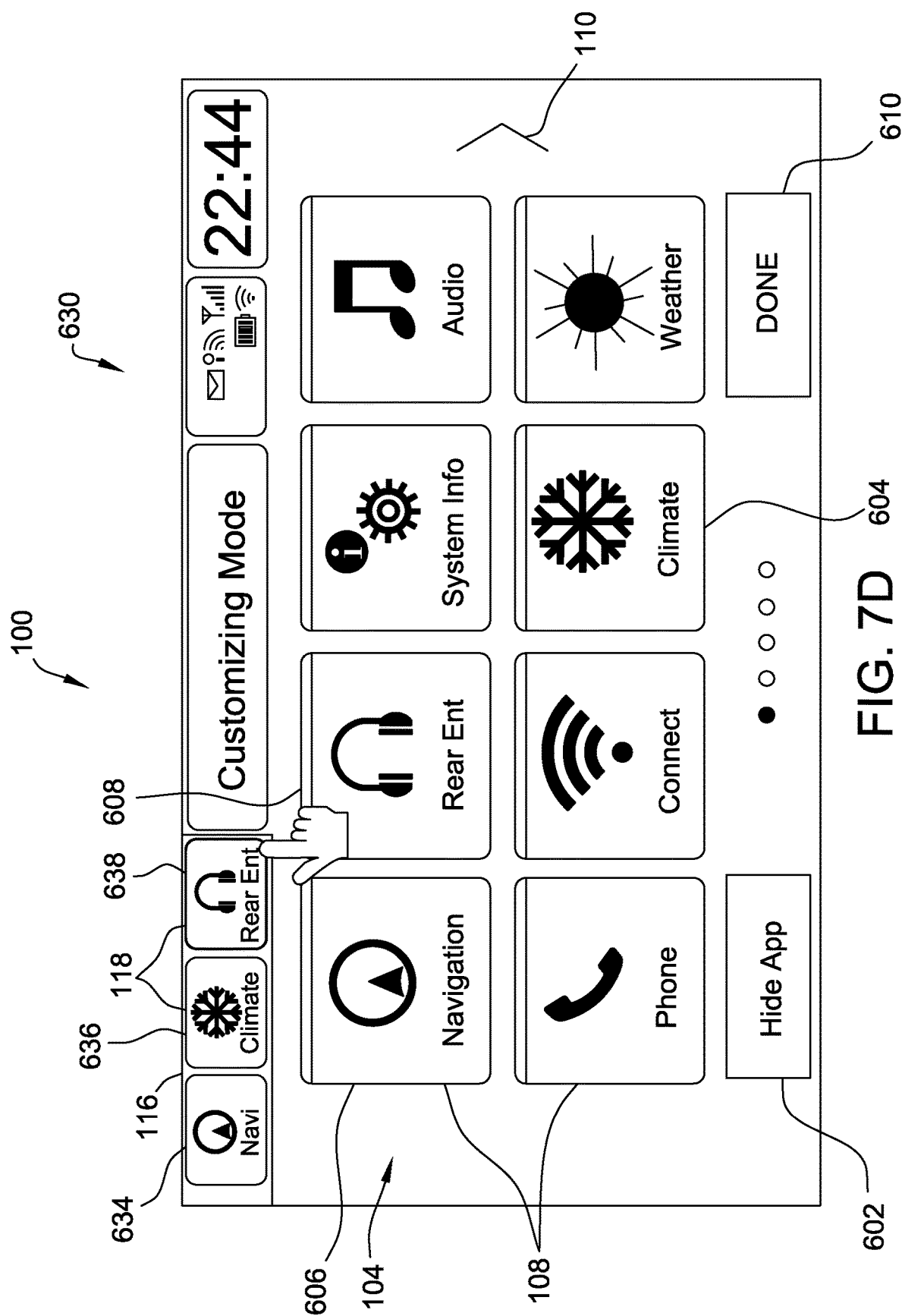

While in customization mode, the user may rearrange the order of shortcut buttons 118 on shortcut bar 116. As shown in FIG. 7D, the user may select a shortcut button 118, such as Rear Ent shortcut button 638, and begin to drag the selected shortcut button 638. In some embodiments, the selected shortcut button 638 is highlighted to show its selected status. In other embodiments, the appearance of selected button 638 remains the same and the rest of the icons and/or buttons 108 are whitened to show a contrast.

Figure 7E:
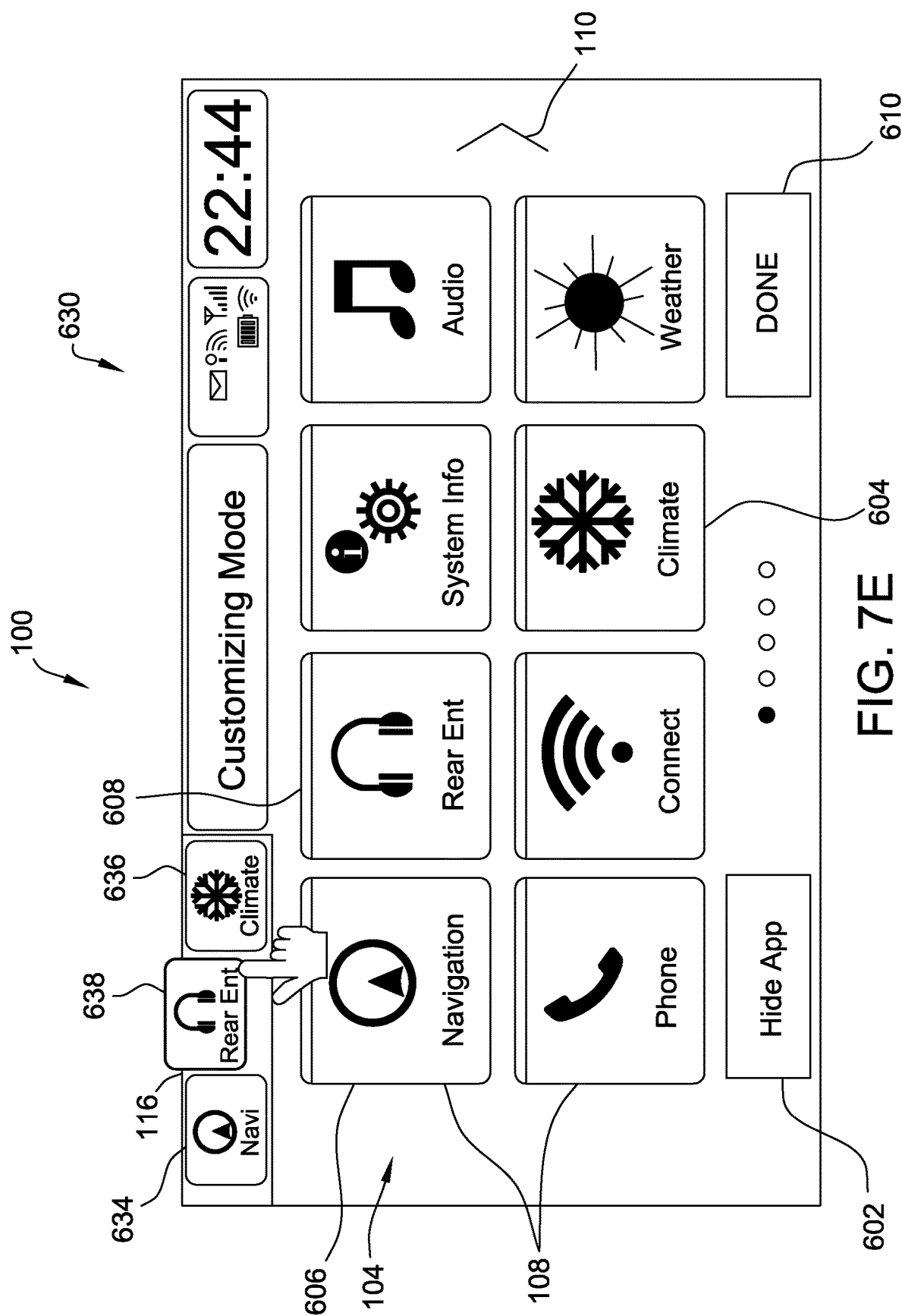
Figure 7F:
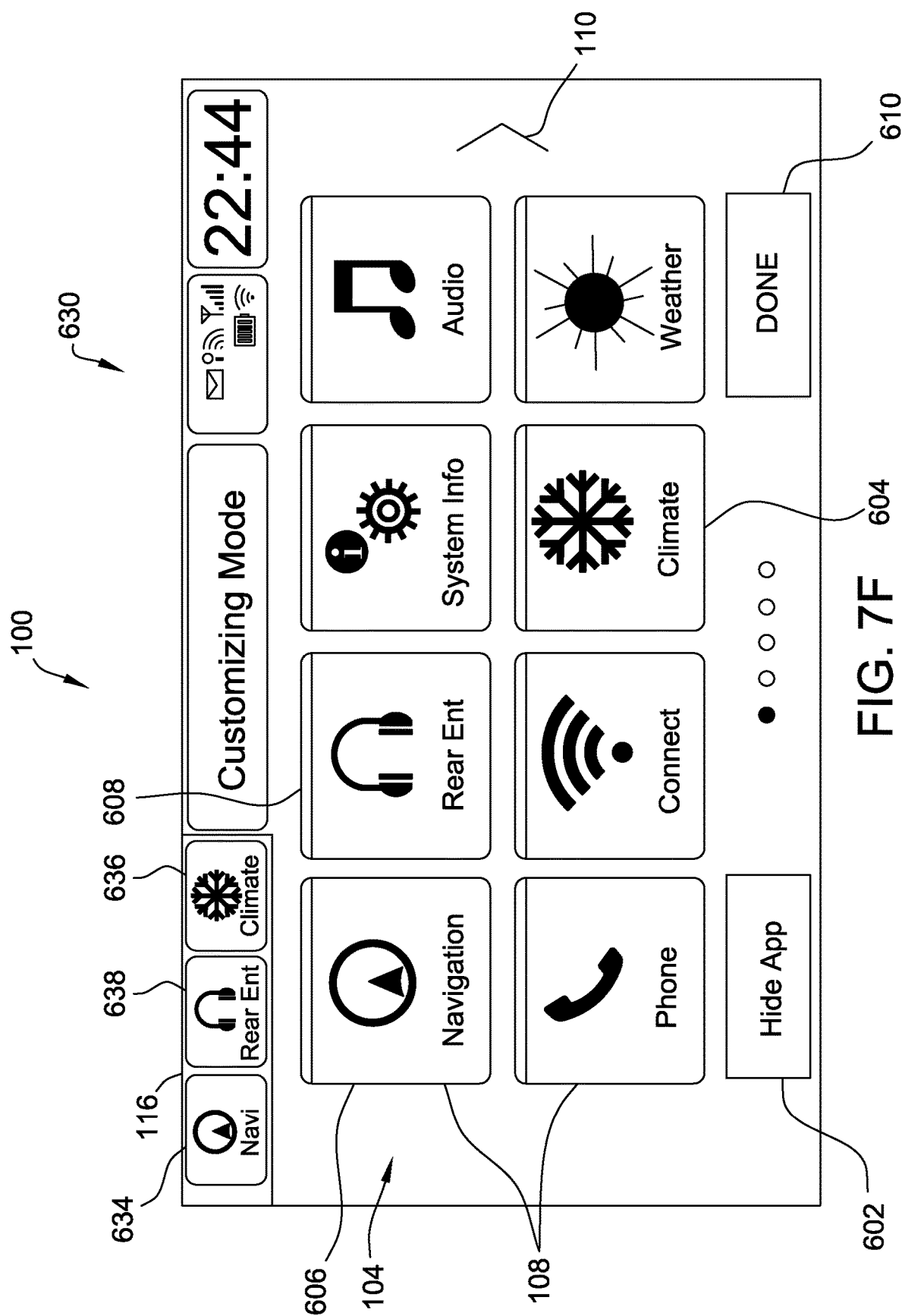
Figure 7G:
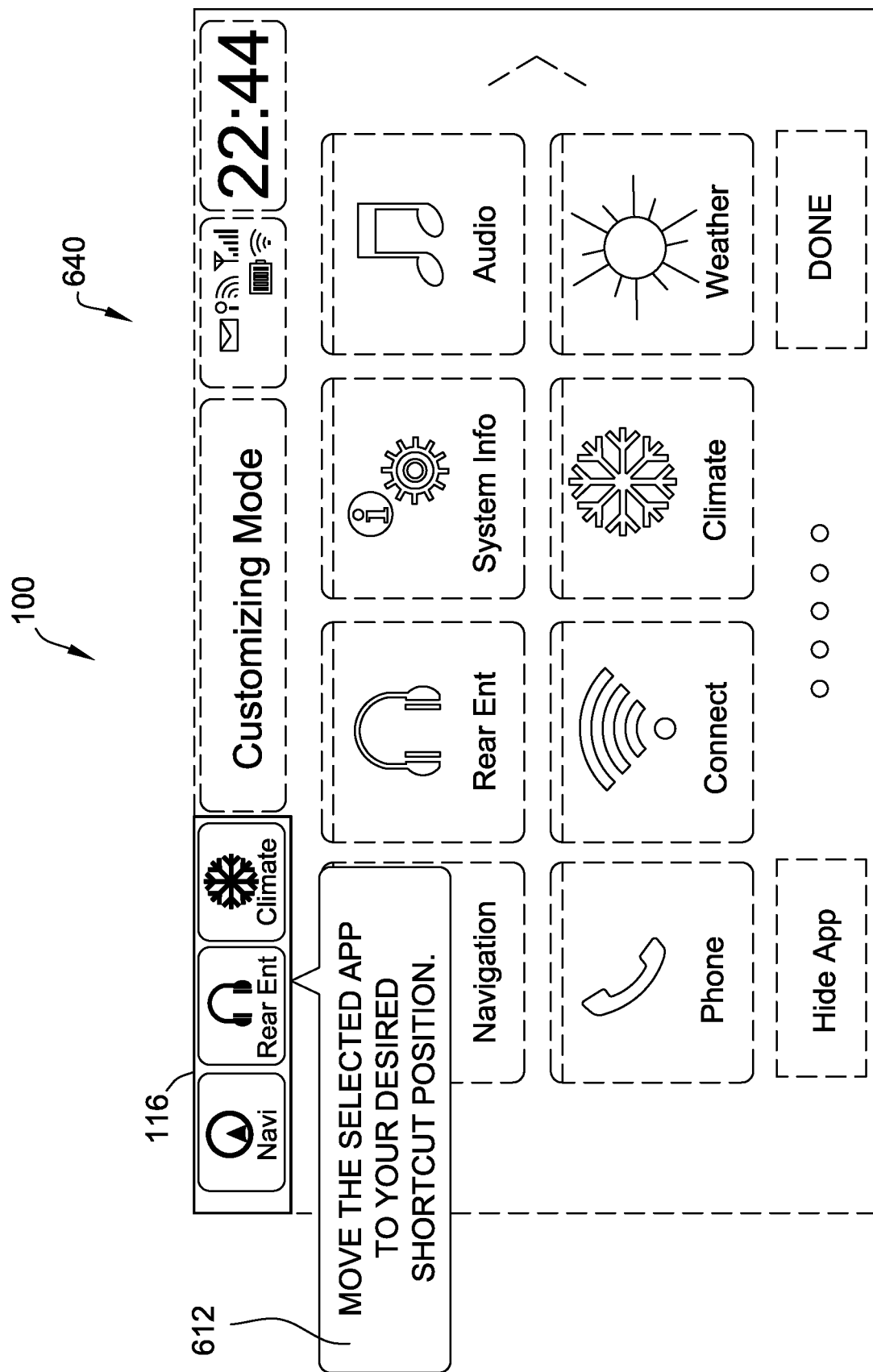

As shown in FIG. 7E, the user may drag the selected shortcut button 638 to a different position on shortcut bar 116. As the user drags the selected shortcut button 638, infotainment system display 100 rearranges the other two shortcut buttons 634 and 636 to show where they would be location on a rearranged shortcut bar 116 based on the current position of the selected shortcut button 638. If the user drops the selected shortcut button 638, infotainment system controller 205 (1) places the selected shortcut button 638 at the desired position and (2) slides the other two shortcut buttons 634 and 636 to accommodate the new position of shortcut button 638. In some embodiments, infotainment system display 100 animates the shortcut buttons 118 sliding from one position to another. Infotainment system display 100 also animates dropping of the selected shortcut button 638 into its desired position. The final arrangement is illustrated in FIG. 7F.

In the example embodiment, infotainment system controller 205 prevents the user from removing a shortcut button 118 from shortcut bar 116. Infotainment system controller 205 only allows the user to add or rearrange the shortcut buttons 118.

In some embodiments, the user may enter a customization mode specifically for rearranging shortcut buttons 118 on shortcut bar 116. In these embodiments, the user presses and holds one of the shortcut buttons 118 for a predetermined period of time, i.e. 1000 ms. If the vehicle speed is zero, infotainment system controller 205 enters the shortcut bar customization mode. As shown in view 640 in FIG. 7G, this customization mode only highlights shortcut bar 116 and displays a tooltip that explains how to rearrange shortcut buttons 118 on shortcut bar 116. All other buttons and inputs are greyed out in this mode as shown in view 640. This customization mode only allows the user to interact with shortcut buttons 118 on shortcut bar 116. The user may exit this mode by clicking done button 610, the back button, or the home button to return infotainment system display 100 to view 102 or whichever page was previously viewed prior to the user accessing this customization mode.

In this customization mode, infotainment system controller 205 prevents the user from dragging a shortcut button 118 into active page 104. If a user drags and drops a shortcut button 118 from shortcut bar 116 into active page 104, infotainment system display 100 animates a sequence showing the shortcut button 118 flying back to its original location on shortcut bar 116. None of the buttons 108 on active page 104 react to the user holding a selected shortcut button 118 over active page 104.

Figure 8A:
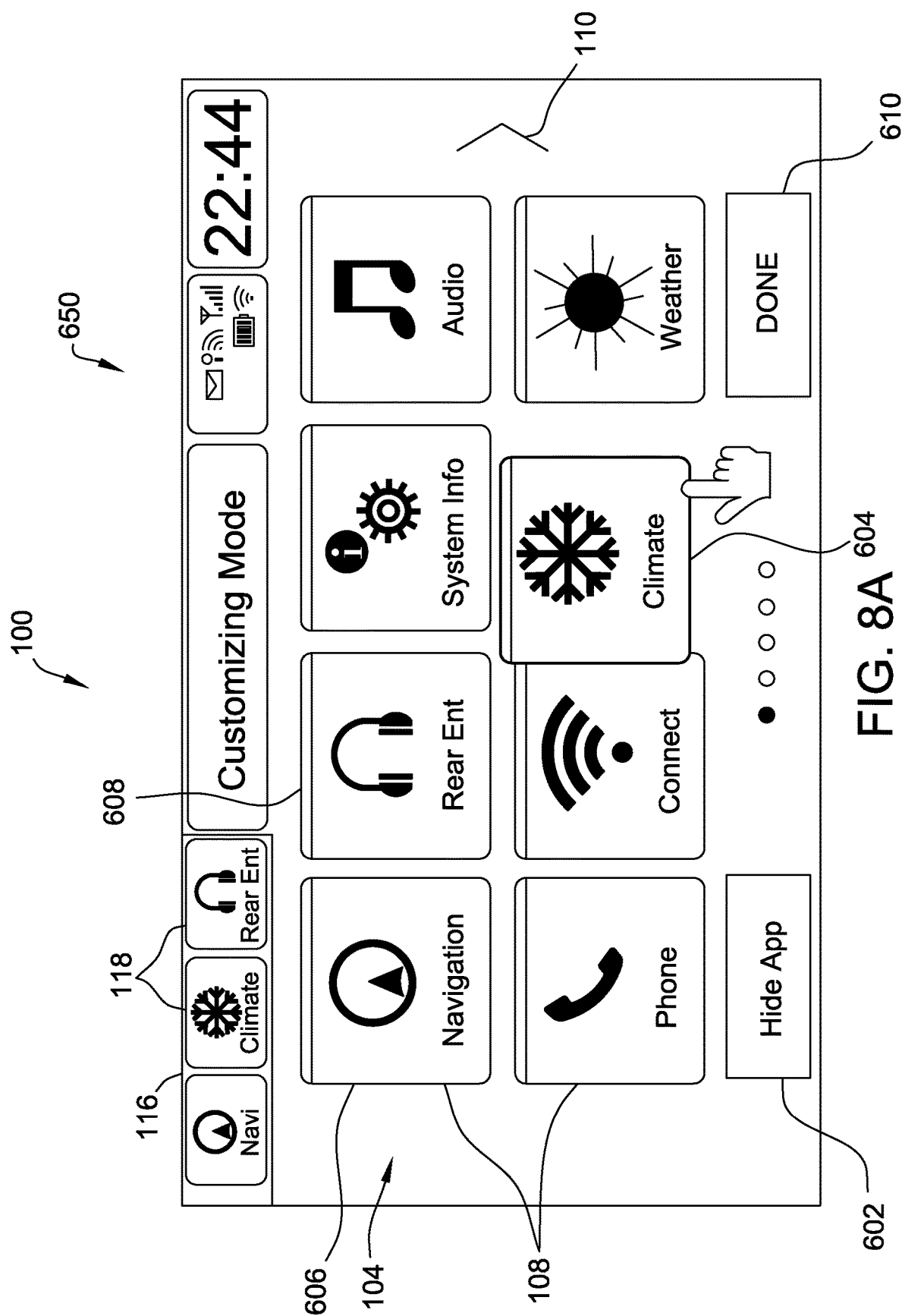
FIGS. 8A-8C illustrate exemplary views of a use case for removing a button in the customization mode using the system shown in FIG. 2.
Figure 8B:
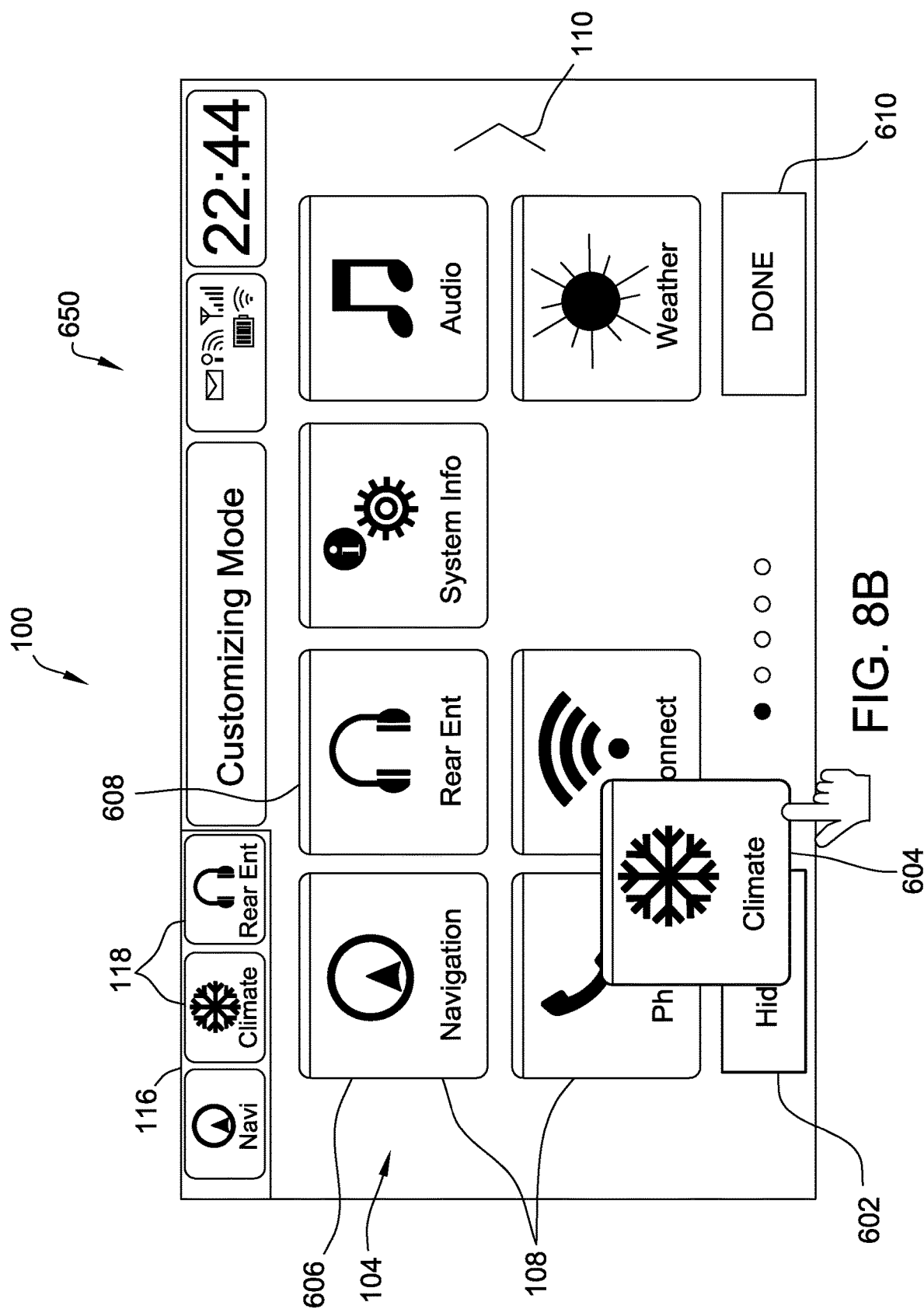
Figure 8C:
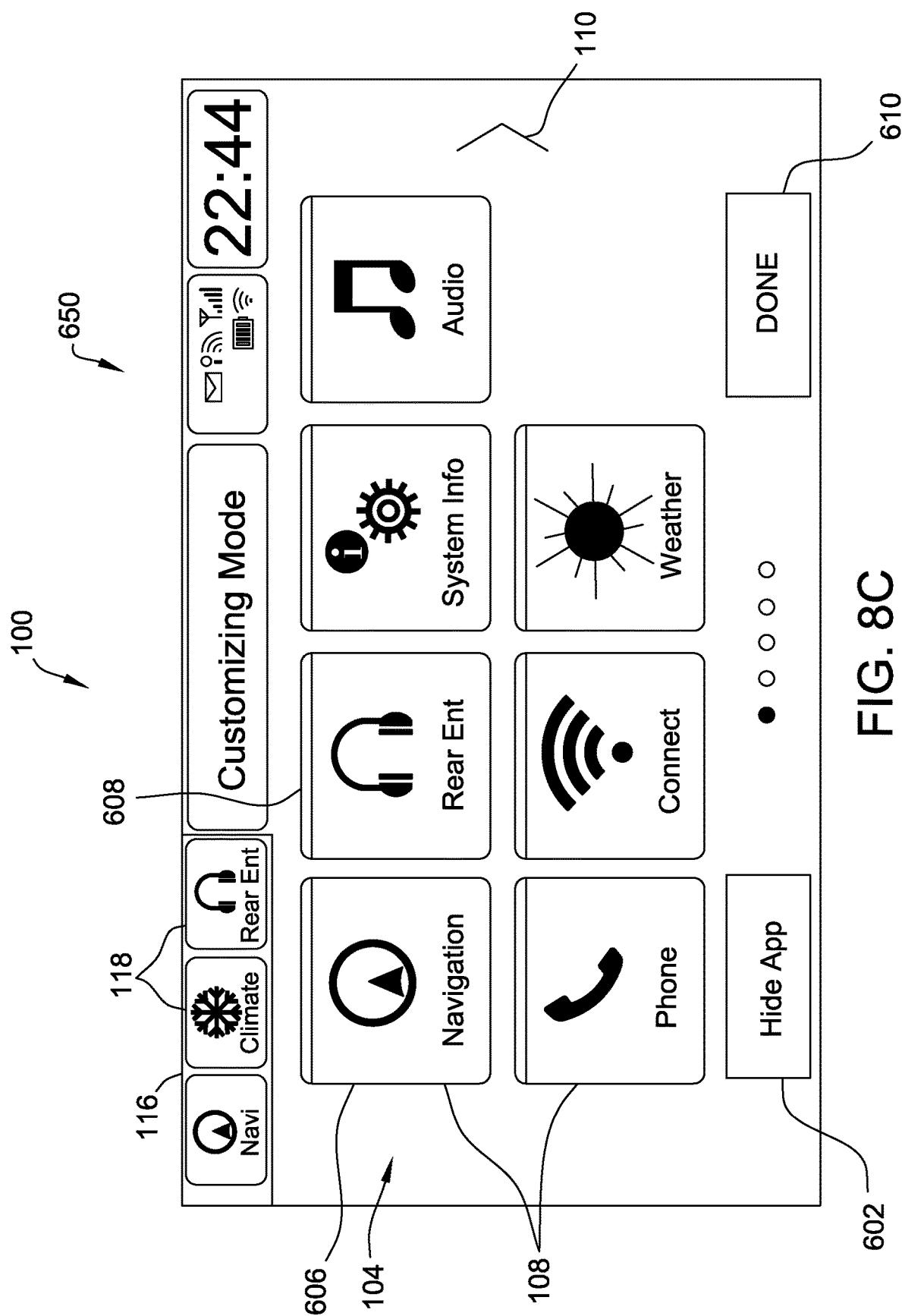

FIGS. 8A-8C illustrate exemplary views 650 of a use case for removing a button 108 (shown in FIG. 1) in the customization mode using system 200 shown in FIG. 2. As shown in FIG. 8A, a user may select a button 108, such as the Climate button 604, and begin to drag the selected button 604. In some embodiments, the selected button 604 is highlighted to show its selected status. In other embodiments, the appearance of selected button 604 remains the same and the rest of the icons and/or buttons 108 are whitened to show a contrast. FIG. 8B illustrates where the user has drug the selected button 604 to the hide app button 602. If the user drops the selected button 604 at that point, then infotainment system controller 205 removes the Climate button 604 from active page 104. In some embodiments, infotainment system display 100 displays an animation of the selected button 604 falling into the hide app button 602, an animation of the selected button 604 shrinking until it disappears, or an animation of the selected button 604 shrinking into the hide app button 602.

In the exemplary embodiment, infotainment system controller 205 shifts the buttons 108 from the right of where Climate button 604 was to fill in the missing space, as shown in FIG. 8C. In some embodiments, infotainment system display 100 animates the transition of the affected buttons 108. In other embodiments, infotainment system controller 205 does not rearrange the buttons on active page 104 when a button is removed. Instead, infotainment system controller 205 leaves the space where Climate button 604 was as a blank. In still other embodiments, infotainment system controller 205 may retrieve the left topmost button 108 from the next page and place the retrieved button in the bottom rightmost position on active page 104.

In the exemplary embodiment, if the button 108 for an app is that has an associated shortcut button 118 is hidden, shortcut button 118 remains on shortcut bar 116. In the exemplary embodiment, all apps are capable of being hidden and active page 104 may contain zero buttons 108.

FIGS. 9A-9D illustrate exemplary views 700 of audio information bar 120 used with infotainment system display 100 shown in FIG. 1.

Audio information bar 120 includes audio icon 122 and audio information 124. Audio icon 122 represents the currently selected audio source. In the exemplary embodiment, audio icon 122 is similar to an icon on the button 108 associated with the selected audio source. In the exemplary embodiment, the audio icon 122 matches the icon on the source button. However, in this embodiment, the audio icon 122 does not include any text, just the icon. In the exemplary embodiment, audio sources are similar to media sources 210 (shown in FIG. 2). Audio information 124 is information about the currently active audio source. In some embodiments, the information is also known as metadata. The information may include, but is not limited to, the currently playing song, currently playing artist, current station frequency, current station name, current program name, phone number or contact name, call time, an error message, and volume feedback. In the exemplary embodiment, if the information contained in audio information 124 is longer than the space available on audio information bar 120, then audio information 124 ends in an ellipse (" . . . "). In the exemplary embodiment, audio information 124 is static and does not scroll or animate to prevent the driver from being distracted by movement on infotainment system display 100.

When audio icon 122 is clicked, infotainment system controller 205 opens selectable menu of audio sources 802, as shown in FIG. 10. When audio information 124 is clicked, then infotainment system controller 205 opens the app associated with the current audio source. When there is no audio playing and no active phone call, then infotainment system controller 205 does not initiate a transition to another page.

In the exemplary embodiment, the text displayed in audio information 124 is based on the audio source. Below are some examples of information that could be displayed in audio information 124.

FM: <station frequency>-<program service name>
HD FM: <station frequency>-<station name>
AM: <station frequency>-<program service name>
AM HD: <station frequency>-<station name>
Satellite Radio: <station number>-<station name>
USB/Bluetooth/User Device/Internet Radio: <title>-<artist>
Phone: <contact or number>-<in call timer> Ex: "Paul—0:32"
No information available: "No Info" (for use when no metadata is available Ex: Internet Radio ad, etc.)

Figure 9A:
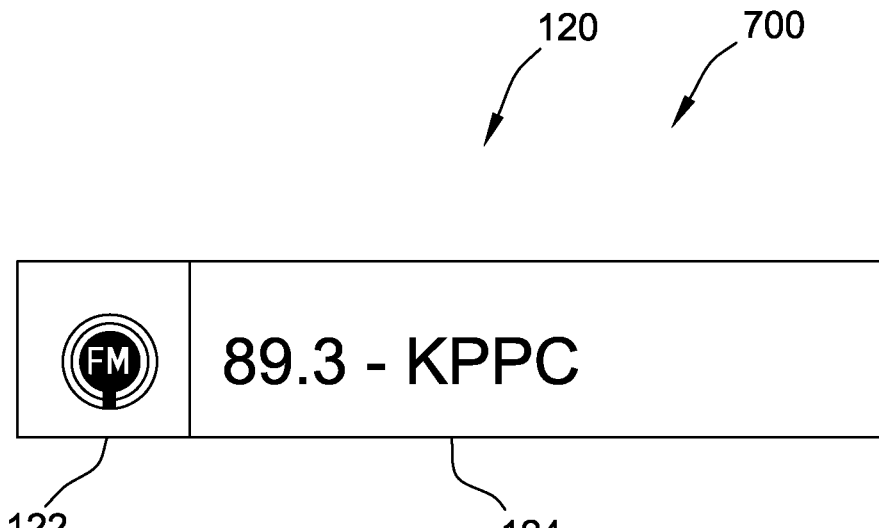
FIGS. 9A-9D illustrate exemplary views of an audio information bar used with the infotainment system display shown in FIG. 1.
Figure 9B:
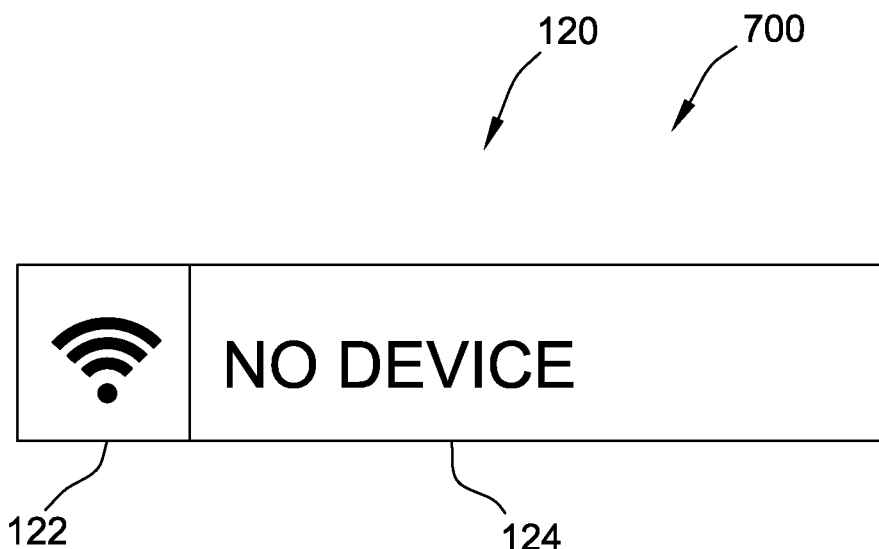

When the audio source associated with the audio icon 122 is unavailable, such as when no device is connected, then audio information 124 displays an appropriate error message, as shown in FIG. 9B. Examples of error messages could include, but are not limited to, "no device" when the associated device is not connect, such as a Bluetooth device, "no disc" when there is no CD in the CD player, "no signal" when there is no signal for satellite radio, "no service" when there is no Internet connection for Internet Radio, and "no songs" if the playlist is empty. Once the error condition is resolved, such as the device successfully connected, the error message is replaced by the appropriate audio information.

Figure 9C:
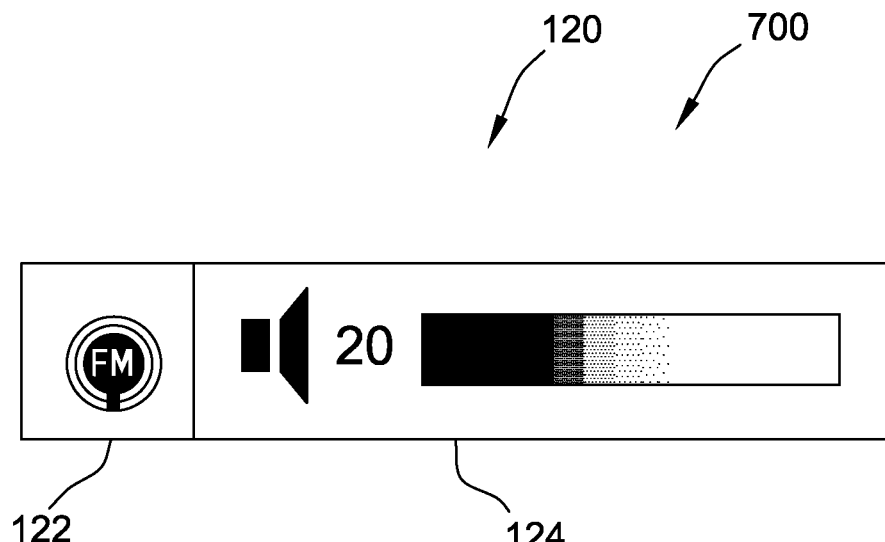

In some embodiments, when a volume control (not shown) is modified through infotainment system 200 (shown in FIG. 2), a current volume indicator is shown over audio information 124 for a predetermined period of time (i.e., 3 seconds). As shown in FIG. 9C, audio information 124 displays a speaker icon, a numerical value for the current volume, and a relative bar that illustrates where the current volume is relative to maximum and minimum volume. In some embodiments, the speaker icon changes based on the current audio source. For example, if the phone is the current audio source, then the speaker icon would be replaced with the phone app icon. Other examples may include, but are not limited to, the auxiliary source icon, text-to-speech and voice recognition icon, and in-car public announcement system icon.

Figure 9D:
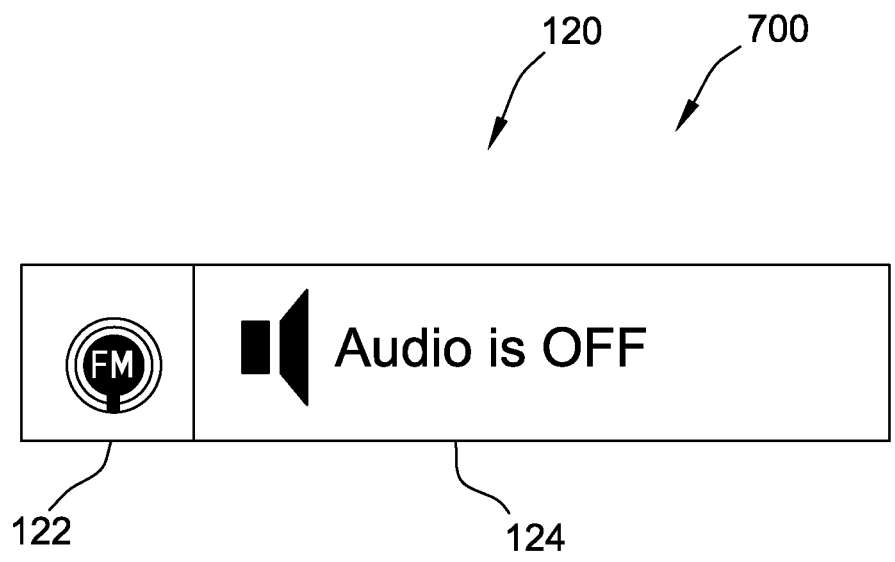

In the illustrated example, FIG. 9C illustrates that the current volume is at 20, where the maximum volume is 40. The numerical value of the volume and the maximum value of the volume are based on the current audio source. In this illustration, the volume level bar shows that the volume is half of the maximum. If the user further adjusted the volume, then the information in audio information 124 would change appropriately. After the predetermined period of time, the current volume indicator disappears and audio information 124 is displayed. If the current audio source is deactivated, then audio information 124 displays an audio off message, as is shown in FIG. 9D. In the exemplary embodiment, the audio off message is displayed in the audio information bar 120 until an audio source is activated. In some embodiments, the user may activate and deactivate the audio sources by pressing in the volume knob. The user may also turn the volume all of the way down to zero, which causes infotainment system controller 205 to deactivate the current audio source.

In the exemplary embodiment, infotainment system controller 205 determines the information to display in audio information 124 based on a priority list based on the source of the information. For example, the priority list may be arranged so that volume feedback information for non-audio app sources have the highest priority. Examples of non-audio app sources include, but are not limited to, phone, voice recognition, text to speech, and in-car public address system. In this example, the next priority is phone metadata, aka information about a current phone call. Next would be the audio off message shown in FIG. 9D. Then would be volume feedback information for audio app sources. And finally would be metadata from those audio-app sources.

FIG. 10 illustrates an exemplary view 800 of a selectable menu of audio sources 804 based on audio information bar 120 shown in FIG. 9A.

When a user selects audio icon 122, infotainment system display 100 (shown in FIG. 1) displays an audio sources menu 802. Audio sources menu 802 includes a plurality of potential audio sources 804 that the user may select. In the exemplary embodiment, audio sources 804 correspond to media sources 210 (shown in FIG. 2). When the user selects an audio source 804 from audio sources menu 802, infotainment system controller 205 (shown in FIG. 2) (1) activates the media source 210 corresponding to the selected audio source 804, (2) closes audio sources menu 802, and (3) instructs infotainment system display 100 to display audio icon 122 and audio information 124 (shown in FIG. 1)

corresponding to the selected media source 210. When the audio sources menu 802 is open, the currently selected audio source 804 is highlighted.

If the user wishes to close audio sources menu 802 without making a selection or changing the current selection, the user may click the back button or audio icon 122 to close the audio sources menu 802.

If infotainment system display 100 is displaying an app prior to the audio sources menu 802 being opened, then when the audio sources menu 802 is closed infotainment system display 100 returns to displaying the app. The exception is when the app being displayed with the current audio source 804 and the user selects a different audio source 804. In this situation, infotainment system display 100 displays the app for the newly selected audio source 804 instead.

In the exemplary embodiment, audio sources 804 in audio sources menu 802 are organized in an order set by infotainment system controller 205. Audio sources 804 are displayed in order by row, where the first two audio sources 804 are displayed in the top row and the second two in the next, continuing on. For example, the order of audio sources 804 may be, but is not limited to, FM, Bluetooth Audio, Satellite Radio, Internet Radio, Aux Input, USB, CD, AM, Hard Drive, Social Play List, Apple CarPlay® (CarPlay is a registered trademark of Apple Inc. located in Cupertino, Calif.), Android Auto® (Android Auto is a registered trademark of Google, Inc. of Mountain View, Calif.), and Rear Entertainment System (RES). If one or more of the audio sources 804 is unavailable in the vehicle, such as if the vehicle does not include a CD player, then all lower prioritized audio sources 804 are moved up by one space.

FIGS. 11A-11D illustrates exemplary views 900 of indicator area 128 used with infotainment system display 100 shown in FIG. 1. In the exemplary embodiment, indicator area 128 includes a plurality of indicator icons 130. Each indicator icon 130 corresponds to different application statuses, system statuses, and notification messages.

For example, a system status may include an indicator icon 130 that resembles a satellite to indicate that satellite based GPS is connected. An indicator icon 130 with of a satellite with an X over it may indicate that no GPS signals are currently being received by infotainment system 200 (shown in FIG. 2). Other indicator icons 130 may indicate the status of a battery of a connected device, such as user computer device 230 (shown in FIG. 2), one or more communication protocols that are active, such as Bluetooth, USB, cellular, and Wi-Fi.

Figure 11A:
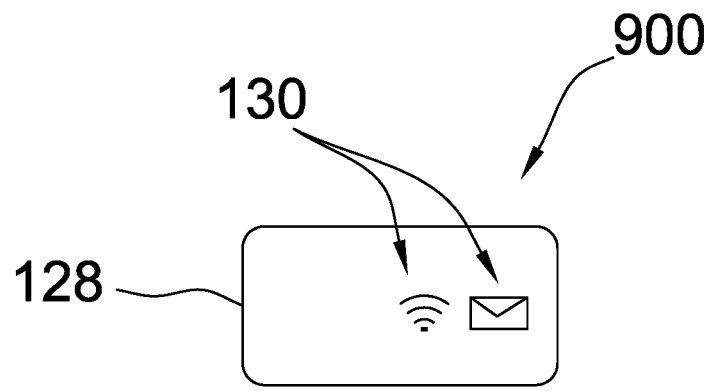
FIGS. 11A-D illustrates exemplary views of an indicator area used with the infotainment system display shown in FIG. 1.
Figure 11B:
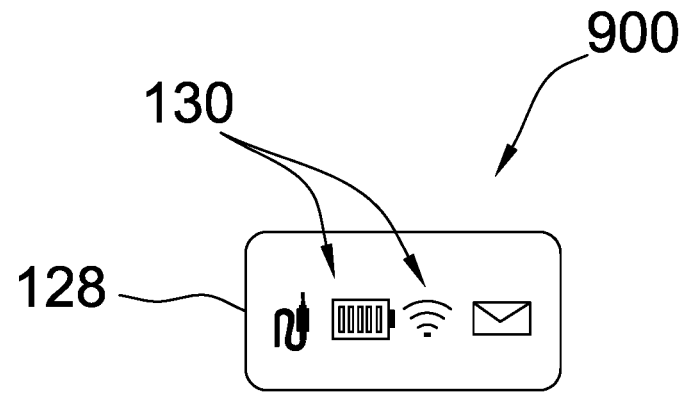
Figure 11C:
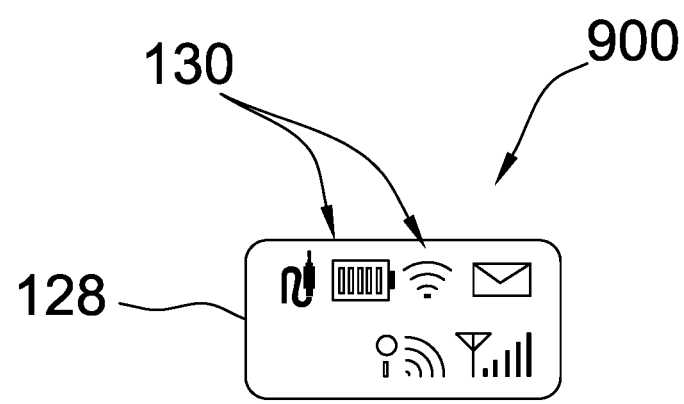

In the exemplary embodiment, indicator icons are right adjusted. By adjusting the indicators to the right side of indicator area 128, the indicator icons 130 are further outside of the driver's field of view. In the exemplary embodiment, the placement of indicator icons 130 in indicator area 128 depends on the number of indicator icons 130. For example, in FIG. 11A, there are only two indicator icons 130. These two indicators are middle aligned and right adjusted. As more indicator icons 130 are added to indicator area 128, these are added to the left of the currently listed icons. As shown in FIG. 11B, indicator area 130 may contain 3.5 indicator icons 130. Some indicator icons, such as those for Bluetooth and USB are half sized. If there are four indicator icons 130 and none of the four are half-sized, then infotainment system display 100 shifts the first row of indicator icons 130 up and places the fourth indicator icon 130 in a right adjusted row below, leaving the half space as blank. FIG. 11C illustrates two rows of indicator icons 130 in indicator area 128.

Figure 11D:
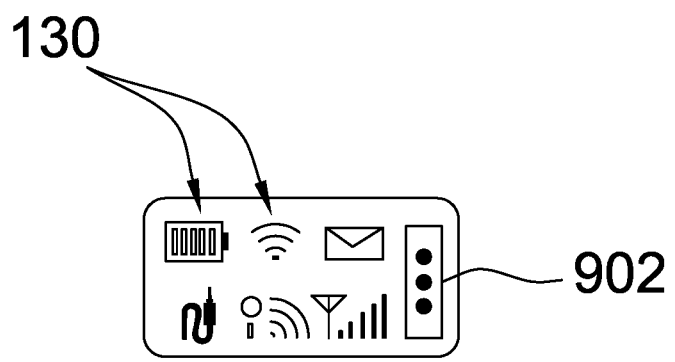

In some embodiments, the number of indicator icons 130 may exceed the amount of space available on indicator area 128. In these embodiments, an ellipse icon 902 may be displayed in indicator area 128, as shown in FIG. 11D.

In some embodiments, indicator icons 130 are ordered within indicator area 128 based on a priority system. In these embodiments, indicator icons 130 are prioritized from right to left and then top to bottom. Where the indicator icon 130 furthest to the right in the top row has the highest priority and the indicator icon 130 furthest to the right in the bottom row has a higher priority than any of the other indicator icons 130 in the bottom row. In some embodiments, this prioritization places actionable items at the highest priority, where purely informational items are prioritized much lower. In at least one embodiment, statuses produced by applications are given higher priority than status produced by the system. For example, app produced notifications would be given higher priority than statuses such as cell phone signal level, cell phone battery level, and Wi-Fi connection.

Figure 12:
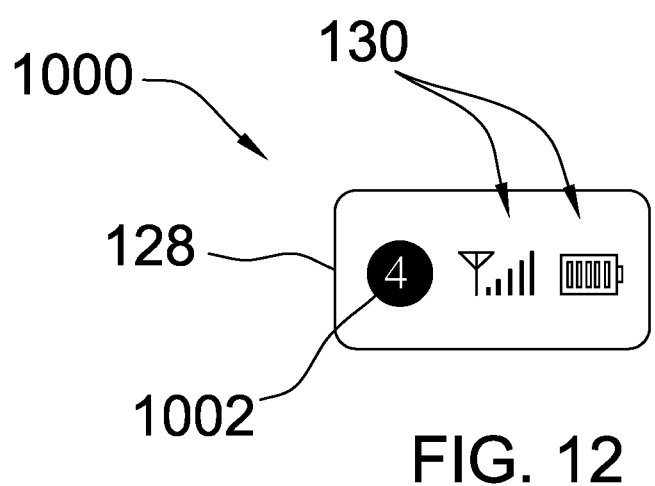

FIG. 12 illustrates another exemplary view 1000 of indicator area 128 used with infotainment system display 100 shown in FIG. 1. In this view 1000, indicator area 128 includes a notification icon 1002. In the exemplary embodiment, notification icon 1002 represents a number of actionable items for the user, such as messages to the user that are currently awaiting the user to view. The number in notification icon 1002 represents the number of notification messages which have not been dismissed yet. Messages include, but are not limited to, messages from infotainment system controller 205 (shown in FIG. 2), text messages received through infotainment system's cellular connection, text messages received through a user computer device 230 (shown in FIG. 2), such as a smartphone, email messages, and messages received through an application on infotainment system controller 205.

Notification icon 1002 will occupy space normally occupied by indicator icons 130. Notification icon 1002 will be placed to the left of all displayed indicator icons 130. Notification icon 1002 will occupy both the top and bottom row. Notification icon 1002 will be present whenever notifications are waiting to be viewed and/or acted upon and will not be hidden when the number of indicator icons 130 to be displayed exceeds the amount of space in indicator area 128.

FIG. 13 illustrates an exemplary view 1100 of a list of items 1102 associated with indicators icons 130 from indicator area 128 shown in FIGS. 11A-11D and 12. List of items 1102 includes a plurality of notification items 1104, 1106, and 1108. When the user clicks indicator area 128, infotainment system controller 205 (shown in FIG. 2) instructs infotainment system display 100 to display list of items 1102. In the exemplary embodiment, each item on list of items 1102 corresponds to an indicator icon 130 that was displayed in indicator area 128. When there are more items that can be displayed on list of items 1102, infotainment system display 100 displays a scroll bar to allow the user to scroll through list of items 1102.

If there are no indicator icons 130 in indicator area 128, when indicator area 128 is selected by the user, then list of items 1102 is blank when displayed. The user may exit viewing list of items 1102 by clicking indicator area 128, the back button, or the home button. In some embodiments, while infotainment system display 100 is displaying list of items 1102, indicator area 128 does not include any indicator icons 130.

Some of the items, such as system notification 1104, represent a message that the user may open to view or an actionable item that may prompt the user to perform an action. After the user has viewed the message or performed the action, the number of messages included in notification icon 1002 (shown in FIG. 10) is reduced. The user may also dismiss system notification 1104 by clicking the dismiss button. This action also reduces the number of messages included in notification icon 1002. When the number of messages is zero, then notification icon 1002 does not appear in indicator area 128. In some embodiments, if there is more than one system notification 1104, system notifications 1104 are ordered so that the most recent notification is listed at the top.

Status notification 1106 represents an informational icon designed to inform the user of a piece of information, such as battery status of connected user computer devices 230 (shown in FIG. 2). Menu notifications 1108 include an indicator that shows that this notification 1108 links to another page or application that will provide the user with additional information about the notification. When the user clicks on menu notification 1108, infotainment system display 100 displays a page associated with the notification 1108.

In some embodiments, notifications 1104, 1106, and 1108 are ordered within list of items 1102 on the priority system used to order indicator icons 130 in indicator area 128. In these embodiments, notifications 1104, 1106, and 1108 are prioritized from top to bottom of list of items 1102, where system notifications 1104 are at the top of the list of items 1102.

FIG. 14 is a flow chart of an exemplary process 1200 that may be used to control infotainment system 200 in a vehicle as shown in FIG. 2. In the exemplary embodiment, process 1200 is implemented by a computing device, for example infotainment system controller 205 (shown in FIG. 2). In the exemplary embodiment, infotainment system controller 205 is in communication with infotainment system display 100 (shown in FIG. 1) and vehicle computer device 235 (shown in FIG. 2).

In the exemplary embodiment, infotainment system controller 205 instructs infotainment system display 100 to display 1205 screen view 102 including active page 104 and toolbar 106. As shown above in FIG. 1, active page 104 includes a plurality of buttons 108 and toolbar 106 includes a shortcut bar 116 that includes a plurality of shortcut buttons 118. The buttons 108 are associated with at least one of an application, one or more options, a page containing a plurality of options, a page containing a plurality of applications, and a system page, where when the user clicks on button 108, infotainment system controller 205 performs one or more actions linked to the click on button 108. For example, when a user clicks on Climate button 604 (shown in FIG. 6A), infotainment system controller 205 displays a climate control page that enables the user to adjust the climate controls of the vehicle. Each of the shortcut buttons 118 is associated with a button 108, where when the user clicks on a shortcut button 118, infotainment system controller 205 responds as if the corresponding button 108 had been clicked on.

In the exemplary embodiments, infotainment system controller 205 receives 1210 a first user input requesting access to a customization mode. In the exemplary embodiment, the user inputs the request by clicking on a button 108 or a shortcut button 118 on infotainment system display 100 for an extended period of time (i.e., 2 seconds). Infotainment system display 100 transmits the first user input to infotainment system controller 205.

In the exemplary embodiment, infotainment system controller 205 retrieves 1215 the current speed of the vehicle. In some embodiments, infotainment system controller 205 retrieves 1215 the current speed of the vehicle from vehicle computer device 235 that receives the current speed from one or more ECUs on the CAN bus. In other embodiments, infotainment system controller 205 retrieves 1215 the current speed of the vehicle from a user computer device 230 (shown in FIG. 2) or through a GPS device included in infotainment system 200.

In the exemplary embodiment, infotainment system controller 205 activates 1220 the customization mode if the current speed of the vehicle is zero. In the exemplary embodiment, infotainment system controller 205 causes infotainment system display 100 to display view 620 (shown in FIG. 6B). After the user touches the screen, infotainment system controller 205 causes infotainment system display 100 to displays view 600 (shown in FIG. 6A). Infotainment system controller 205 receives 1225 a second user input indicating a desired changed to at least one of active page 104 and toolbar 106. Infotainment system controller 205 updates 1230 view 600 based on the desired change.

Figure 15A:
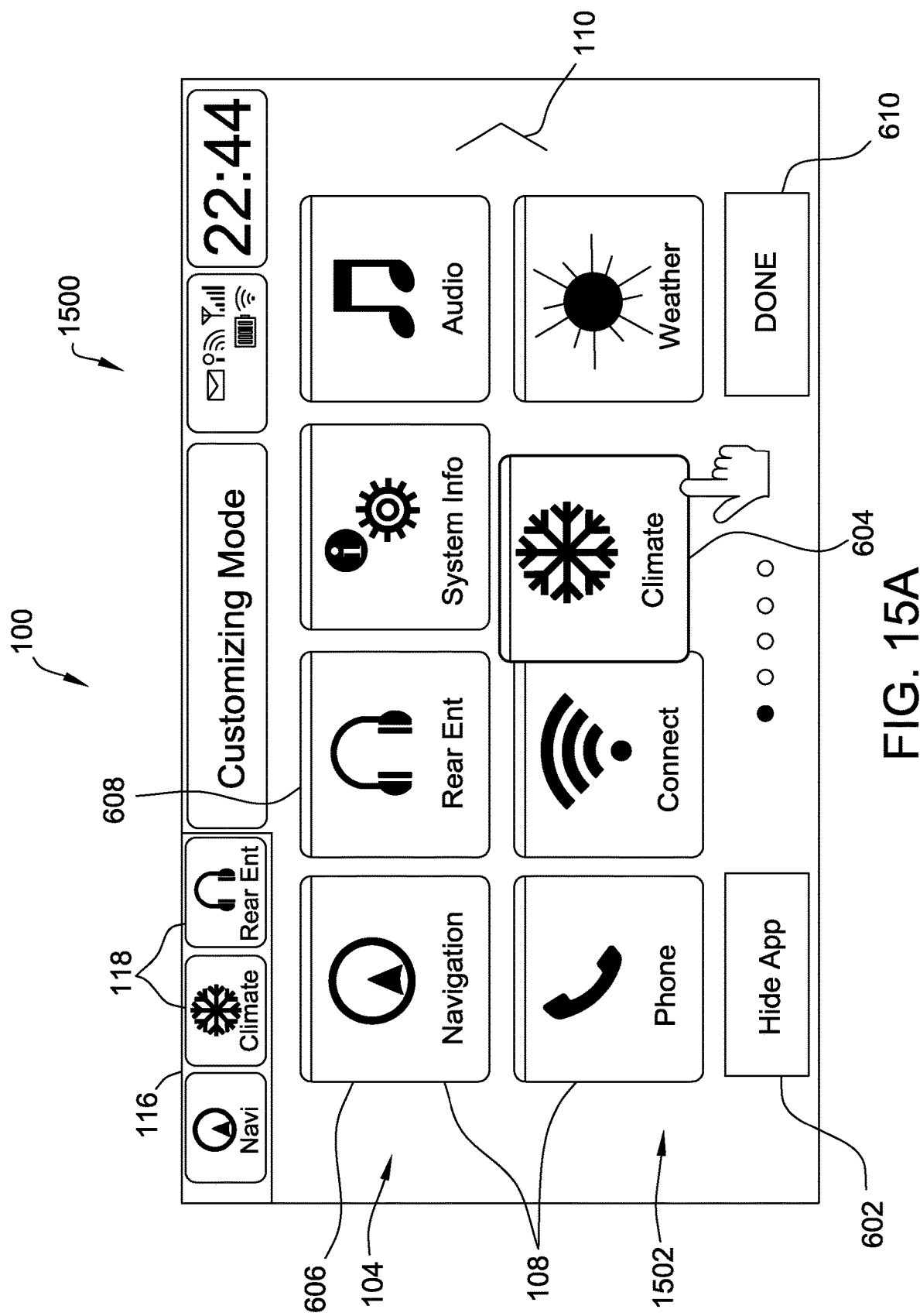
Figure 15B:
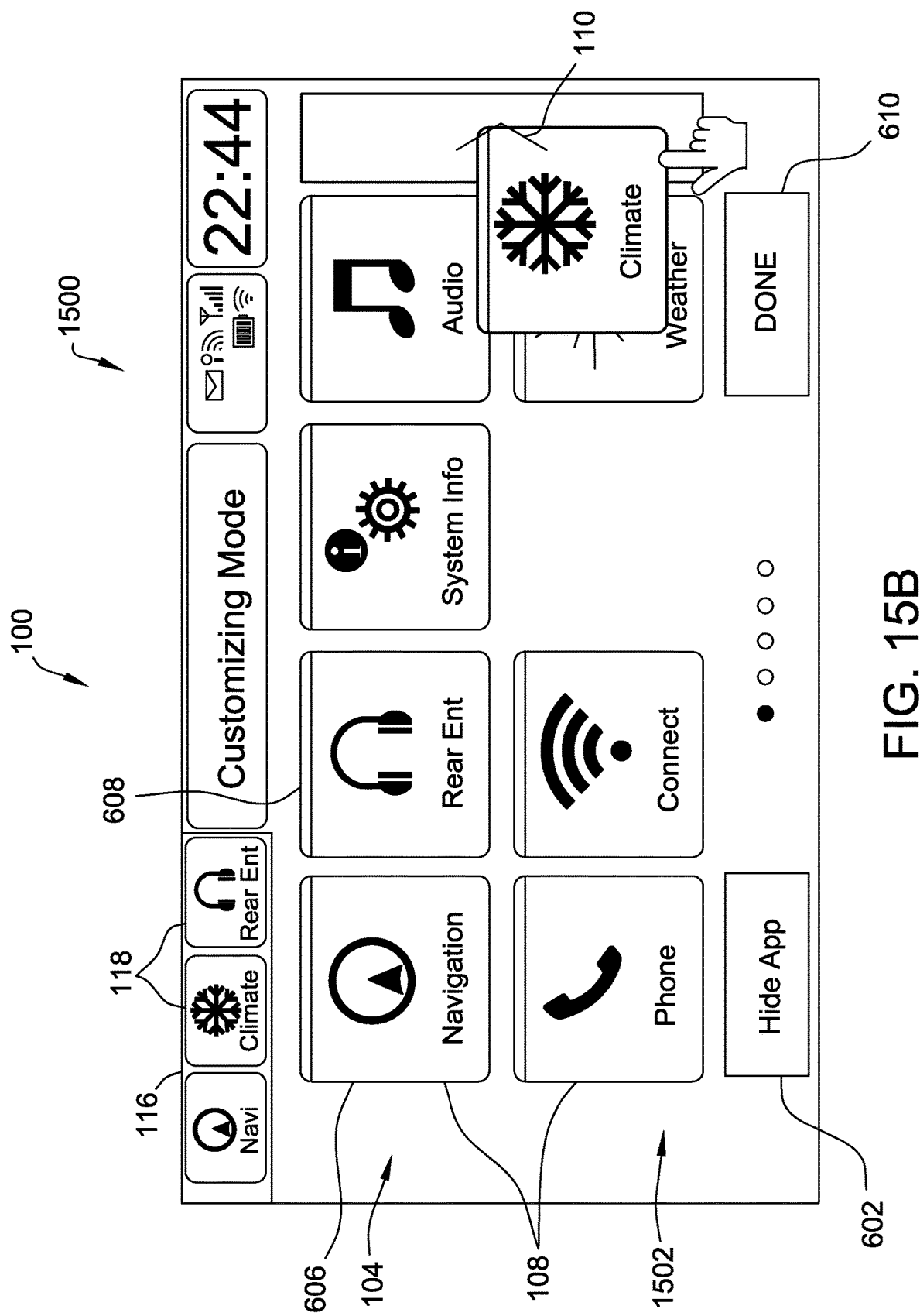

FIGS. 15A-15E illustrate exemplary views 1500 of a use case for rearranging buttons over multiple active pages. While in customization mode, the user may move buttons 108 from a first page 1502 to a second page 1504. As shown in FIG. 15A, a user may select a button 108, such as the Climate button 604, and begin to drag the selected button 604. In some embodiments, the selected button 604 is highlighted to show its selected status. In other embodiments, the appearance of selected button 604 remains the same and the rest of the icons and/or buttons 108 are whitened to show a contrast. FIG. 15B illustrates where the user has drug the selected button 604 to the next page button 110. In the example embodiment, infotainment system display 100 highlights next page button 110, such as by drawing a colored box around next page button 110. When user hovers over next page button 110 for a predetermined period of time, infotainment system display 100 changes active page 104 from first page 1502 to second page 1504. After Climate button 604 has been removed from first page 1502, first page 1502 resembles view 650, shown in FIG. 8C. While the description herein describes a first page 1502 and a second page 1504, these could be pages of any number in the queue of pages available.

Figure 15C:
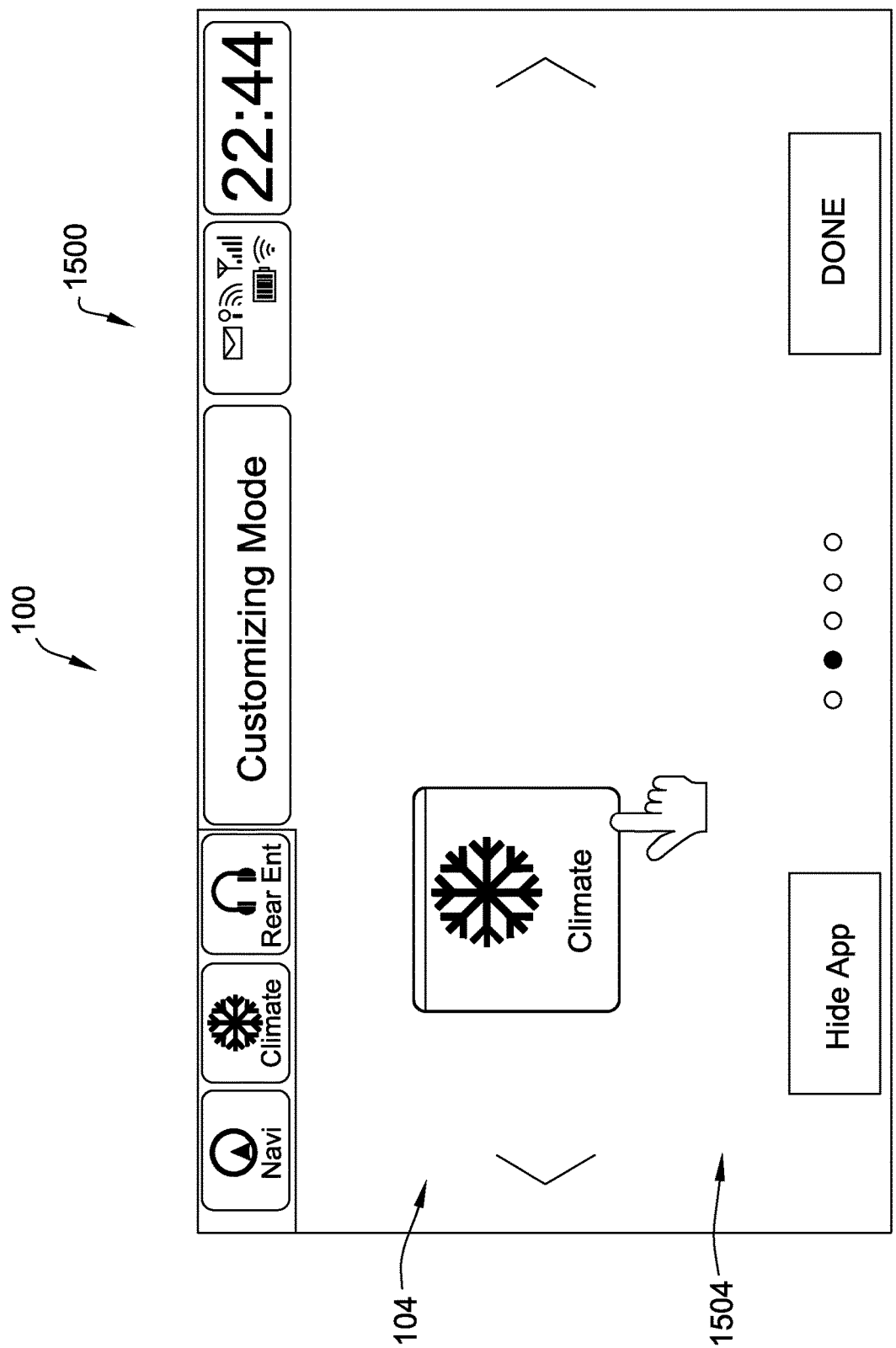

As shown in FIG. 15C, second page 1504 is currently empty. If the user releases the selected button 604, then infotainment system controller 205 places the selected button 604 in the upper leftmost corner of active page 104. In some embodiments, infotainment system display 100 displays an animation of the selected button 604 traveling from its point of release to its destination. In the exemplary embodiment, when released in a blank area, the selected button goes to the leftmost and topmost free space available.

Figure 15E:
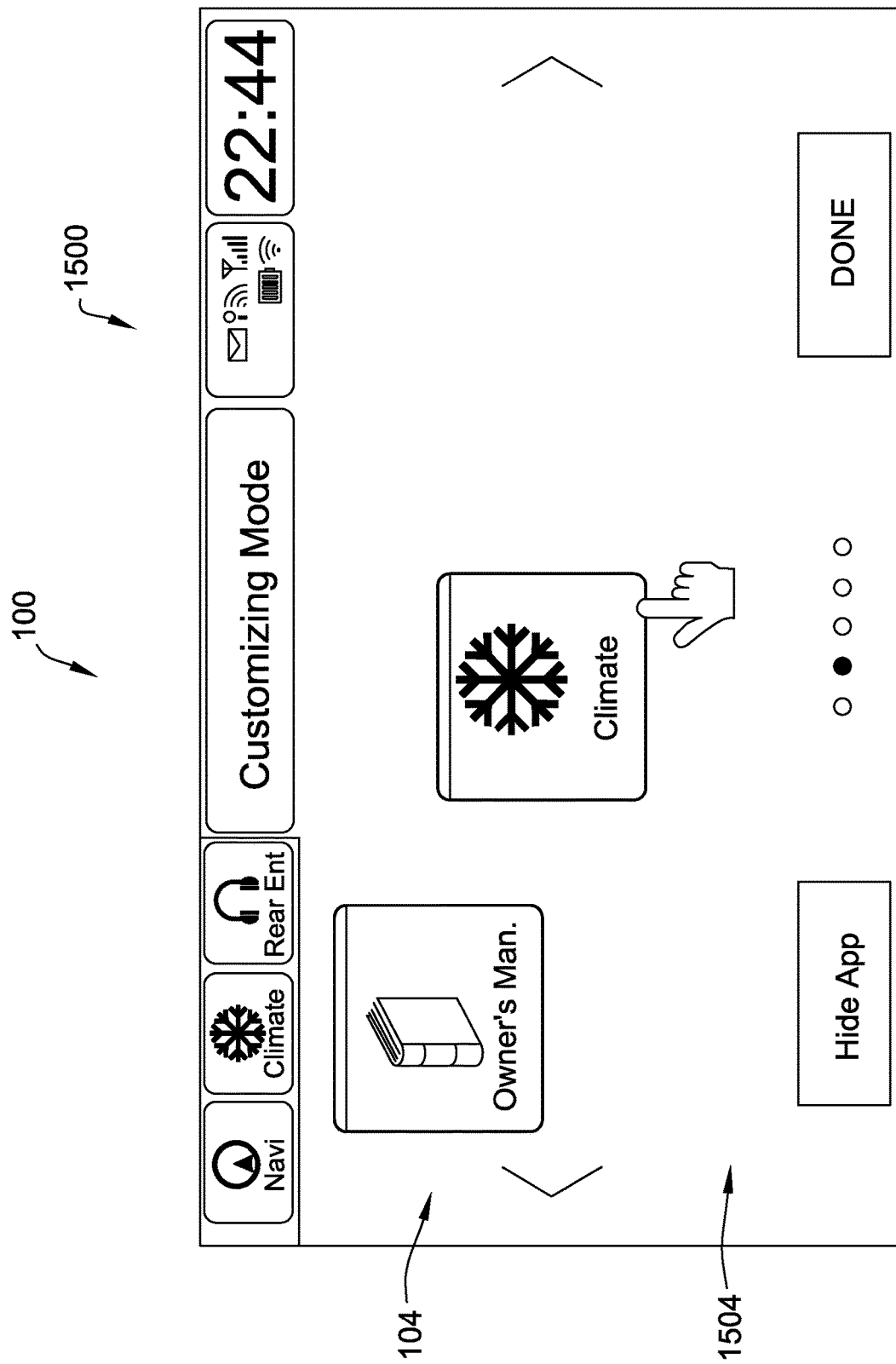

In some situations, second page 1504 is not empty and there are already one or more buttons in second page 1504. If the selected button 604 is released in a blank space, then infotainment system controller 205 positions the selected button 604 in the next available space, as shown in FIG. 15E. In some further situations, the user may continue on past a second page 1504 that includes one or more buttons 108 to third page 1506 (shown in FIG. 16D) that is empty and release the selected button 604 on empty third page 1506. In this situation, first page 1502 would resemble FIG. 8C, second page would resemble FIG. 15E, and third page 1506 would resemble FIG. 15D. In these embodiments, infotainment system controller 205 prevents the user from having an empty page between pages of with buttons. For example, if second page 1504 was empty, then infotainment system controller 205 would not allow user to drag selected button 604 to third page 1506.

Figure 16A:
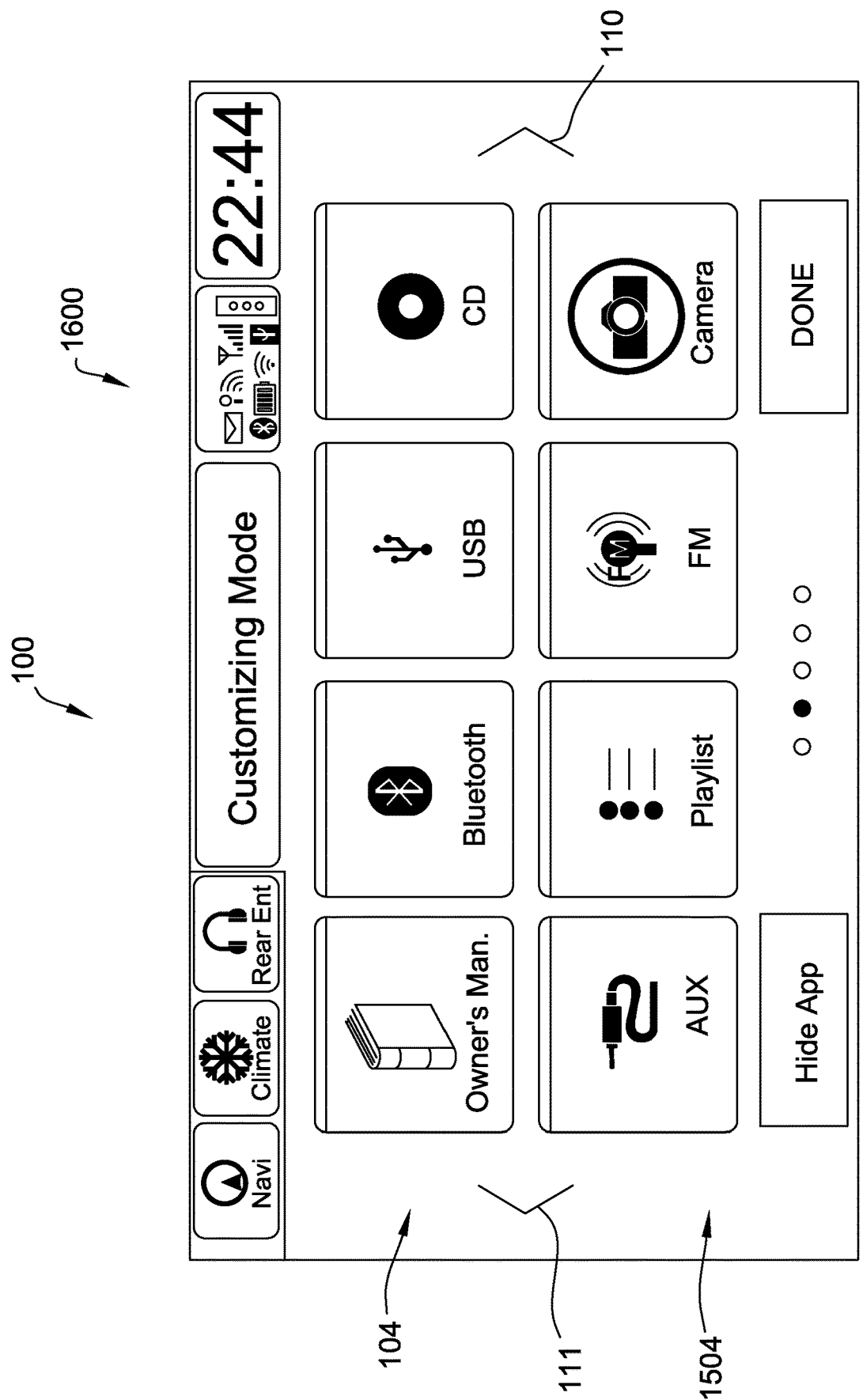
FIGS. 16A-16E illustrate exemplary views of another use case for rearranging buttons over multiple active pages.
Figure 16B:
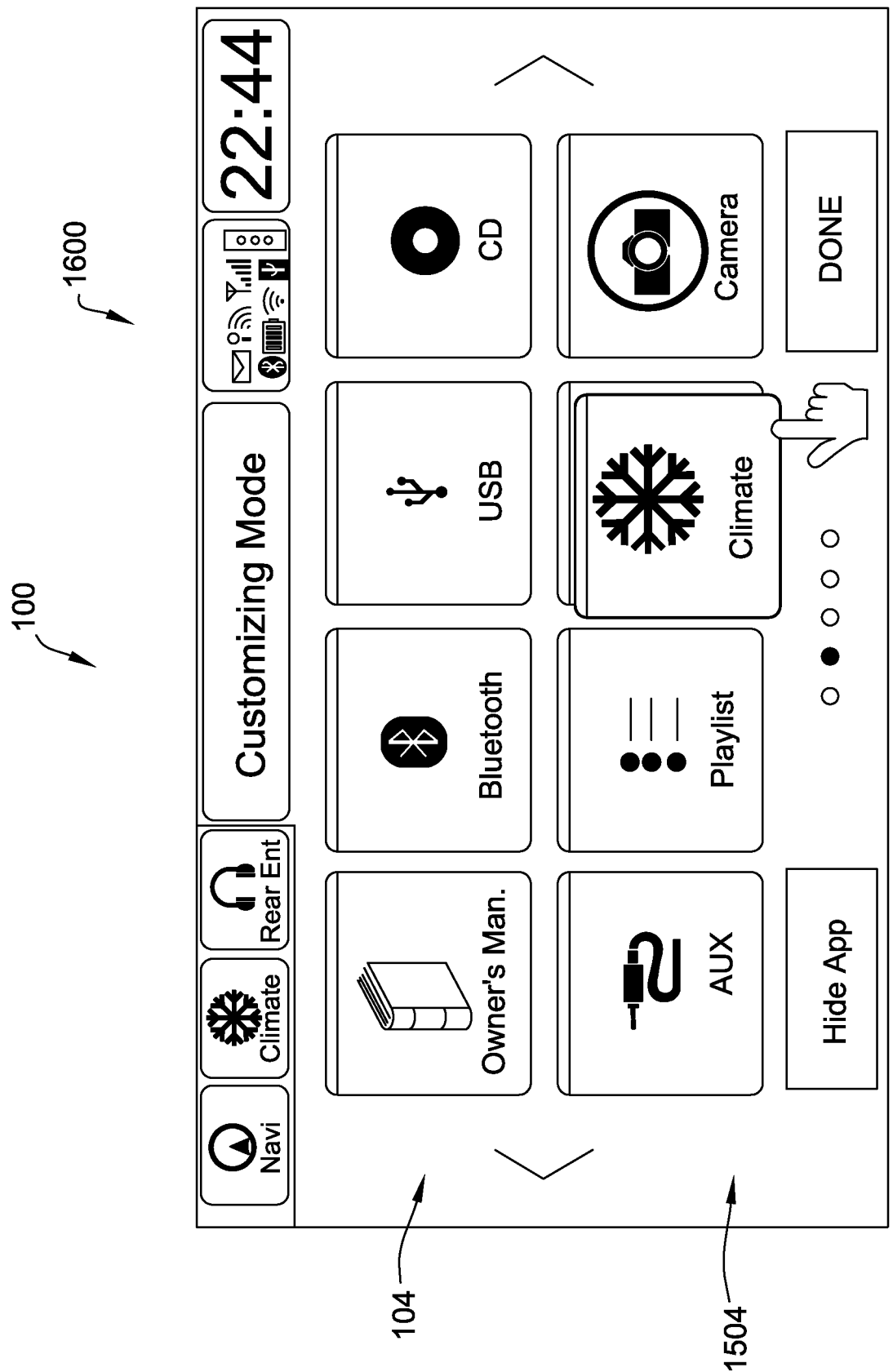
Figure 16C:
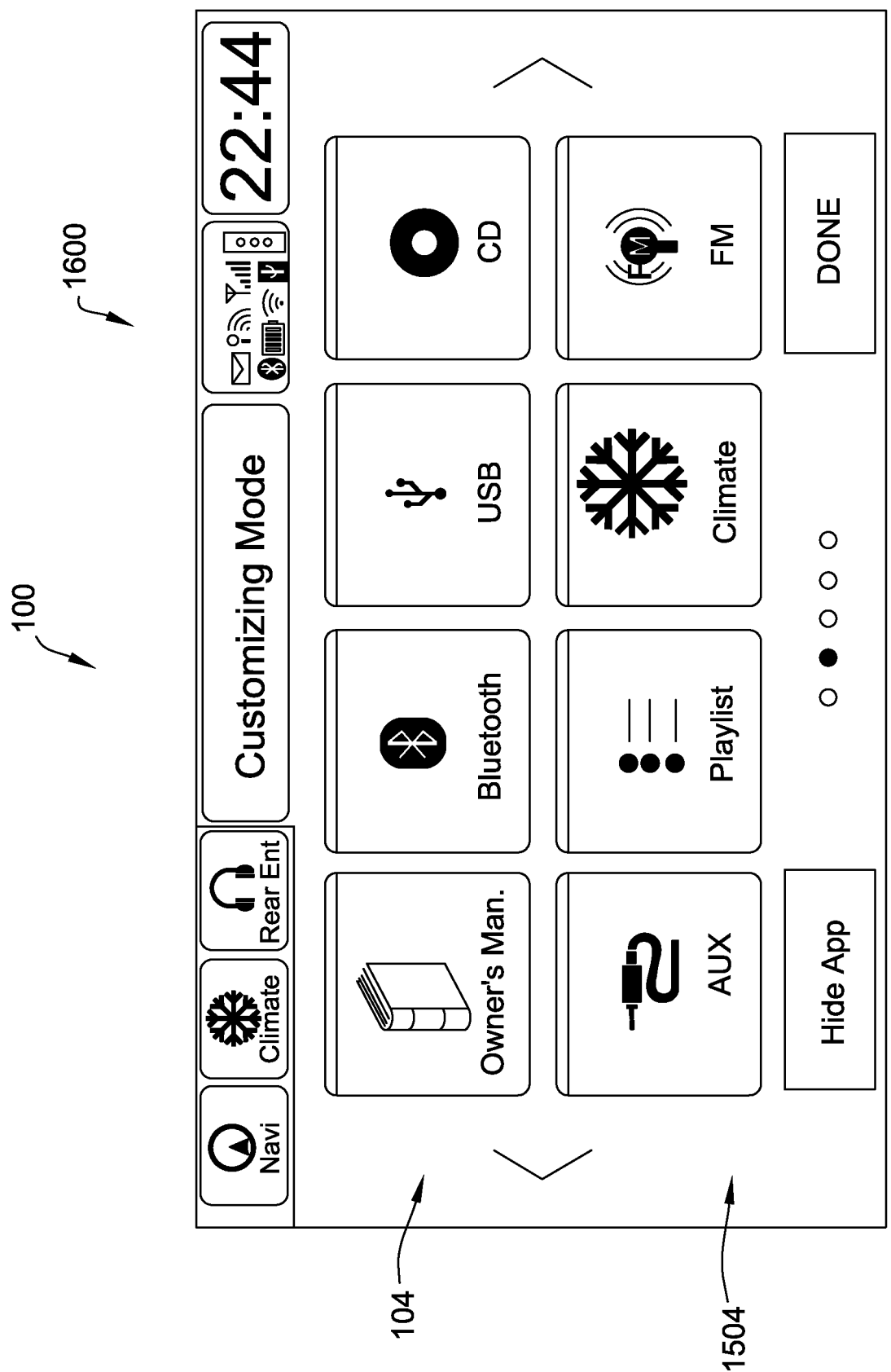
Figure 16D:
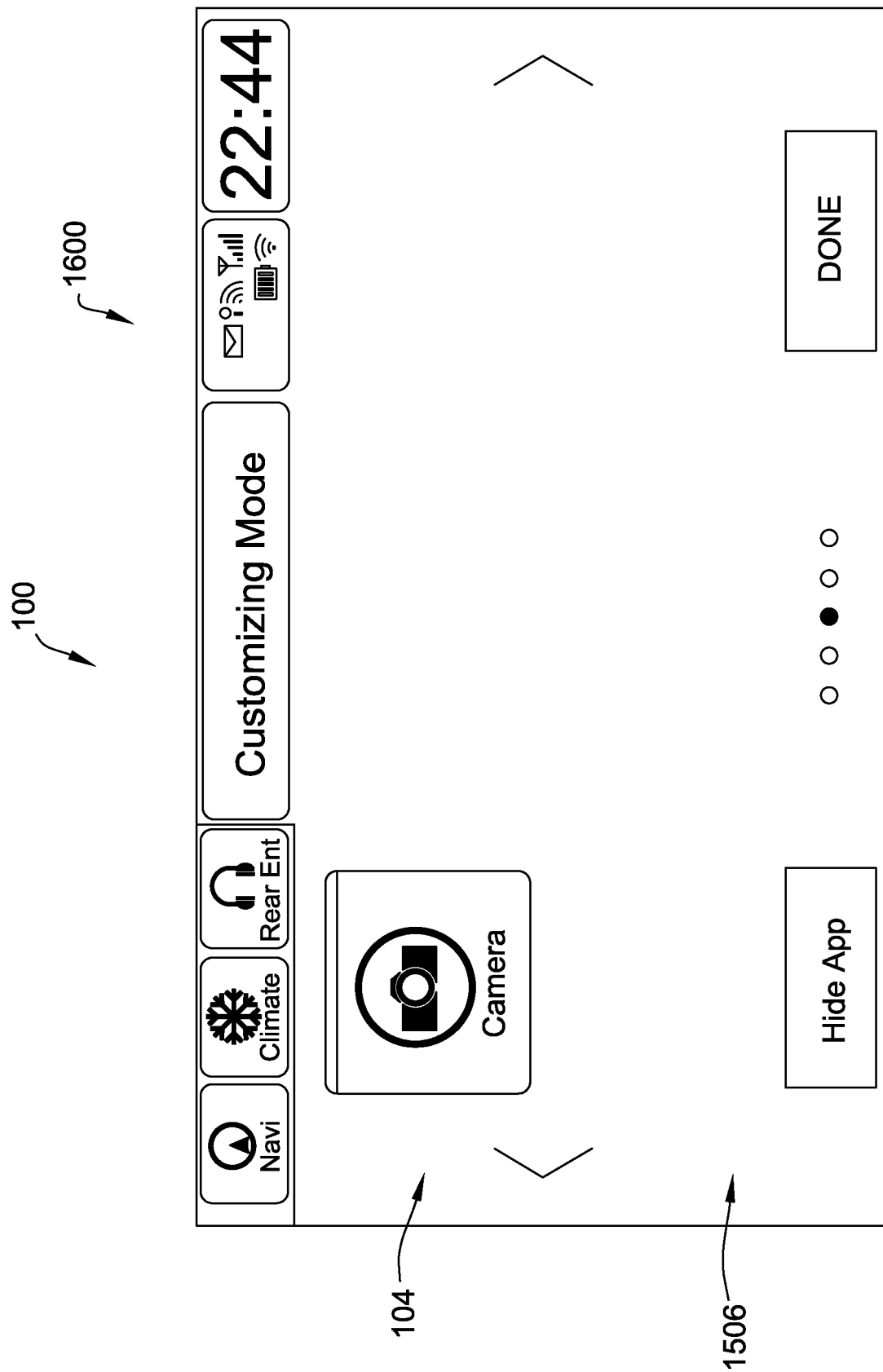
Figure 16E:
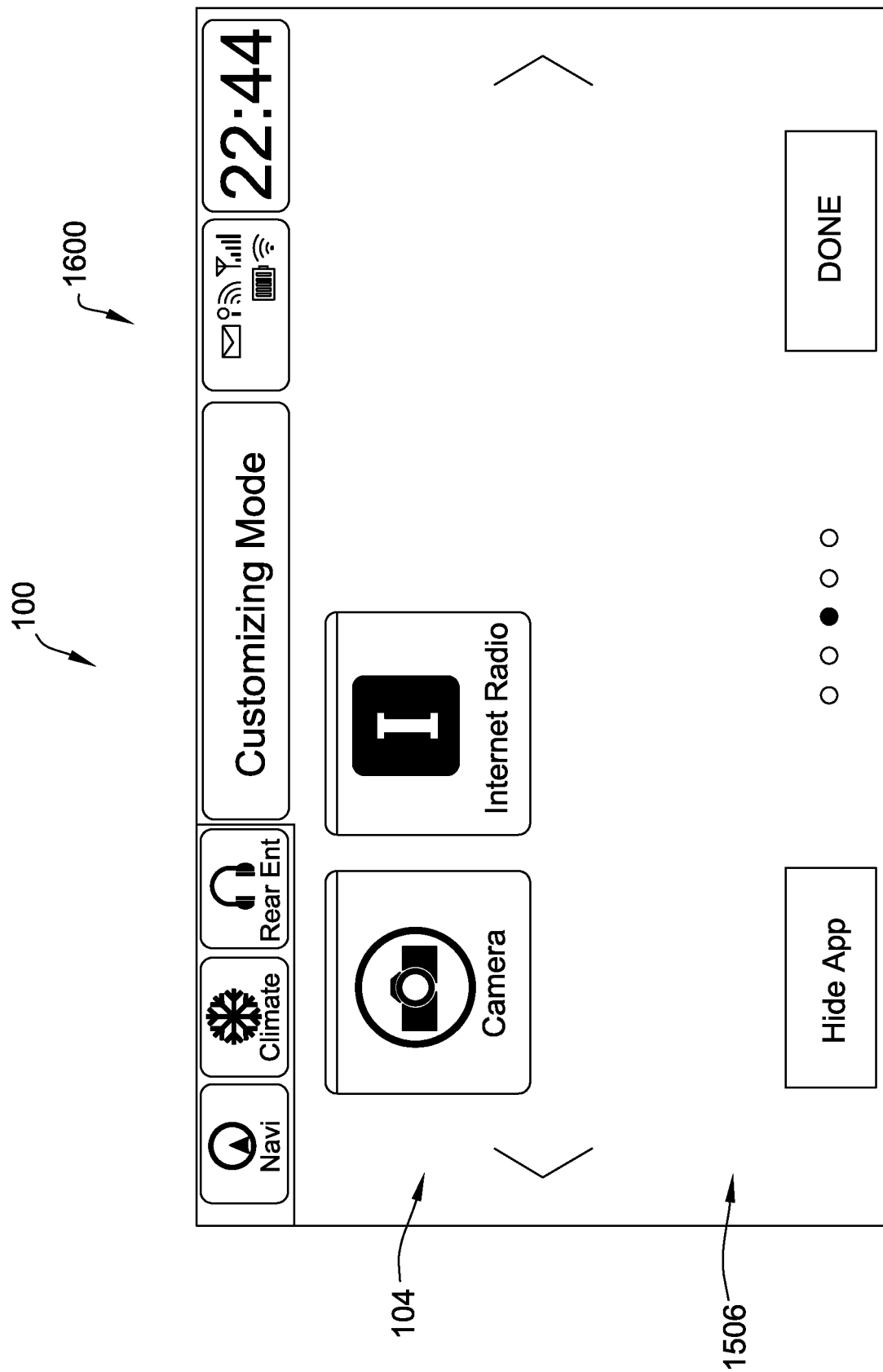

FIGS. 16A-16E illustrate exemplary views 1600 of another use case for rearranging buttons over multiple active pages. In some situations, second page 1504 already contains a full set of buttons 108, such as shown in FIG. 16A. While in customization mode, the user may have acted as shown in FIGS. 15A and 15B and dragged a selected button from first page 1502 to second page 1504. As shown in FIG. 16B, the selected button 604 may be hovering over a space where the user desires to position it. When the user releases the selected button 604, infotainment system controller 205 (1) places the selected button 604 in the desired position, as shown in FIG. 16C, (2) shifts the buttons 108 to the right of the desired position to the right and downward, as shown in FIG. 16C, and (3) transfers the rightmost and bottommost button 108 onto the next page, in this case a third page 1506, as shown in FIG. 16D. FIGS. 16D and 16E shows that the button 108 that is shifted from second page 1504 is placed in the leftmost and uppermost position on third page 1506, even if there are existing buttons 108 on third page 1506. If third page 1506 had been full of buttons 108, then the rightmost and bottommost button 108 would be transferred to the next page.

Figure 17A:
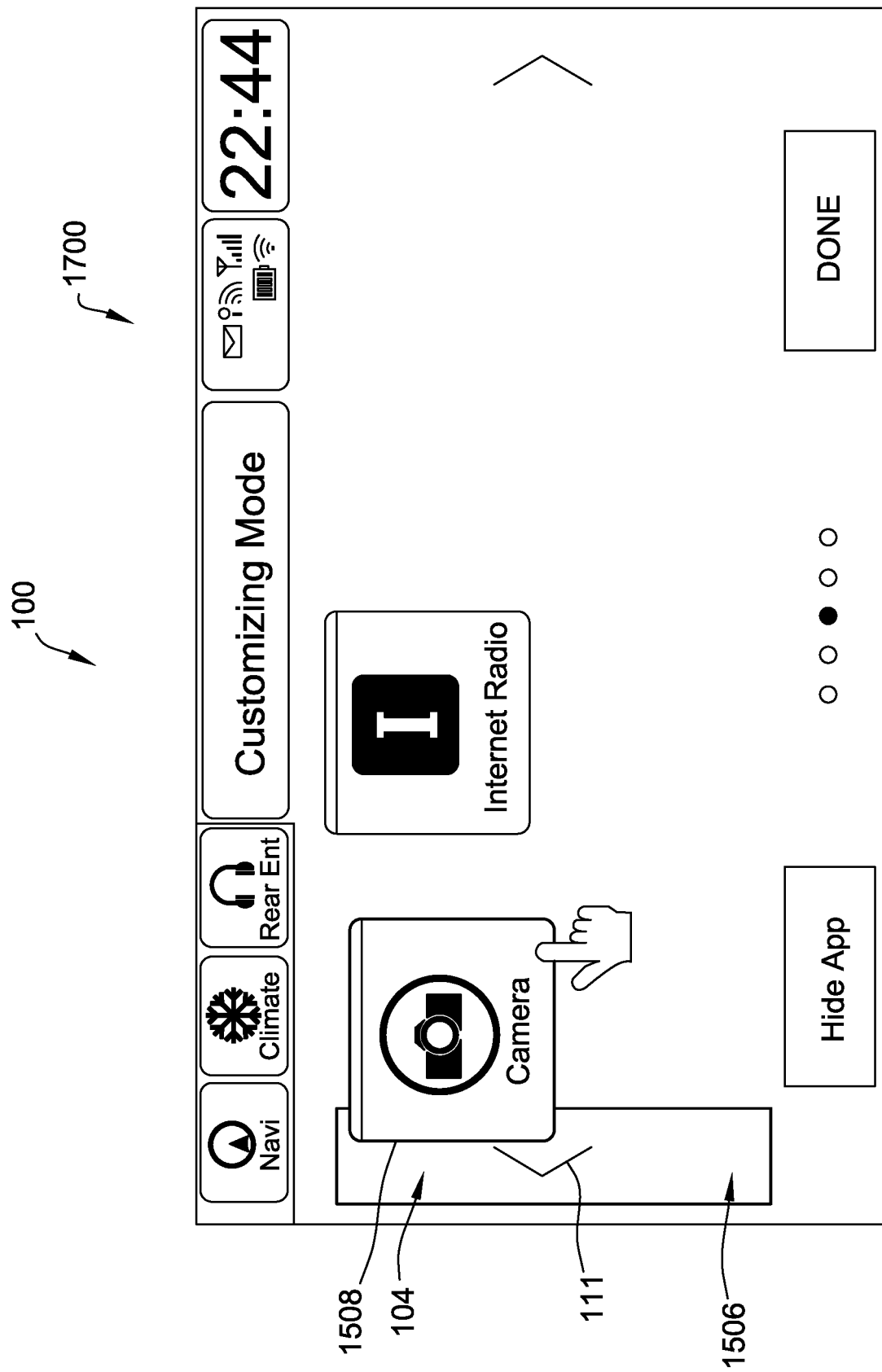
FIGS. 17A-17D illustrate exemplary views of yet a further use case for rearranging buttons over multiple active pages.
Figure 17B:
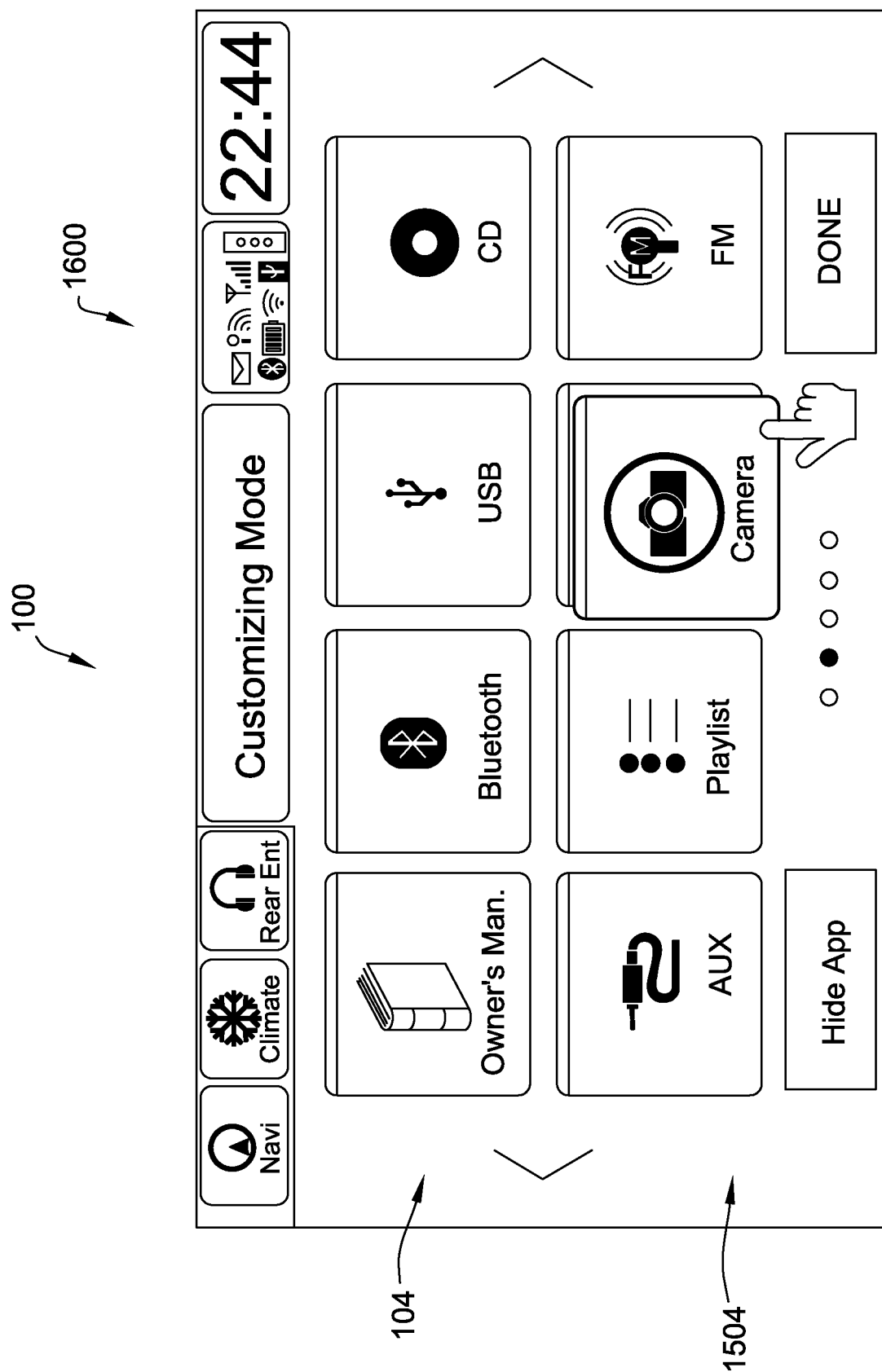
Figure 17C:
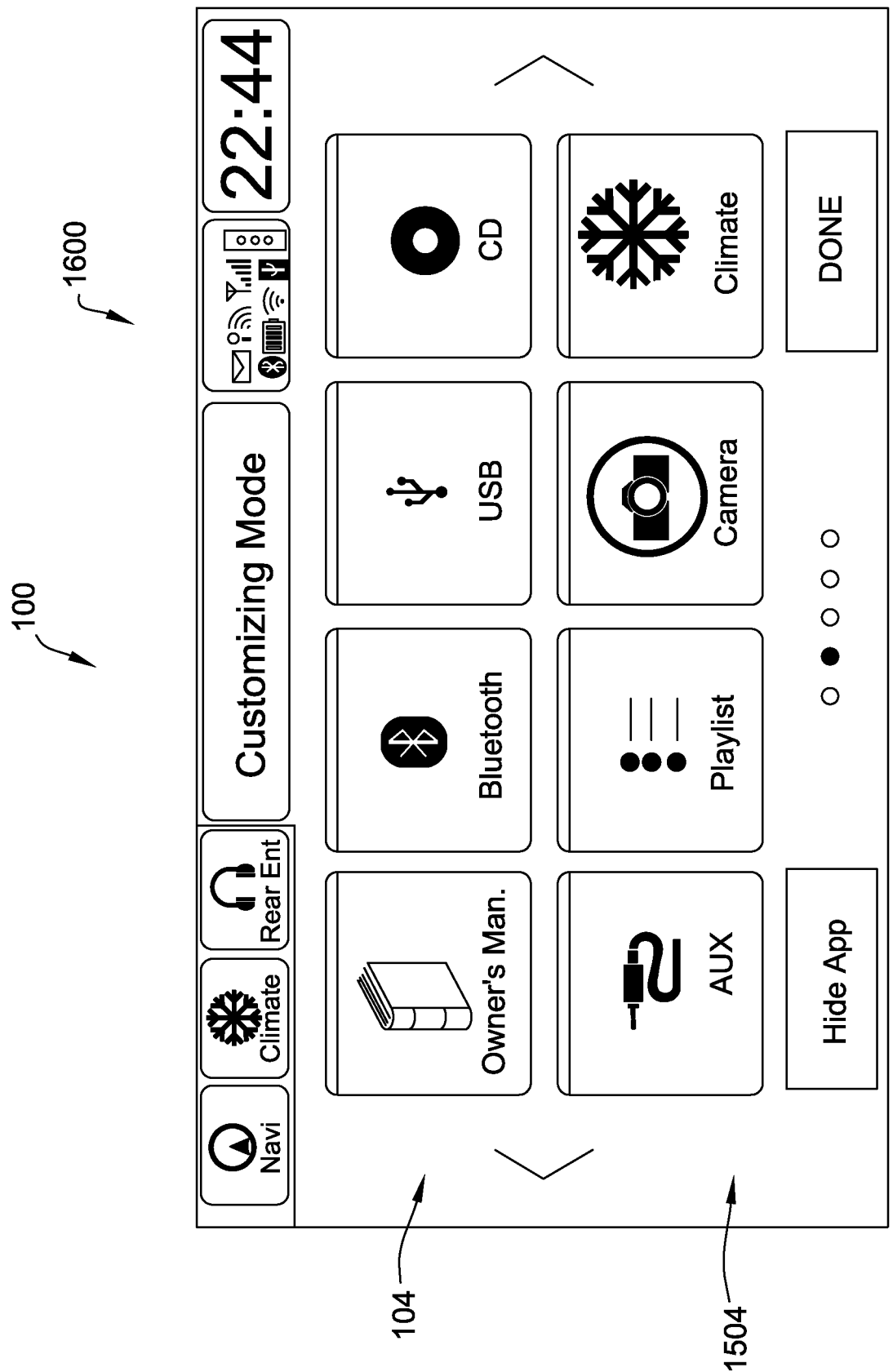
Figure 17D:
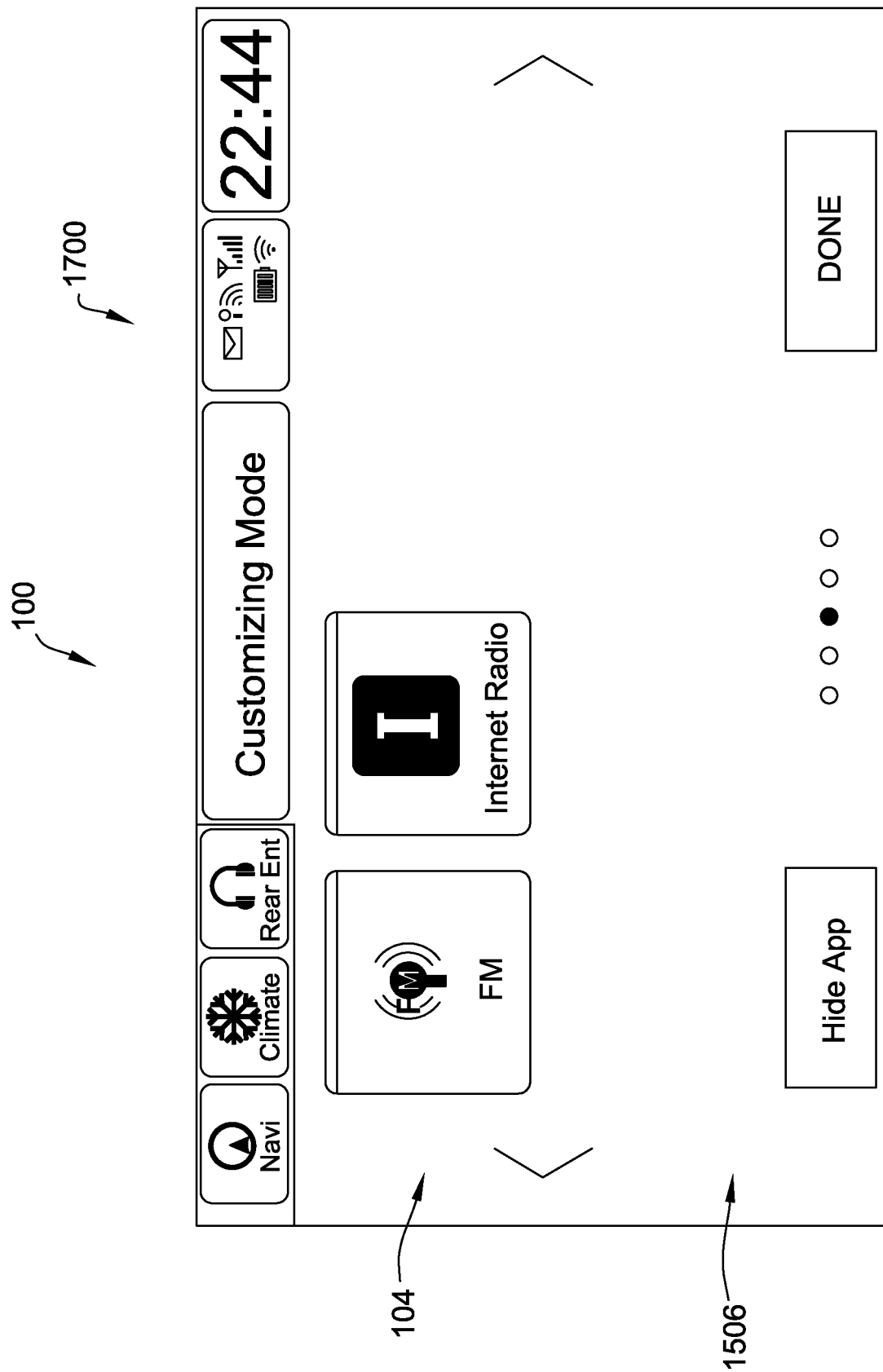

FIGS. 17A-17D illustrate exemplary views 1700 of yet a further use case for rearranging buttons over multiple active pages. As shown in FIG. 17A, a user may select a button 108, such as the Camera button 1508 to move to a previous page. In this case, the selected button 1508 is on third page 1506. User drags the selected button 1508 to previous page button 111. In some embodiments, infotainment system display 100 highlights previous page button 111 to show that the selected button 1508 is over previous page button 111. If the user hovers over previous page button 111 for a predetermined period of time, infotainment system display 100 opens second page 1504 as shown in FIG. 17B. When user releases selected button 1508, infotainment system controller 205 (1) places the selected button 1508 in the desired position, as shown in FIG. 17C, (2) shifts the buttons 108 to the right of the desired position to the right and downward, as shown in FIG. 17C, and (3) transfers the rightmost and bottommost button 108 onto the next page, in this case a third page 1506, as shown in FIG. 17D. In this case, the button 108 that is transferred shifts the button 108 that is already on third page 1506 to the right.

Figure 18:
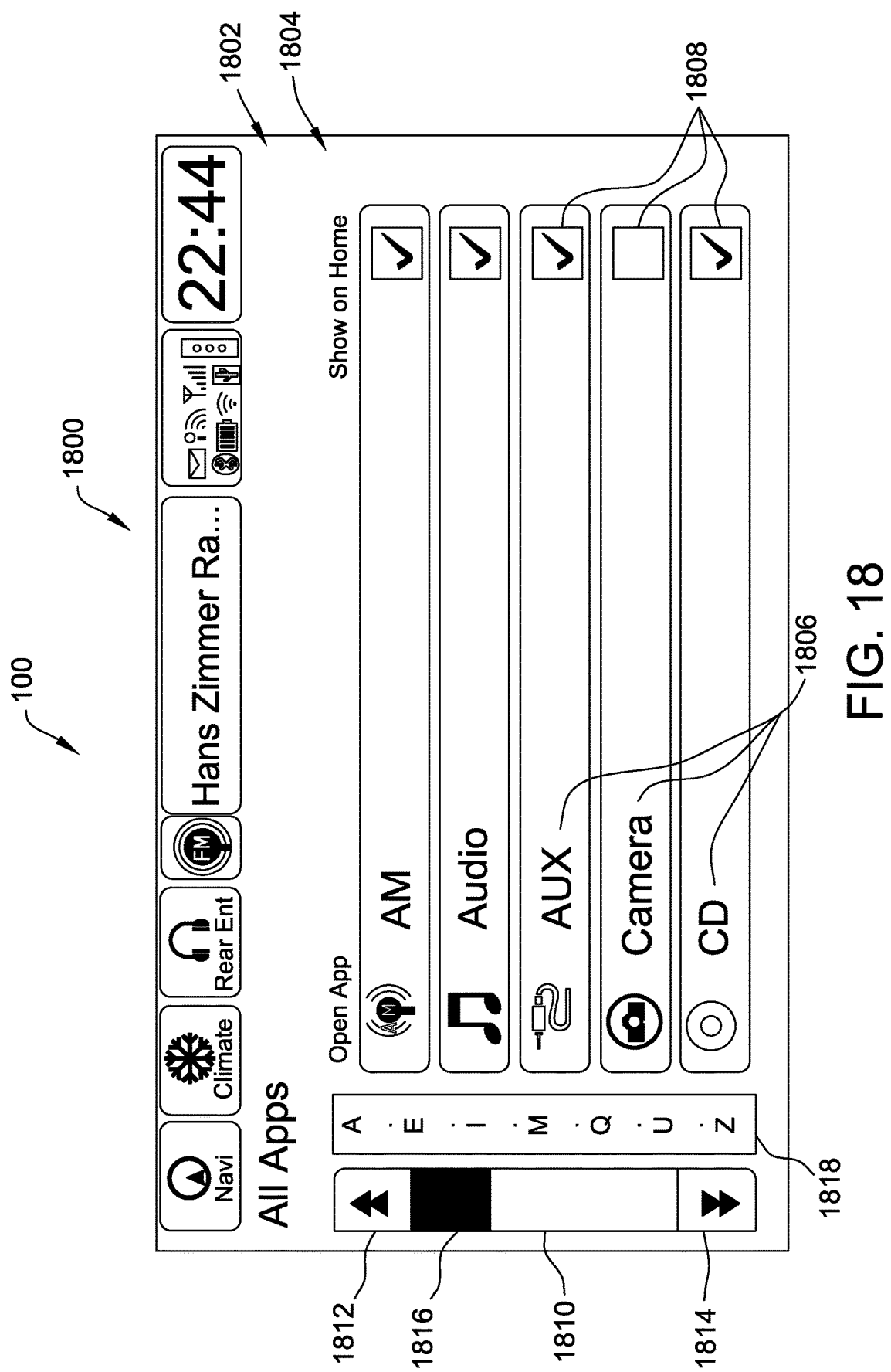

FIG. 18 illustrates an exemplary view 1800 of an all apps menu 1802 that displays a selectable listing of all of the apps on infotainment system 200 (shown in FIG. 2).

In the exemplary embodiment, all apps menu 1800 includes an app listing 1806 for each app on infotainment system 200. The app listings 1806 are displayed in alphabetical order. Each app listing 1806 includes a checkbox 1808 to indicate if the associated app is displayed as a button 108. For example, the Navigation and Rear Ent buttons 108 (shown in FIG. 1) would be checked as they are displayed as buttons. However, after the use case shown in FIGS. 8A-8C, the check box 1808 for the climate app associated with Climate button 604 (shown in FIG. 8A) would be unchecked.

Furthermore, a user may click on a checkbox 1808 to either hide or unhide the associated app. If the checkbox 1808 is checked when the user clicks on it, then the associated button 108 is removed from the associated page of buttons. The remaining buttons 108 on the page are rearranged as if the button 108 had been removed using the hide app button 602, as shown in the use case in FIGS. 8A-8C. If the checkbox 1808 is unchecked when the user clicks on it, a button 108 associated with the app is added in the first available position on a page of buttons. In some embodiments, the user may click next to or near the checkbox 1808 to activate it, instead of having to click exactly on the checkbox 1808. In the exemplary embodiment, if the button 108 for an app is that has an associated shortcut button 118 is hidden, shortcut button 118 remains on shortcut bar 116 (both shown in FIG. 1). In the exemplary embodiment, all apps are capable of being hidden and active page 104 may contain zero buttons 108. In some embodiments, when the user clicks on the app listing 1806, infotainment system controller 205 opens the associated app.

In some embodiments, the all apps menu 1800 includes more apps than can be shown at once. In these embodiments, infotainment system display 100 displays a current page 1804 of app listings 1806, for example the first five in alphabetical order. The rest of the app listings 1806 are below the current page 1804 of app listings 1806.

If the user makes contact with infotainment system display 100 and moves upward, current page 1804 scrolls upwards and displays app listings 1806 from lower on the menu while scrolling higher app listings 1806 off of the current page 1804. Infotainment system controller 205 animates the app listings 1806 moving up the current page 1804. Likewise, if the user makes contact with infotainment system display 100 and moves downward, infotainment system controller 205 animates the app listings 1806 scrolling downward. The user may swipe to move up a full page at a time. A swipe is where the user makes contact and slides their finger in the desired direction. While still sliding, the user releases contact. When a swipe is detected, infotainment system controller 205 animates the app listings 1806 moving off of the current page 1804 in the direction of the swipe and replaces them with the next set of app listings 1806. In some embodiments, infotainment system controller 205 moves the last app listing 1806 based on the direction of the swipe to be the first app listing 1806 and fills in the rest app listings 1806 accordingly. For example, if the swipe was in an upward direction, the CD app listing 1806 would be at the top of current page 1804 with the climate app listing 1806 being next and the rest being filled in by alphabetical order.

A user may also pan to slide the app listings 1806 up or down. A pan is where the user makes contact, moves the point of contact, and stops moving before releasing contact. For a pan, infotainment system controller 205 only moves the app listings 1806 an amount based on the distance of the pan. When the user releases contact, infotainment system display 100 keeps the list in its present position. In some embodiments, infotainment system controller 205 moves the app listings 1806 while the pan is occurring. This allows the user to pan up and then pan down and see the app listings 1806 above and below those on the current page 1804.

In the exemplary embodiment, all apps menu 1802 includes a scroll bar 1810. Scroll bar 1810 includes an up arrow 1812, a down arrow 1814, and a position indicator 1816. Position indicator 1816 indicates relatively where in the list of app listings 1806 the current page 1804 is currently displaying. When the user clicks on either up arrow 1812 or down arrow 1814, infotainment system display 100 scrolls the user one page up or down, respectively. If the next page only has fewer items than a full page, then infotainment system display 100 shows the new items as well as enough previously seen items to fill the page. In some other embodiments, clicking on up arrow 1812 or down arrow 1814 only moves up or down one item at a time. In the exemplary embodiment, infotainment system controller 205 animates the scrolling from one page to the next. A user may also scroll using position indicator 1816 to scroll the current page 1804 up and down. In some embodiments, the list does not animate the change in position until the user releases contact with position indicator 1816.

A user may also click on a position in scroll bar 1810. In the exemplary embodiment, current page 1804 then displays a page of app listings 1806 based on the position of the click on scroll bar 1810 in relation to list of items on all apps menu 1800. Infotainment system controller 205 moves the position indicator 1816 to where the click occurred. For example, if the user clicks in the middle of scroll bar 1810, infotainment system display 100 displays the current page 1804 with app listings 1806 from the middle of all apps menu 1802.

In some further embodiments, infotainment system display 100 also displays an alphabet scroll bar 1818. Alphabet scroll bar 1818 displays a partial alphabet. When the user clicks on a position on alphabet scroll bar 1818, infotainment system controller 205 determines which letter that the user clicked based on the relative position in the alphabet in comparison to the position on alphabet scroll bar 1818 that the user clicked. Infotainment system display 100 displays the current page 1804 starting with the app listings 1806 that start with the determined letter. Infotainment system display 100 jumps to the first app listing 1806 (in alphabetical order) that starts with the determined letter at the top of current page 1804 and fills the rest of current page 1804 with app listings 1806 that follow the first app listing 1806 in alphabetic order. The user may also contact and slide the contact up or down alphabet scroll bar 1818. In the exemplary embodiment, infotainment system display 100 does not update the visible app listings 1806 until the user releases contact. In this embodiment, infotainment system controller 205 determines the letter closest to where the user released contact and jumps to display the app listings 1806 starting with that letter.

FIGS. 19A-19D illustrate exemplary views 1900, 1910, 1920, and 1930 of use cases of when the user reaches the end of active page 104.

Figure 19A:
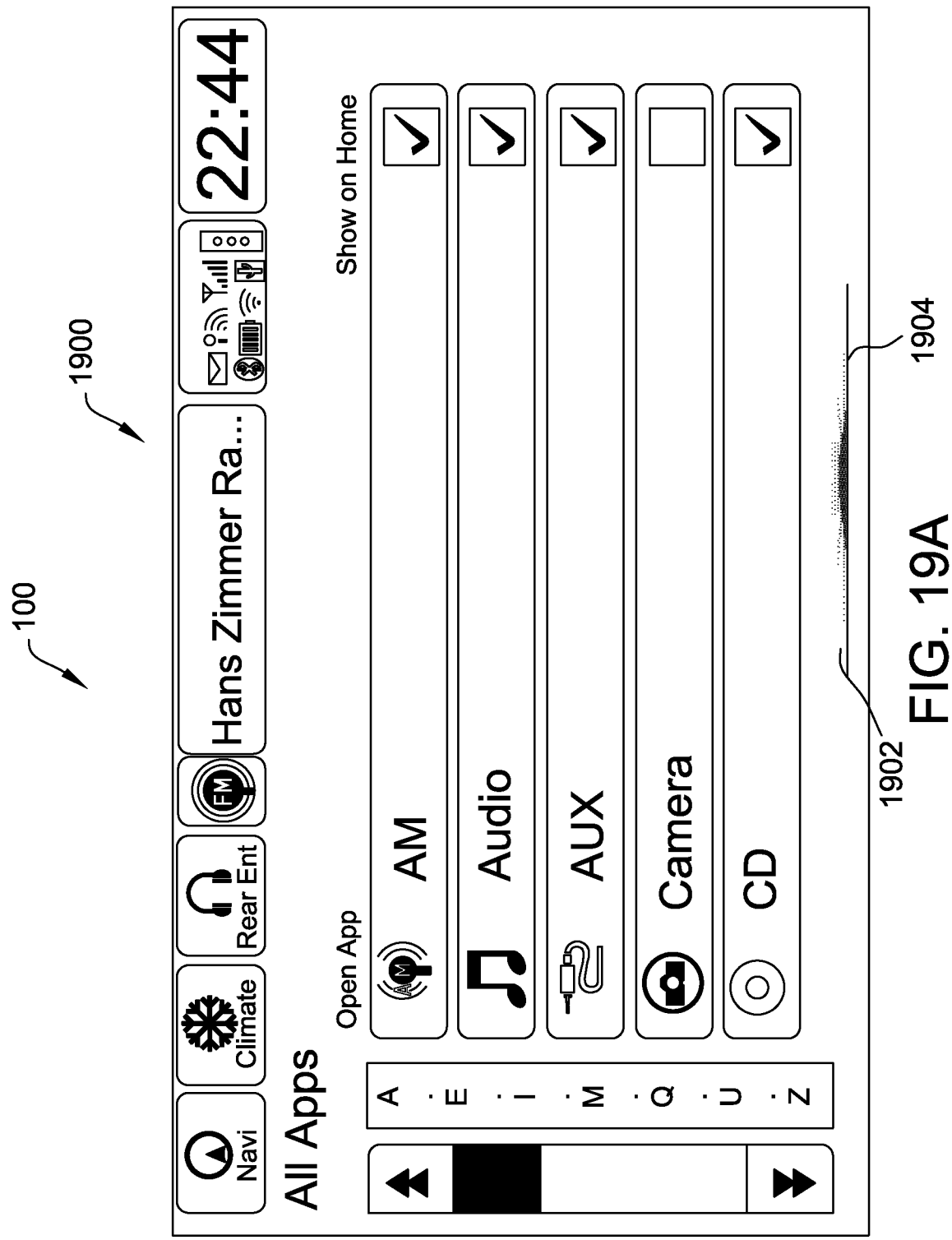
FIGS. 19A-19D illustrate exemplary views of use cases of when the user reaches the end of the active screen.

In the exemplary embodiment, when the user reaches the end of a list (as shown in FIG. 19A) or the end of pages of buttons, infotainment system display 100 displays an animation to indicate to the user that there are no more items past the current point. FIG. 19A illustrates an exemplary view 1900 of all apps menu 1802 shown in FIG. 18. If there are no more app listings 1806 (shown in FIG. 18) beyond the CD app listing 1806 and the user attempts to scroll further, then infotainment system display 100 moves the app listings 1806 on current page 1804 (shown in FIG. 18) up a few pixels (i.e., 10 pixels). Infotainment system display 100 also displays a line 1904 and a glow 1902 emanating from line 1904 at the bottom of the current page 1804. In the exemplary embodiment, line 1904 and glow 1902 are displayed in colors that contrast with the background of infotainment system display 100. Then infotainment system display 100 displays the app listings 1806 bouncing back to their original position, while line 1904 and glow 1902 fade. In some embodiments, both glow 1902 and line 1904 completely fade out within a predetermined period of time, such as a second.

Figure 19B:
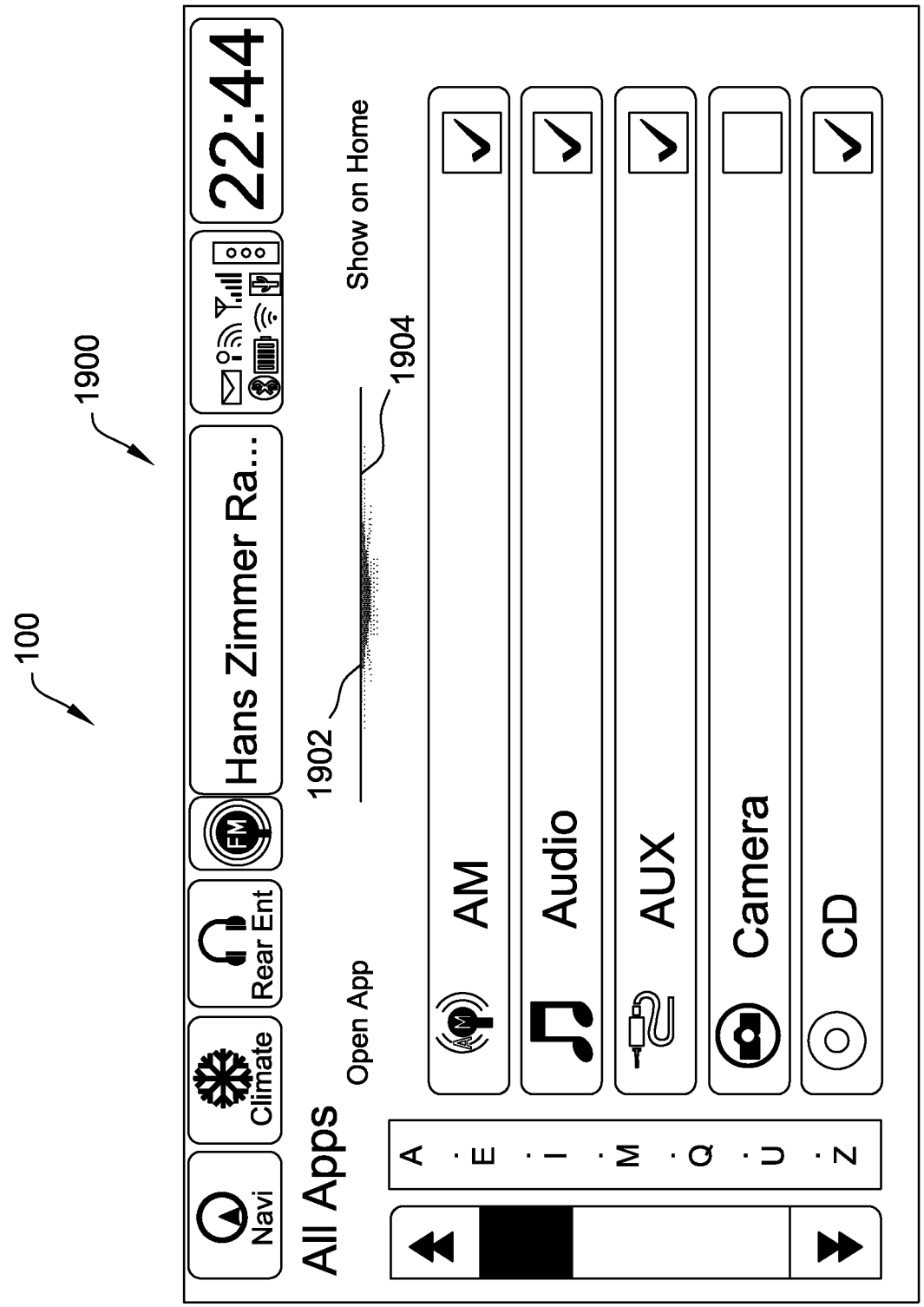

FIG. 19B illustrates an exemplary view 1910 of all apps menu 1802 where the user has tried to access app listings 1806 prior to AM app listing 1806. Infotainment system display 100 shifts the app listings 1806 on current page 1804 a certain amount (i.e., 10 pixels), displays a line 1904 and a glow 1902 at the top of the current page 1804, fades the line 1904 and the glow 1902 over a period of time, and returns the app listings 1806 back to their previous position.

Figure 19C:
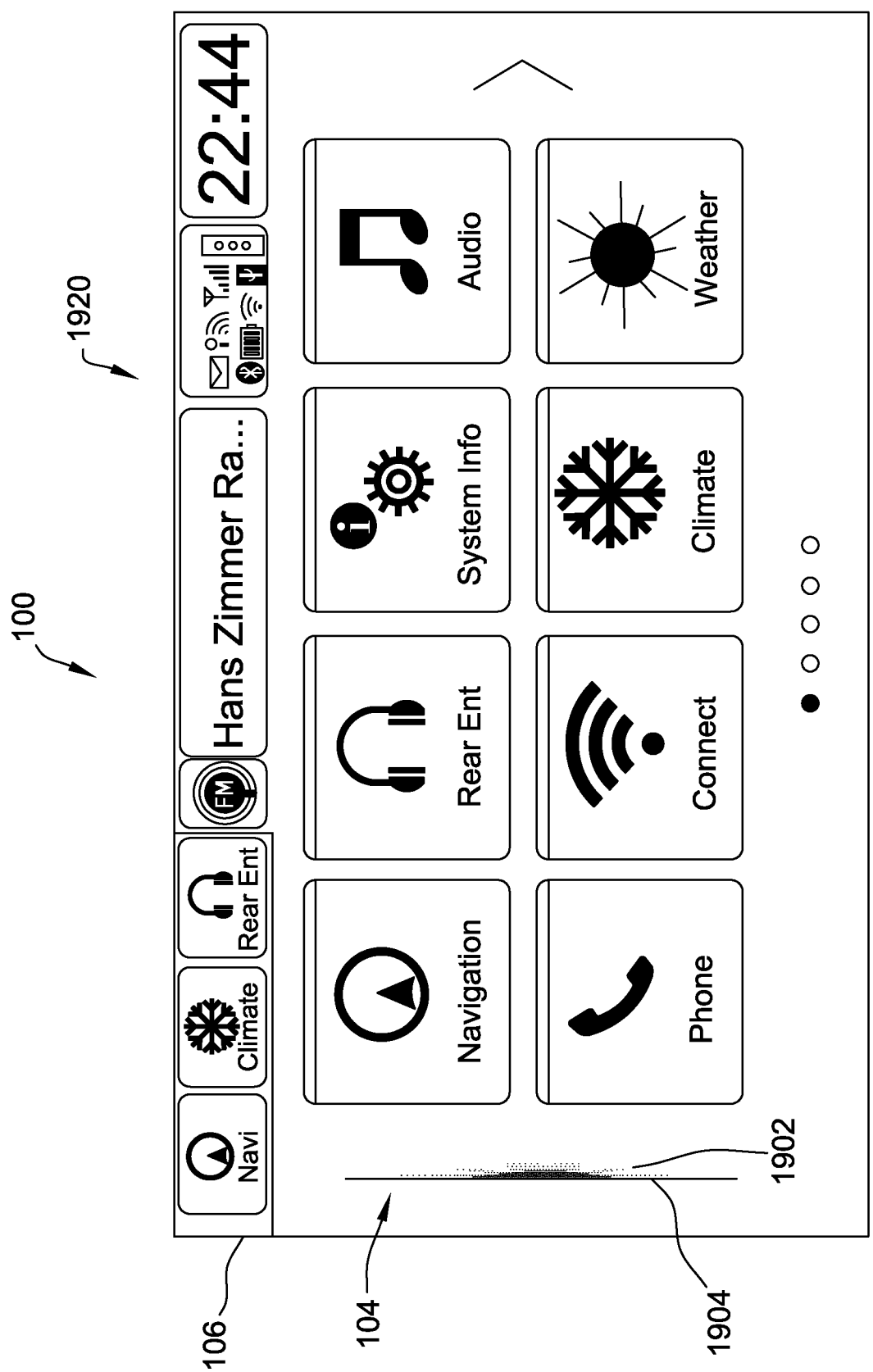

FIG. 19C illustrates an exemplary view 1920 of screen view 102 (shown in FIG. 1) where the user has tried to access buttons 108 (shown in FIG. 1) or a page to the left of active page 104. Infotainment system display 100 shifts the buttons 108 on active page 104 a certain amount (i.e., 10 pixels) to the right, displays a line 1904 and a glow 1902 at the left of the active page 104, fades the line 1904 and the glow 1902 over a period of time, and returns the buttons 108 back to their previous position.

Figure 19D:
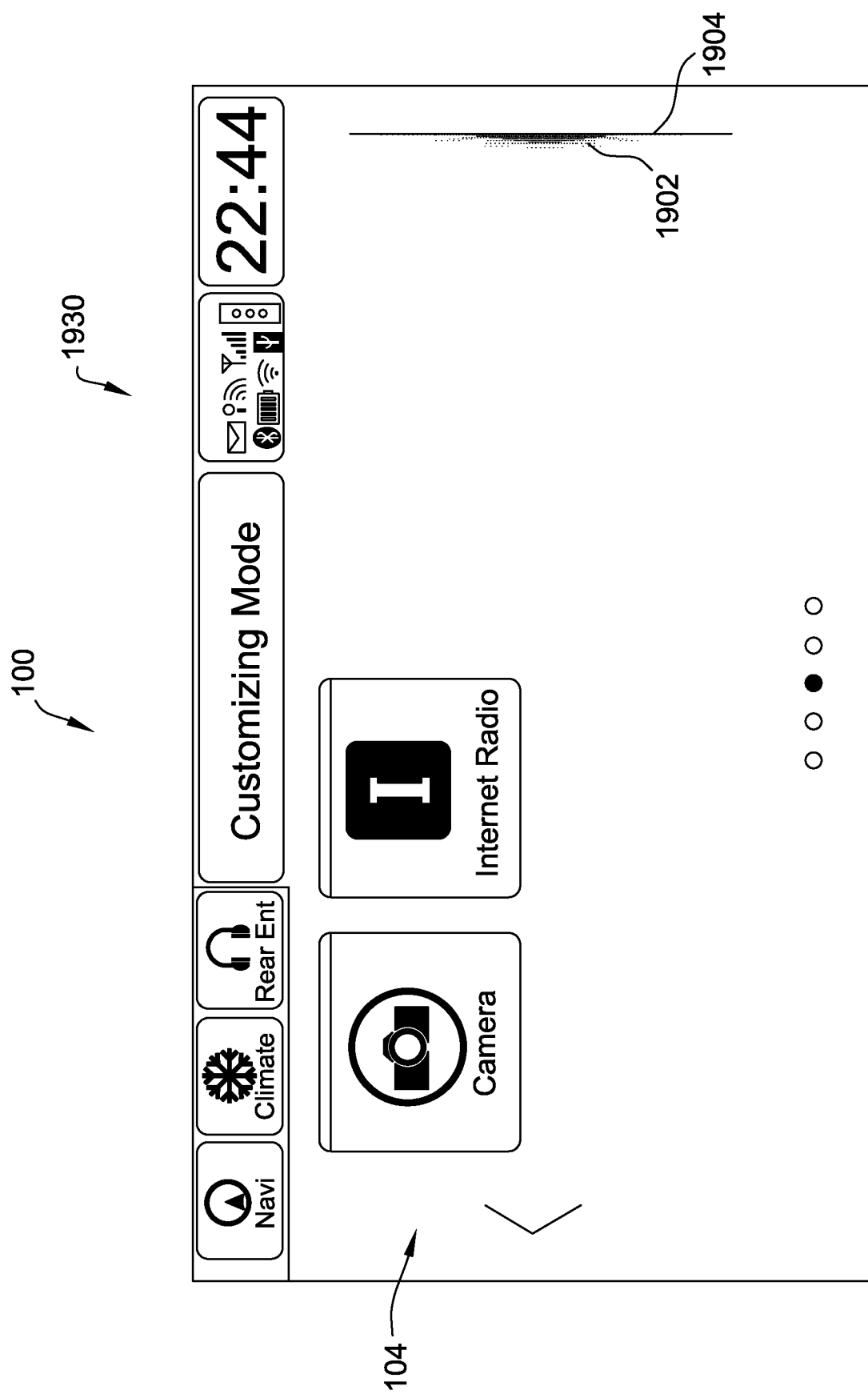

FIG. 19D illustrates an exemplary view 1930 of view 1700 as shown in FIG. 17D where the user has tried to access buttons 108 or a page to the right of third page 1506 which is the current active page 104. As there is no fourth page, infotainment system display 100 shifts the buttons 108 on active page 104 a certain amount (i.e., 10 pixels) to the left, displays a line 1904 and a glow 1902 at the right of the active page 104, fades the line 1904 and the glow 1902 over a period of time, and returns the buttons 108 back to their previous position.

Figure 20B:
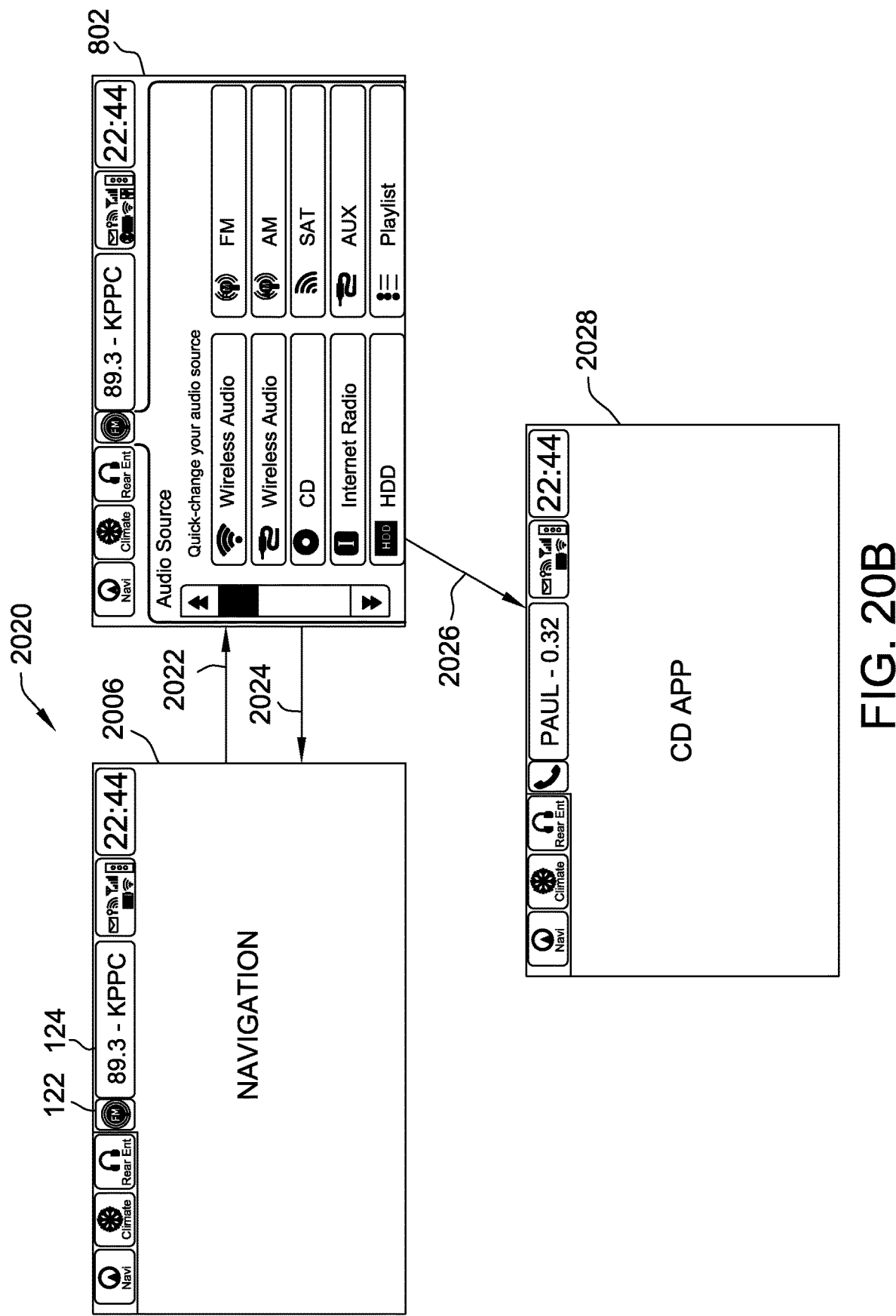

FIGS. 20A-20B are flow charts of exemplary processes 2000 and 2020 for transitioning between different apps using infotainment system 200 (shown in FIG. 2). In the exemplary embodiment, processes 2000 and 2020 are performed by infotainment system controller 205 (shown in FIG. 2) and infotainment system display 100.

In process 2000, infotainment system display 100 (shown in FIG. 1) displays the navigation app 2002. In some embodiments, navigation app screen 2002 allows the user to choose a destination and infotainment system display 100 displays step-by-step directions on navigation app 2002. When the user presses audio information 124, infotainment system controller 205 activates and displays 2004 the app associated with the currently active audio source as shown in audio icon 122 and audio information 124. In this example, infotainment system controller 205 activates 2004 FM app 2006. If infotainment system controller 205 receives a phone call, infotainment system controller 205 activates and displays 2008 the phone app 2010. When the phone call is over, infotainment system controller 205 closes 2012 the phone app 2010 and returns the user to the previously open app, in this case the FM app 2006. If the navigation app 2002 had been open prior to the phone call, then infotainment system controller 205 would have returned the user to the navigation app 2002. In some embodiments, infotainment system controller 205 transitions 2014 back to the navigation app 2002 from the FM app 2006 if the user presses the back button. In other embodiments, when the user presses the back button while an audio source app is active, infotainment system controller 205 transitions from the audio source app, such as the FM app 2006, to screen view 102 (shown in FIG. 1). When there is no audio playing and no active phone call (as shown in FIG. 9D), then no transition to another page is initiated when audio information 124 is clicked on.

In process 2020, infotainment system display 100 displays an audio app, the FM app 2006. If the user presses the audio icon 122, infotainment system controller 205 opens 2022 the audio sources menu 802. If the user selects an audio source 804 (shown in FIG. 10), infotainment system controller 205 closes the previous audio app and activates 2026 the app associated with the selected audio source 804. In this example, infotainment system controller 205 activates the CD app 2028. If the user wishes to close audio sources menu 802 without making a selection or changing the current selection, the user may click the back button or audio icon 122 to close the audio sources menu 802 and infotainment system controller 205 returns 2024 the user to the previously open application, in this case the FM App 2006.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. An infotainment computer device for use in a vehicle, said infotainment computer device comprising:
   at least one processor coupled to at least one memory device; and
   a display device coupled to said at least one processor, said infotainment computer device programmed to:
   display, via said display device, an active page including a plurality of user-actionable buttons, wherein each button is associated with an application;
   display, via said display device, a toolbar including a shortcut area including at least one shortcut button, an audio information bar including an audio icon and audio information area, and a notification area including at least one notification icon;
   receive audio signals from at least one audio source;
   determine a currently-selected audio source; and
   transmit the audio signals from the currently-selected audio source to one or more audio outputs.

2. An infotainment computer device in accordance with claim 1, wherein the infotainment computer device is further programmed to:
   receive a user contact via the audio information area; and
   activate and display an application associated with the selected audio source.

3. An infotainment computer device in accordance with claim 1, wherein the infotainment computer device is further programmed to:
   receive a user contact via the audio icon;
   display a menu of audio sources including a listing of a plurality of audio sources;
   receive a selection from the user of an audio source of the plurality of audio sources;
   change the currently-selected audio source based on the selection; and
   close the menu of audio sources.

4. An infotainment computer device in accordance with claim 1, wherein each shortcut button in the shortcut area is associated with a different button of the plurality of buttons in the active page, and wherein when a shortcut button is contacted by a user, the infotainment computer device is further programmed to active the application associated with the corresponding button.

5. An infotainment computer device in accordance with claim 1, wherein each notification icon in the notification area represents at least one notification to the user, and wherein the infotainment computer device is further programmed to:
   receive a user contact on the notification area; and
   display a list of notifications associated with the notifications in the notification area.

6. An infotainment computer device in accordance with claim 5, wherein at least one notification icon is associated with a message to the user, and wherein the infotainment computer device is further programmed to:
   receive a user selection on a notification of the list of notifications, where the notification is associated with a message to the user;
   display the message to the user; and
   adjust at least one notification icon in the notification area based on displaying the message to the user.

7. An infotainment computer device in accordance with claim 6, wherein the notification icon associated with the message includes a number based on the number of messages, and wherein the number is decreased after the message is displayed to the user.

8. An infotainment computer device in accordance with claim 1, wherein each notification icon represents at least one of an application status, a system status, and a notification.

9. An infotainment computer device in accordance with claim 1, wherein the infotainment computer device is further programmed to display the toolbar along the top of the display device.

10. An infotainment computer device in accordance with claim 1, wherein the active page is one page of a plurality of pages of user-actionable buttons, wherein each of the plurality of pages includes at least one user-actionable button that is associated with an application.

11. A computer device for use in controlling an infotainment system in a vehicle, said computer device comprising:

at least one processor coupled to at least one memory device; and a touch-sensitive display device coupled to said at least one processor, said computer device programmed to:
concurrently display, via said touch-sensitive display device, a first region and a second region in a user interface, wherein the first region is configured to display multiple pages of application icons including a first page of application icons from the multiple pages of application icons, the second region comprising a toolbar, wherein the toolbar comprises a shortcut area including at least one shortcut button, an audio information bar including an audio icon and audio information area, and a notification area including one or more notification icon, wherein the audio icon and the audio information area displays information about a currently-selected audio source;

while concurrently displaying the first and second regions on the touch-sensitive display device:
receive a user contact on the audio information area, wherein the audio information area is configured to display information about the currently-selected audio source; and
activate and display an application associated with the selected audio source in the first region.

12. The computer device in accordance with claim 11, wherein the computer device is further programmed to:
receive a user contact on the audio icon; and
display a menu of audio sources including a listing of a plurality of audio sources.

13. The computer device in accordance with claim 12, wherein the computer device is further programmed to:
receive a selection from the user of an audio source of the plurality of audio sources;
change the currently-selected audio source based on the selection;
transmit audio signals from the currently-selected audio source to one or more audio outputs; and
close the menu of audio sources.

14. The computer device in accordance with claim 11, wherein the computer device is further programmed to:
determine whether the information about the currently-selected audio source exceeds a number of characters available on the audio information area; and
display a portion of the information about the currently-selected audio source with an ellipse at the end of the audio information.

15. The computer device in accordance with claim 11, wherein the computer device is further programmed to display the information on the audio information area as static information.

16. The computer device in accordance with claim 11, wherein the audio information includes information about the currently-selected audio source includes at least one of a song currently playing, an artist currently playing, a frequency of a current station, a name of the current station, a name of a current program, a phone number or contact name, call time, an error message, and volume feedback.

17. The computer device in accordance with claim 11, wherein the computer device is further programmed to:
receive a user input of volume adjustment for the audio source;
display a current volume indicator in the audio information area for a predetermined period of time; and
when the predetermined period of time is complete, return to displaying information about the currently-selected audio source in the audio information area.

18. The computer device in accordance with claim 11, wherein the computer device is further programmed to when the audio source is deactivated, display the currently-selected audio source in the audio icon and an audio off message in the audio information area.

19. The computer device in accordance with claim 11, wherein the computer device is further programmed to display audio information in the audio information area based on a priority list associated with the audio source associated with the information.

20. The computer device in accordance with claim 11, wherein the second region is displayed along the top of the touch-sensitive display device.

* * * * *